(12) United States Patent
Rajasingham

(10) Patent No.: US 8,763,954 B2
(45) Date of Patent: Jul. 1, 2014

(54) VEHICLE OCCUPANT SUPPORT

(76) Inventor: Arjuna Indraeswaran Rajasingham, Bethesda, MD (US)

( * ) Notice: Subject to any disclaimer, the term of this patent is extended or adjusted under 35 U.S.C. 154(b) by 510 days.

(21) Appl. No.: 12/735,146

(22) PCT Filed: Jan. 21, 2009

(86) PCT No.: PCT/US2009/000342
§ 371 (c)(1), (2), (4) Date: Jun. 17, 2010

(87) PCT Pub. No.: WO2009/079668
PCT Pub. Date: Jun. 25, 2009

(65) Prior Publication Data
US 2010/0282902 A1 Nov. 11, 2010

Related U.S. Application Data

(60) Provisional application No. 61/062,002, filed on Jan. 23, 2008, provisional application No. 61/066,372, filed on Feb. 20, 2008, provisional application No. 61/072,241, filed on Mar. 28, 2008, provisional application No. 61/062,495, filed on Mar. 31, 2008, provisional application No. 61/123,345, filed on Apr. 8, 2008, provisional application No. 61/188,175, filed on Aug. 7, 2008, provisional application No. 61/191,309, filed on Sep. 8, 2008, provisional application No. 61/198,541, filed on Nov. 6, 2008.

(51) Int. Cl.
*B64D 11/06* (2006.01)

(52) U.S. Cl.
USPC ..................................... 244/118.6; 244/122 R

(58) Field of Classification Search
USPC .................... 244/118.5, 118.6, 122 R, 171.9; 105/315, 316, 344, 345; 114/118, 189
See application file for complete search history.

(56) References Cited

U.S. PATENT DOCUMENTS

| | | | | |
|---|---|---|---|---|
| 2,966,199 | A * | 12/1960 | Waerner | 105/344 |
| 3,381,921 | A * | 5/1968 | McDonough et al. | 244/137.1 |
| 5,716,026 | A * | 2/1998 | Pascasio et al. | 244/118.6 |
| 6,056,239 | A * | 5/2000 | Cantu et al. | 244/118.6 |
| 6,152,400 | A * | 11/2000 | Sankrithi et al. | 244/118.6 |
| 6,237,872 | B1 * | 5/2001 | Bar-Levav | 244/118.6 |
| 6,609,754 | B2 * | 8/2003 | Rajasingham | 297/284.3 |
| 6,851,134 | B2 * | 2/2005 | Freller | 244/171.9 |

* cited by examiner

*Primary Examiner* — Tien Dinh
*Assistant Examiner* — Richard R Green

(57) ABSTRACT

Vehicle occupant support for enhanced comfort and utility in a vehicle with arrangements for crash load protection of occupants. Virtual navigation device.

19 Claims, 27 Drawing Sheets

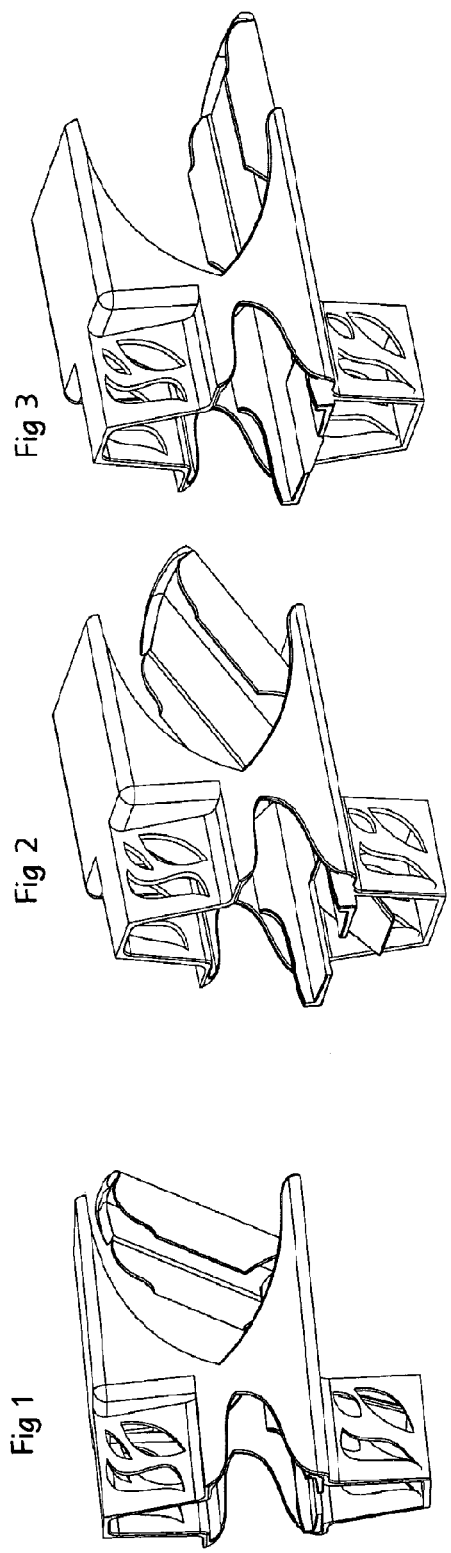
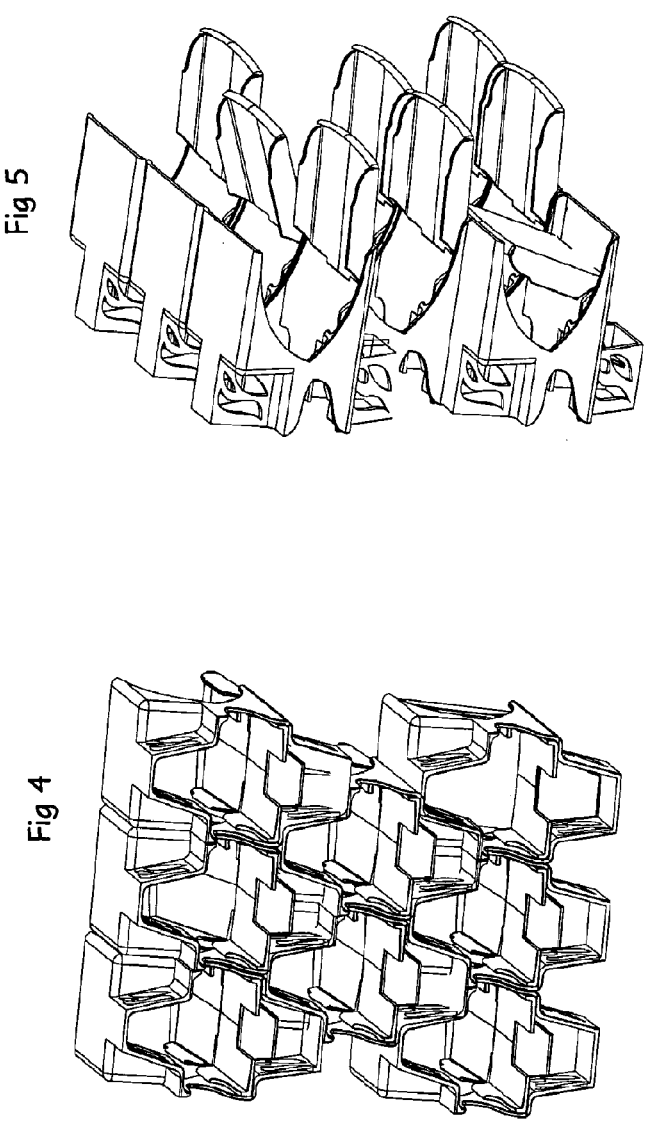
Fig 1
Fig 2
Fig 3
Fig 4
Fig 5

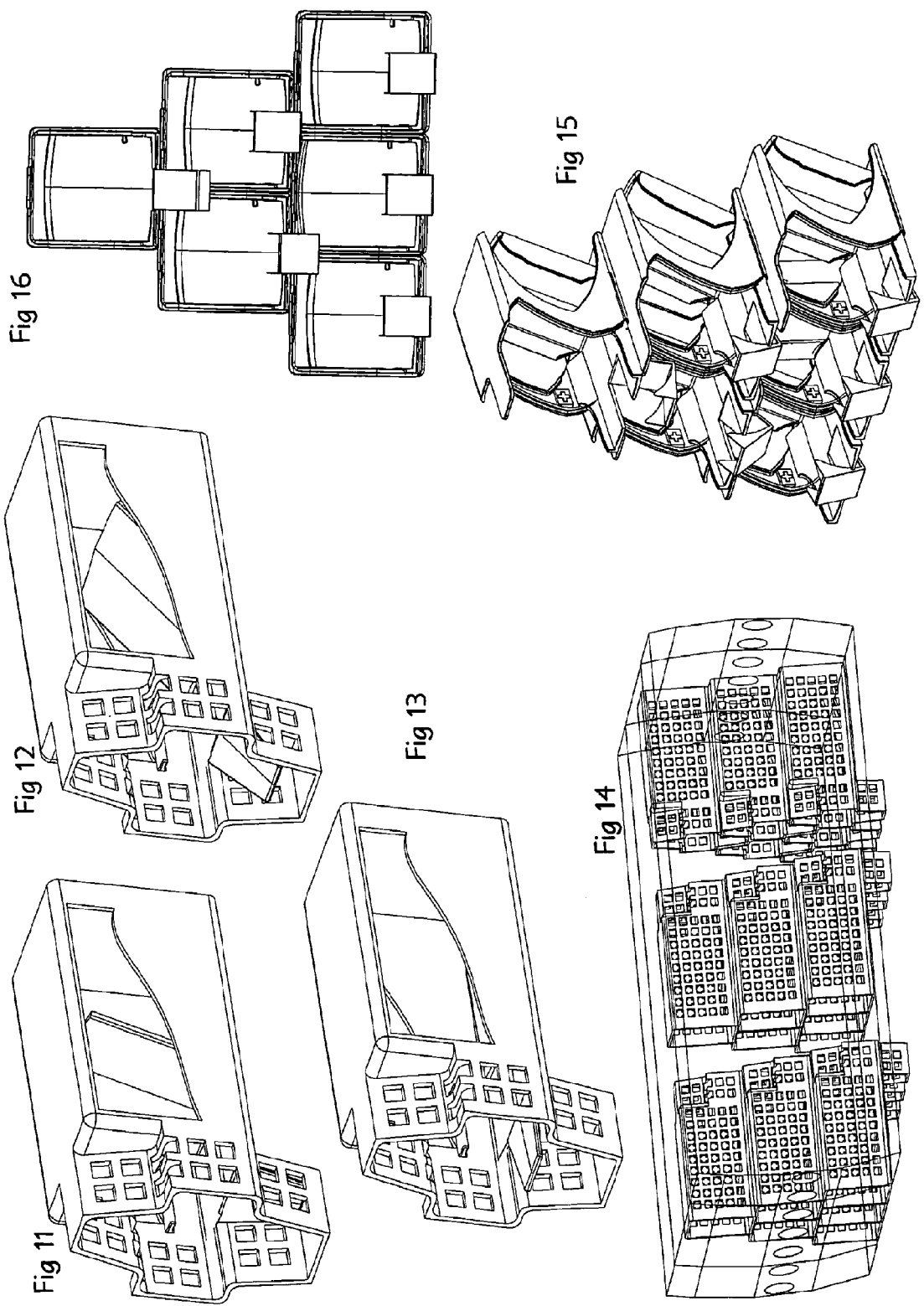

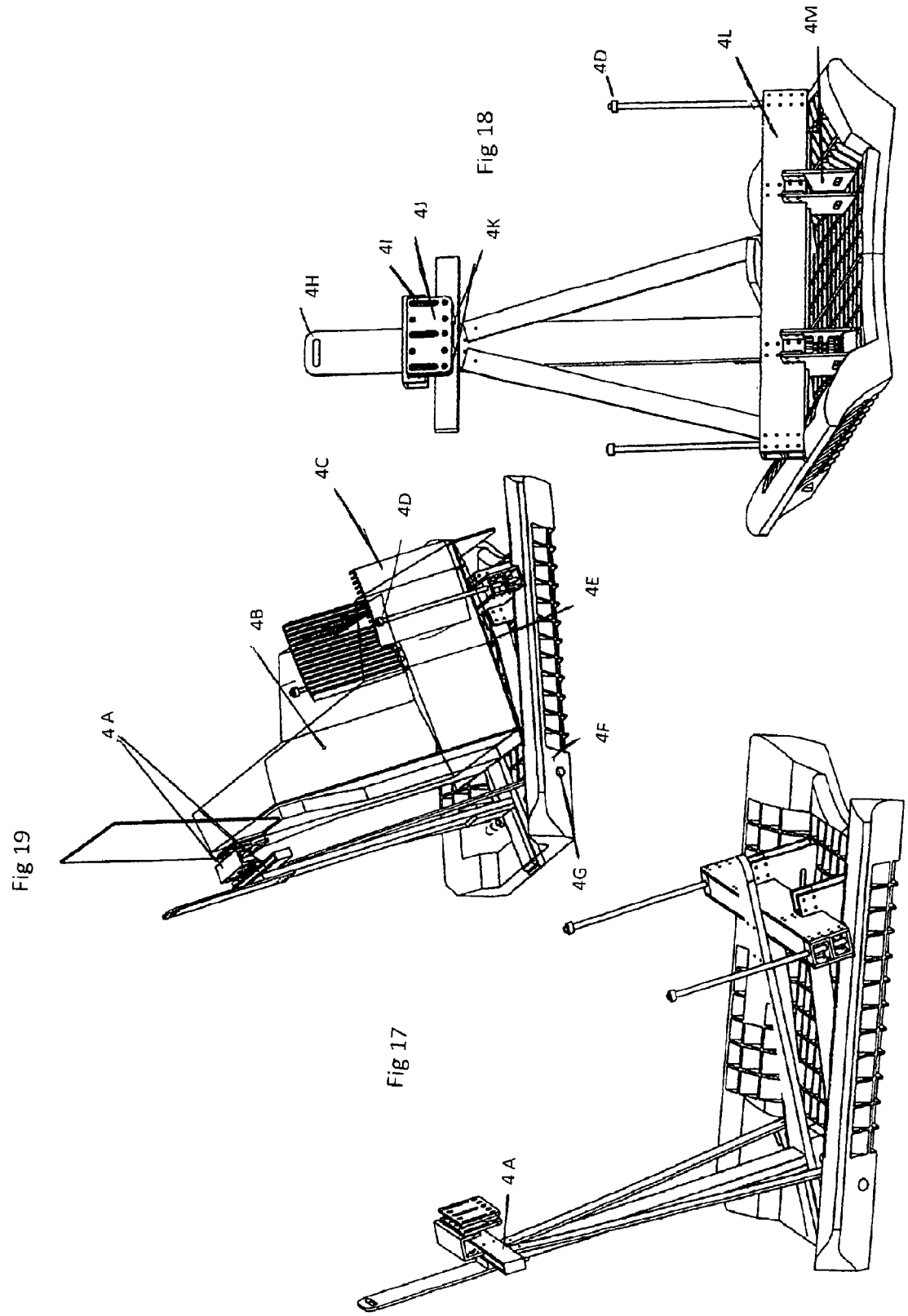

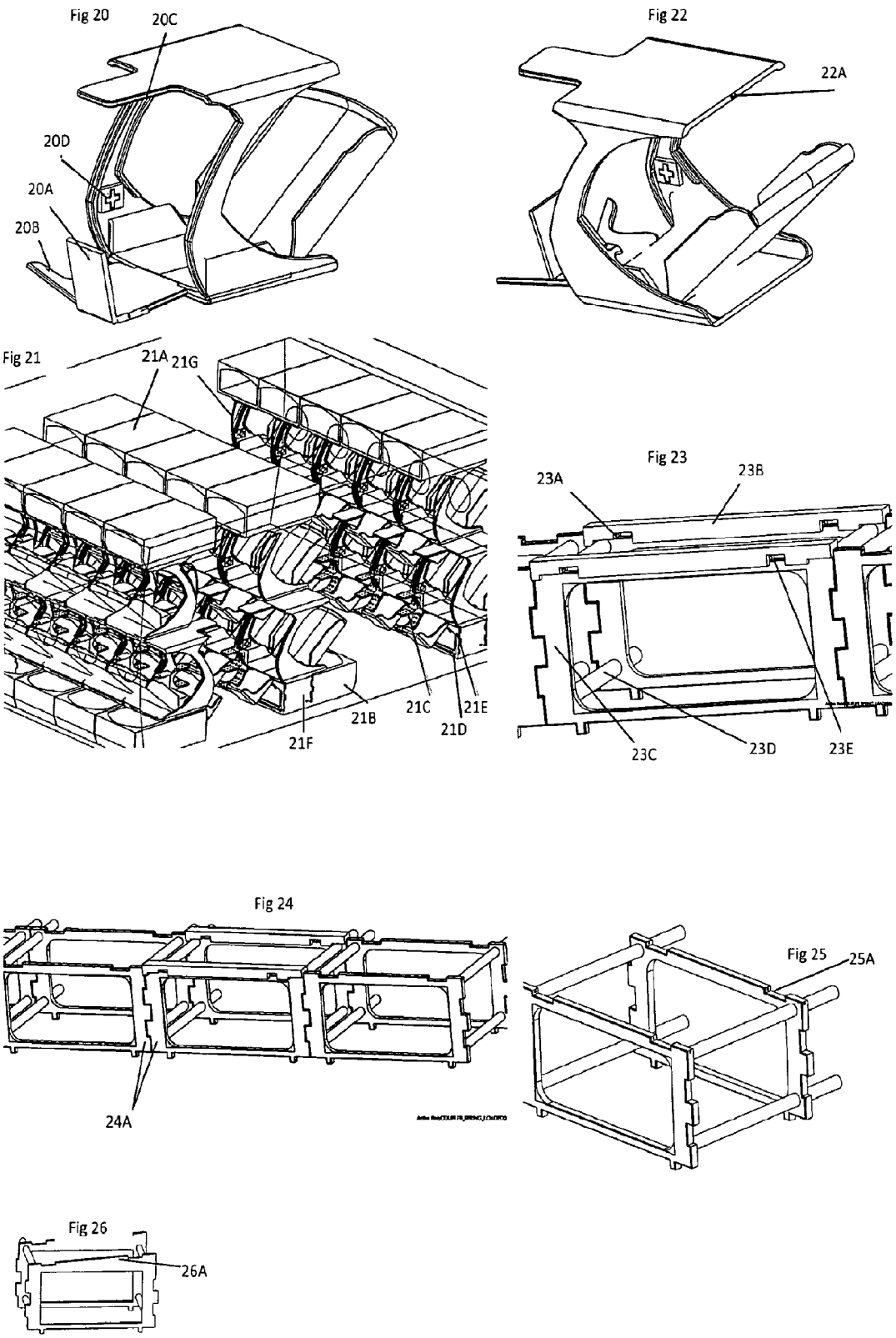

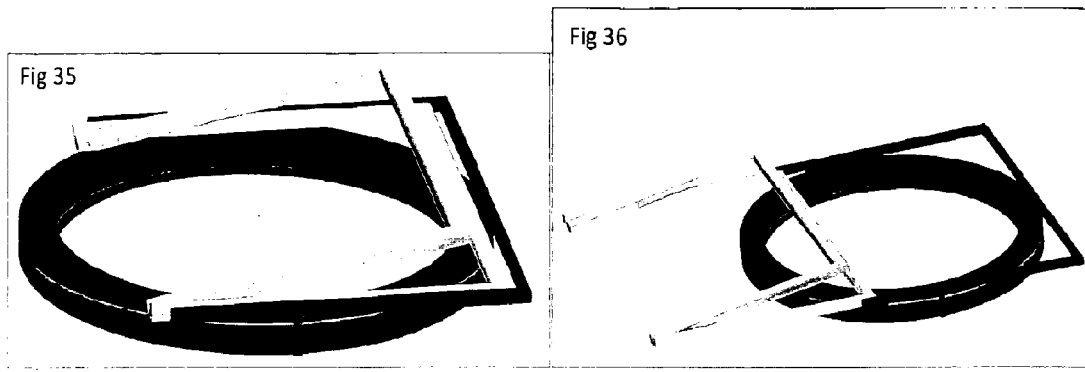
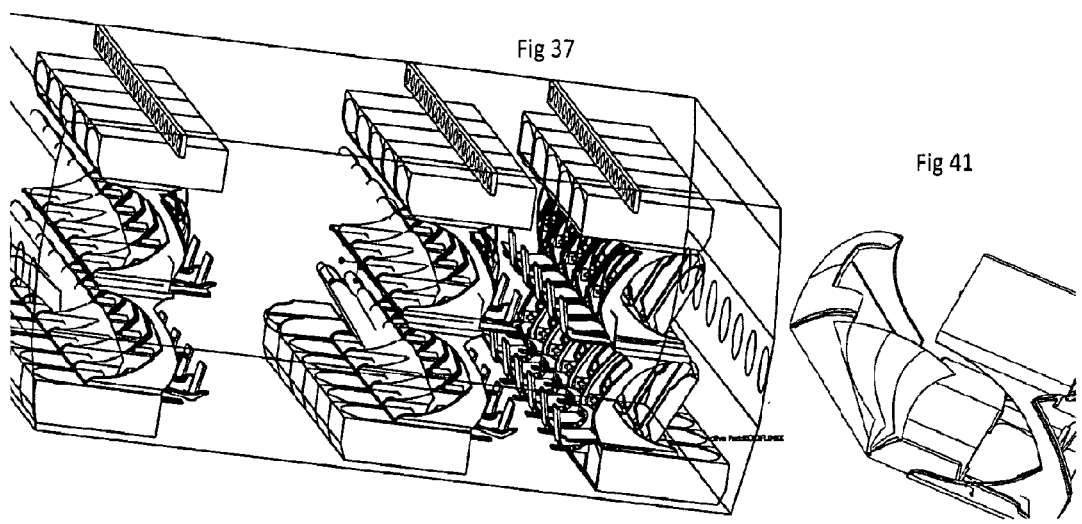
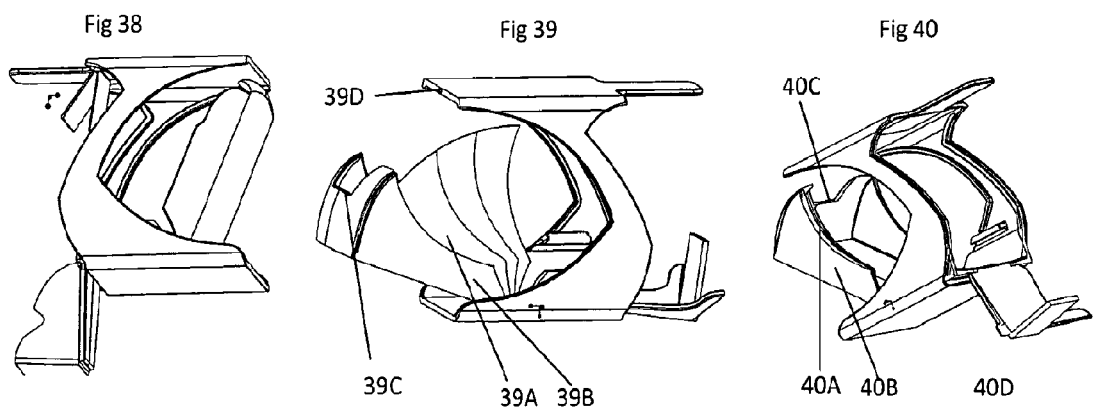

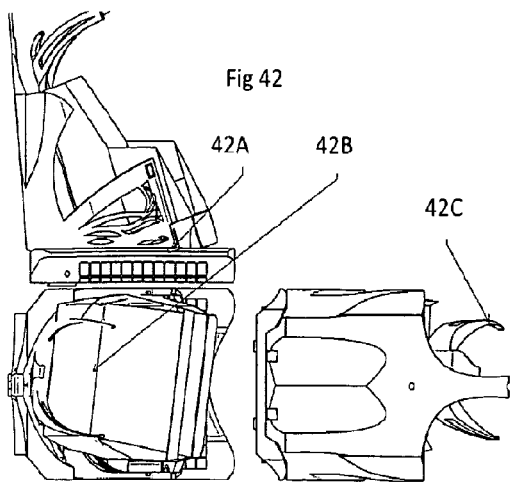
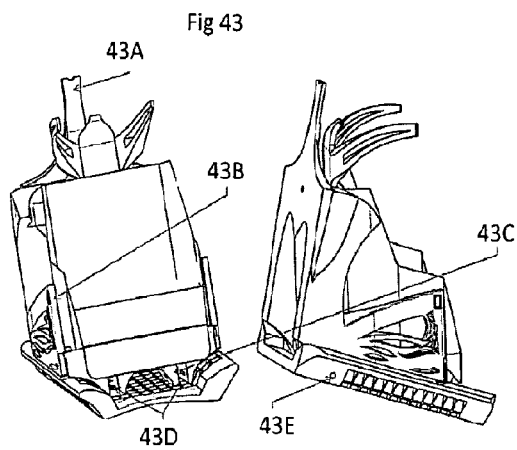
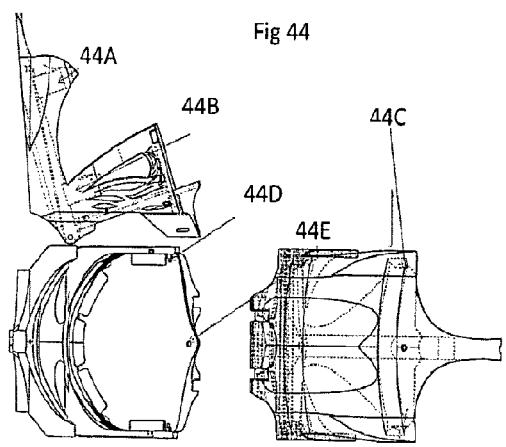
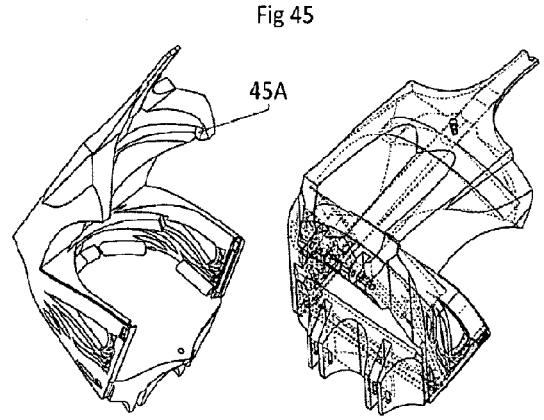
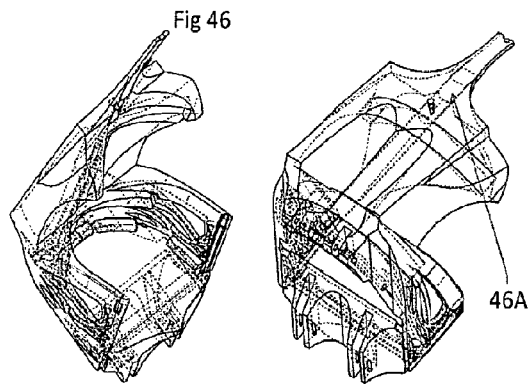
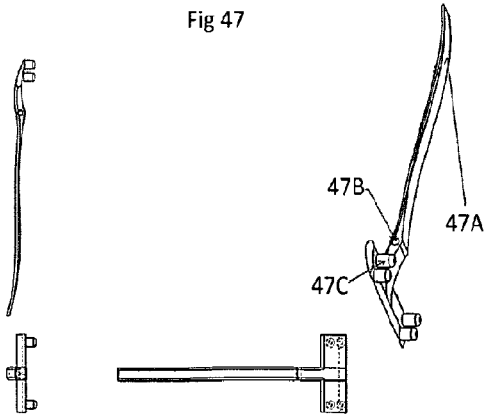

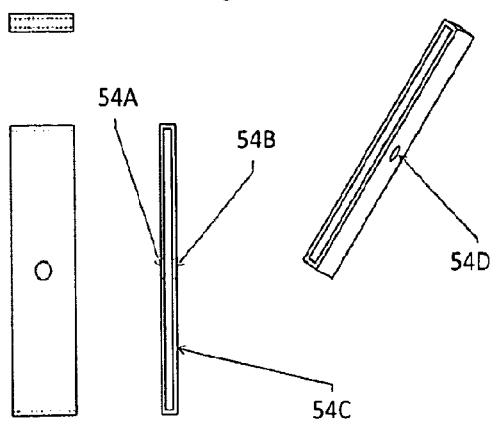
Fig 54
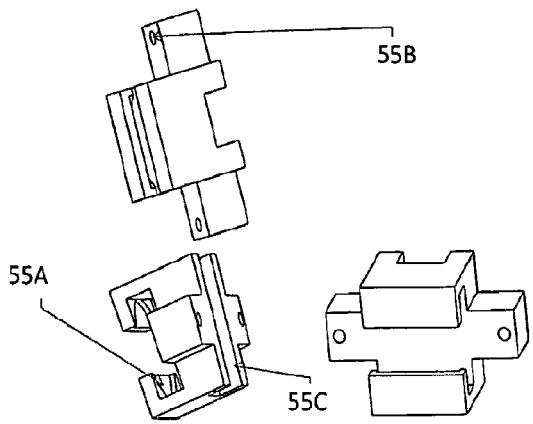
Fig 55
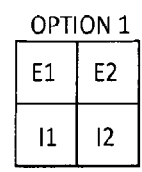
Fig 56
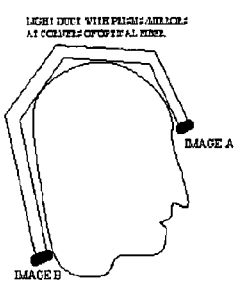
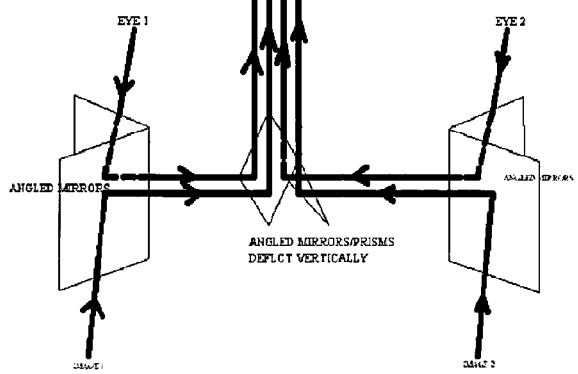
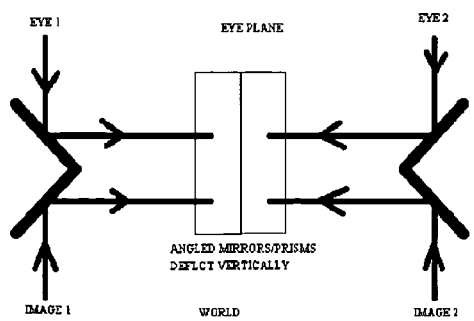

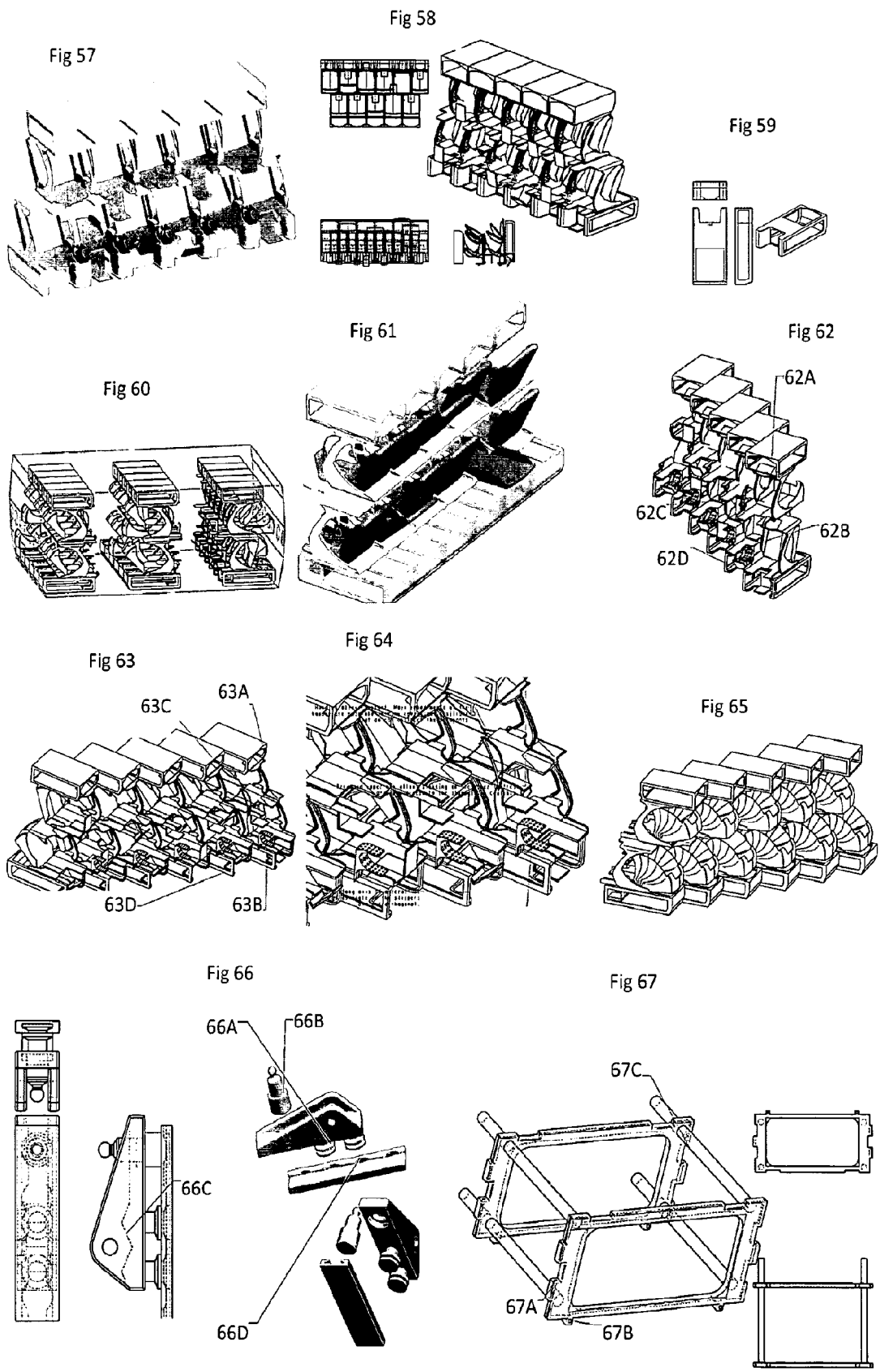

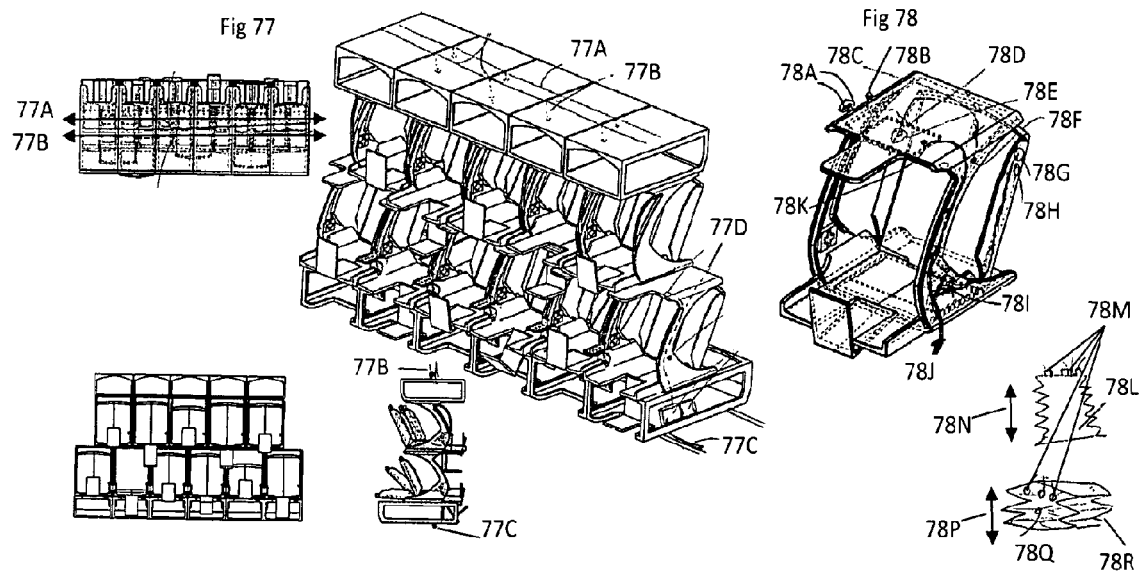
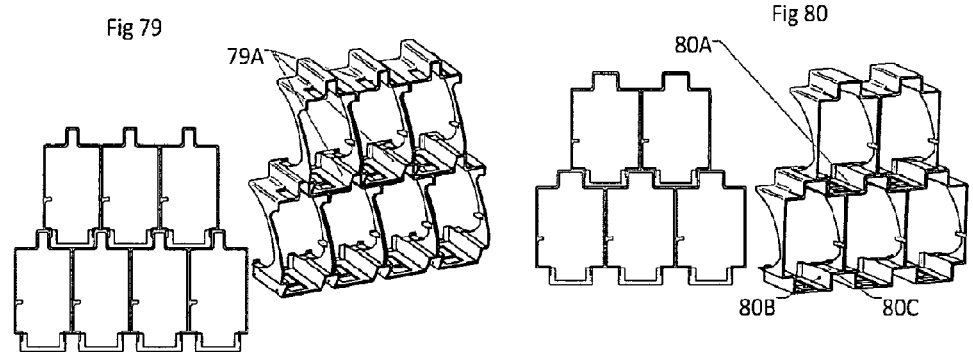
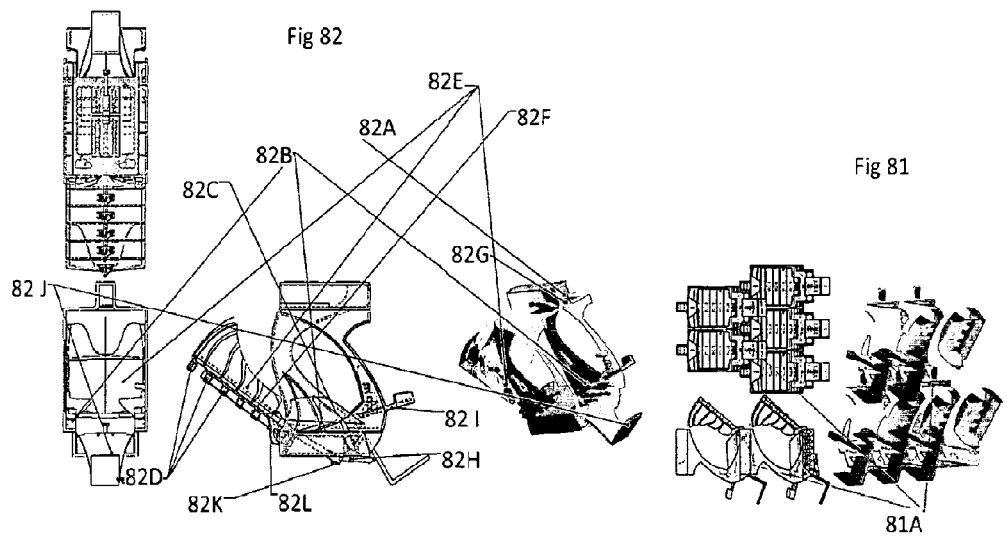

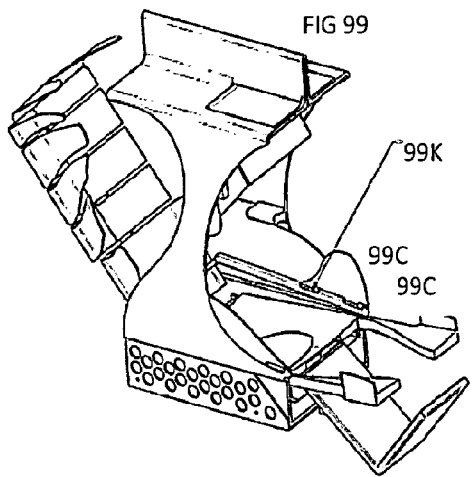
FIG 99
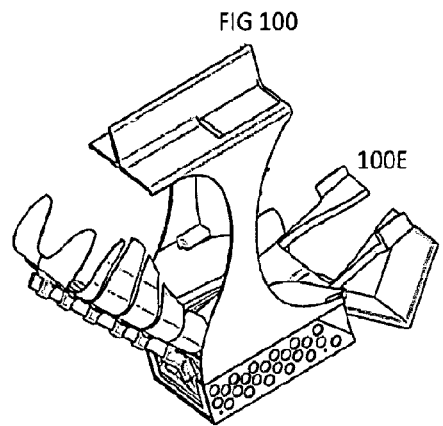
FIG 100
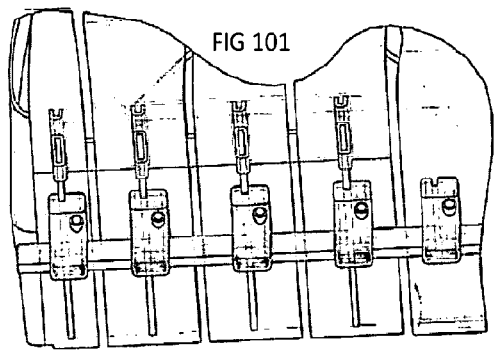
FIG 101
FIG 102
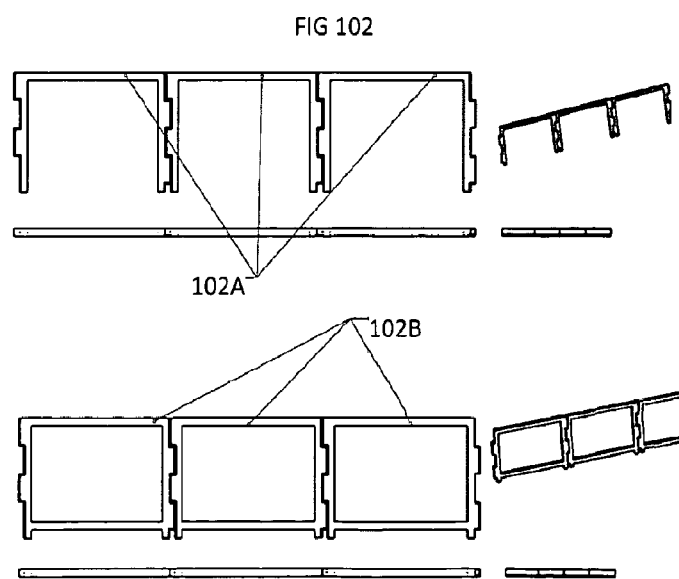

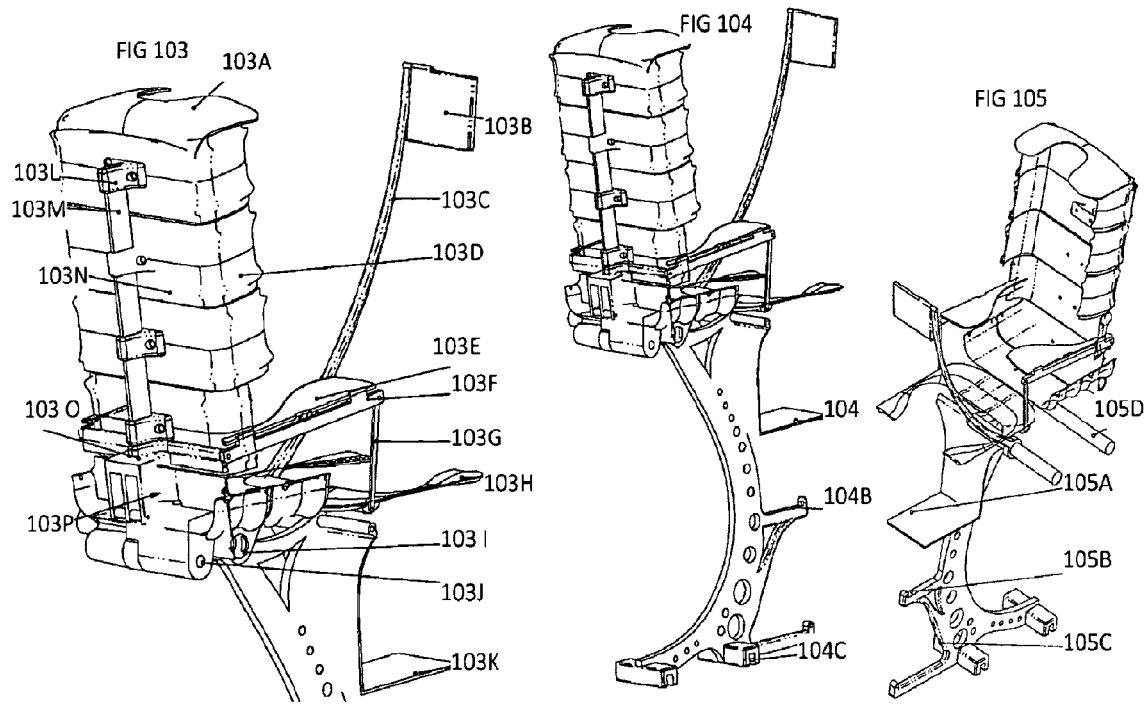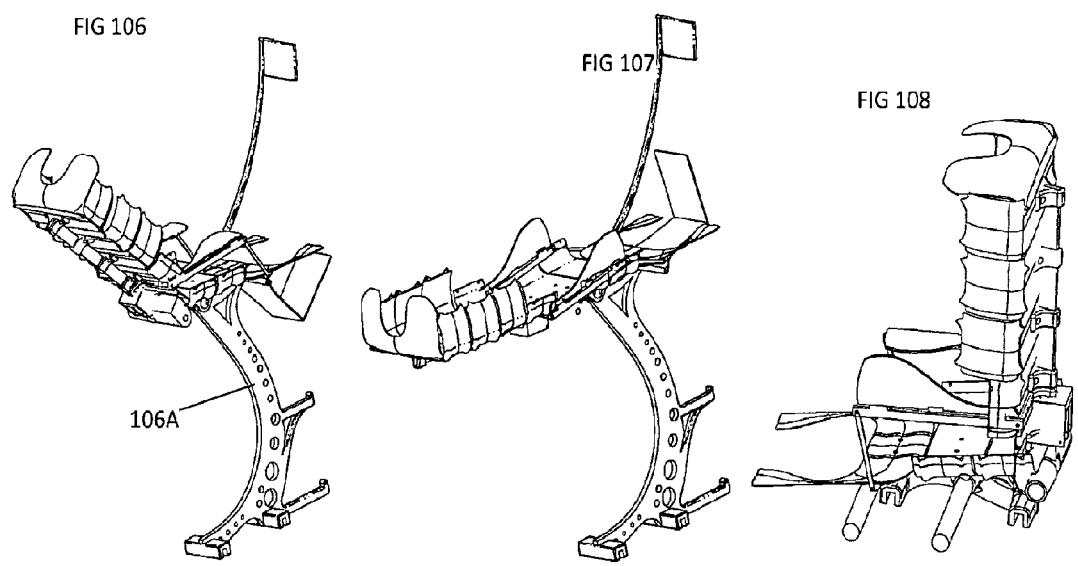

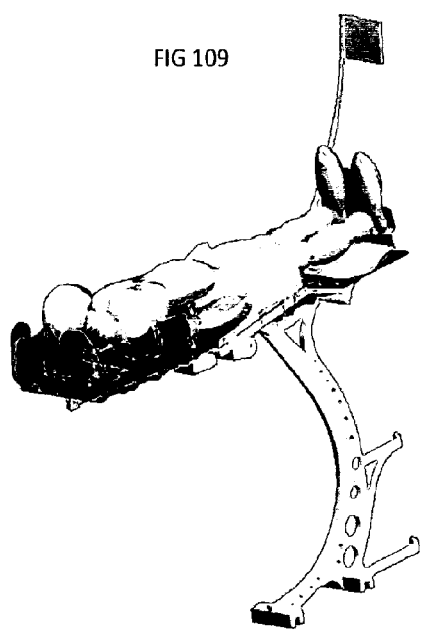
FIG 109
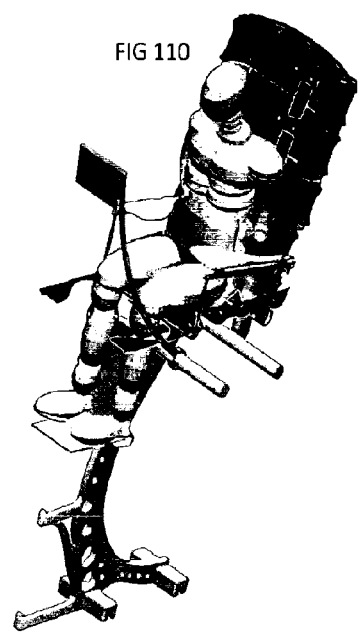
FIG 110
FIG 111
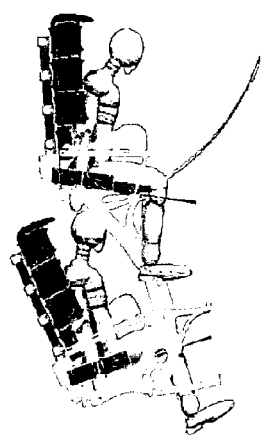
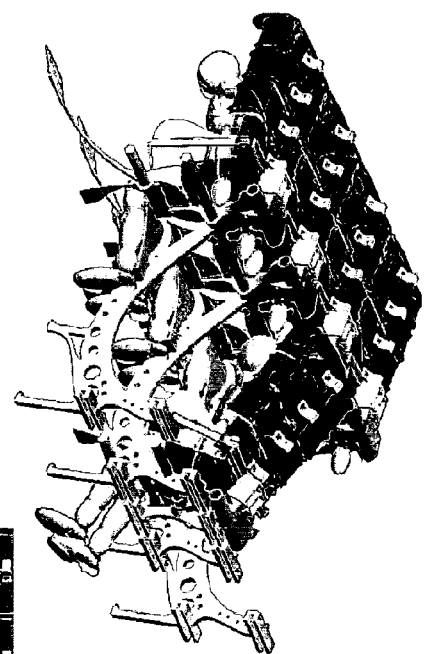
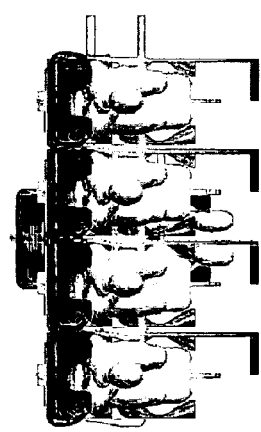
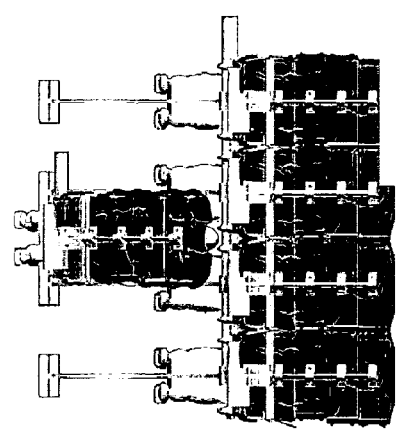

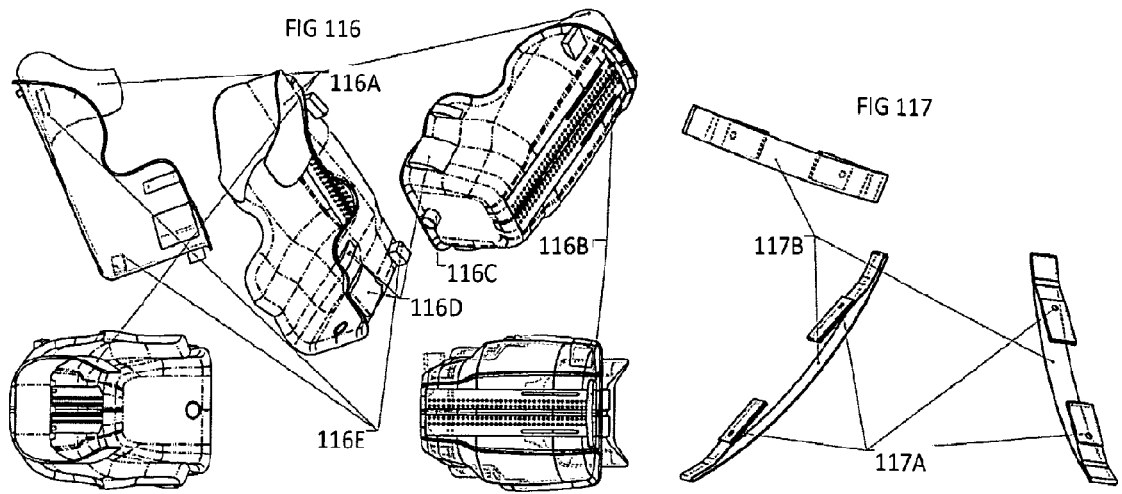
FIG 116
FIG 117
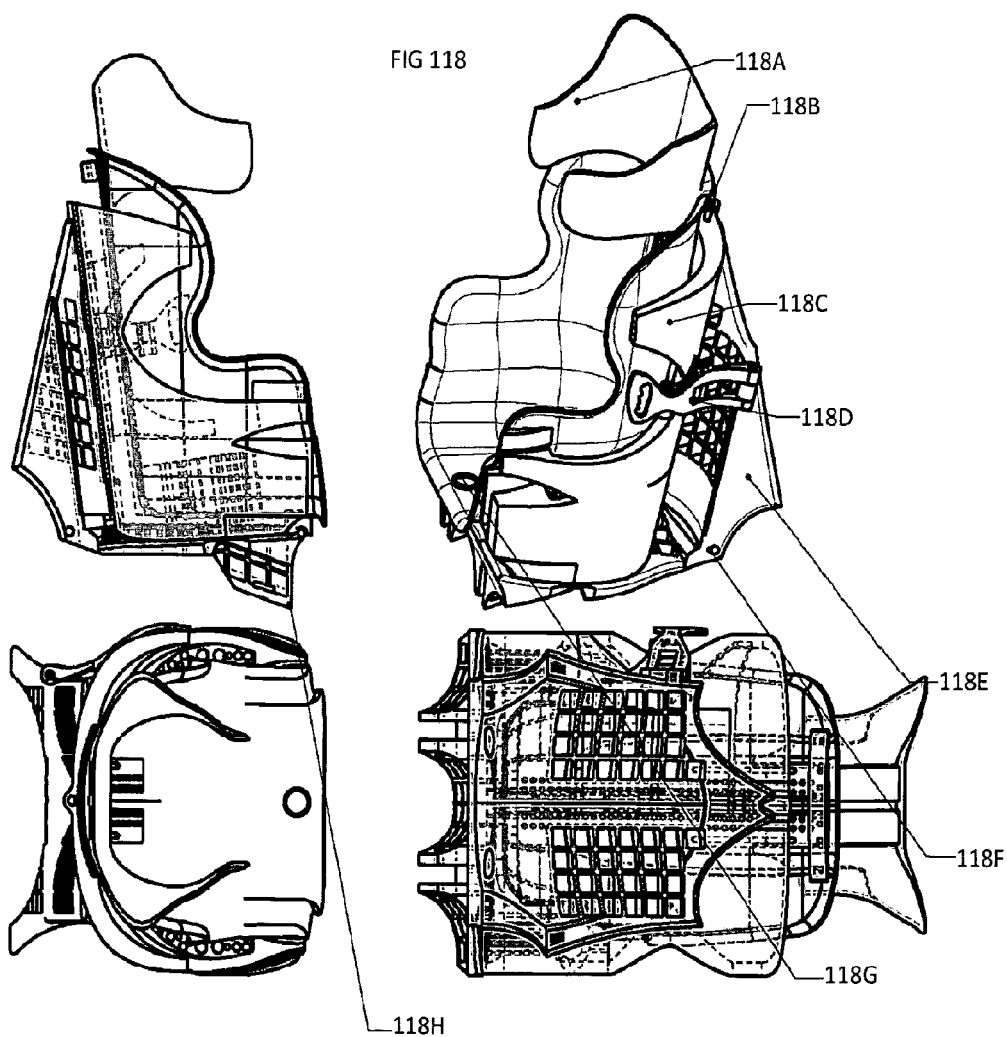
FIG 118

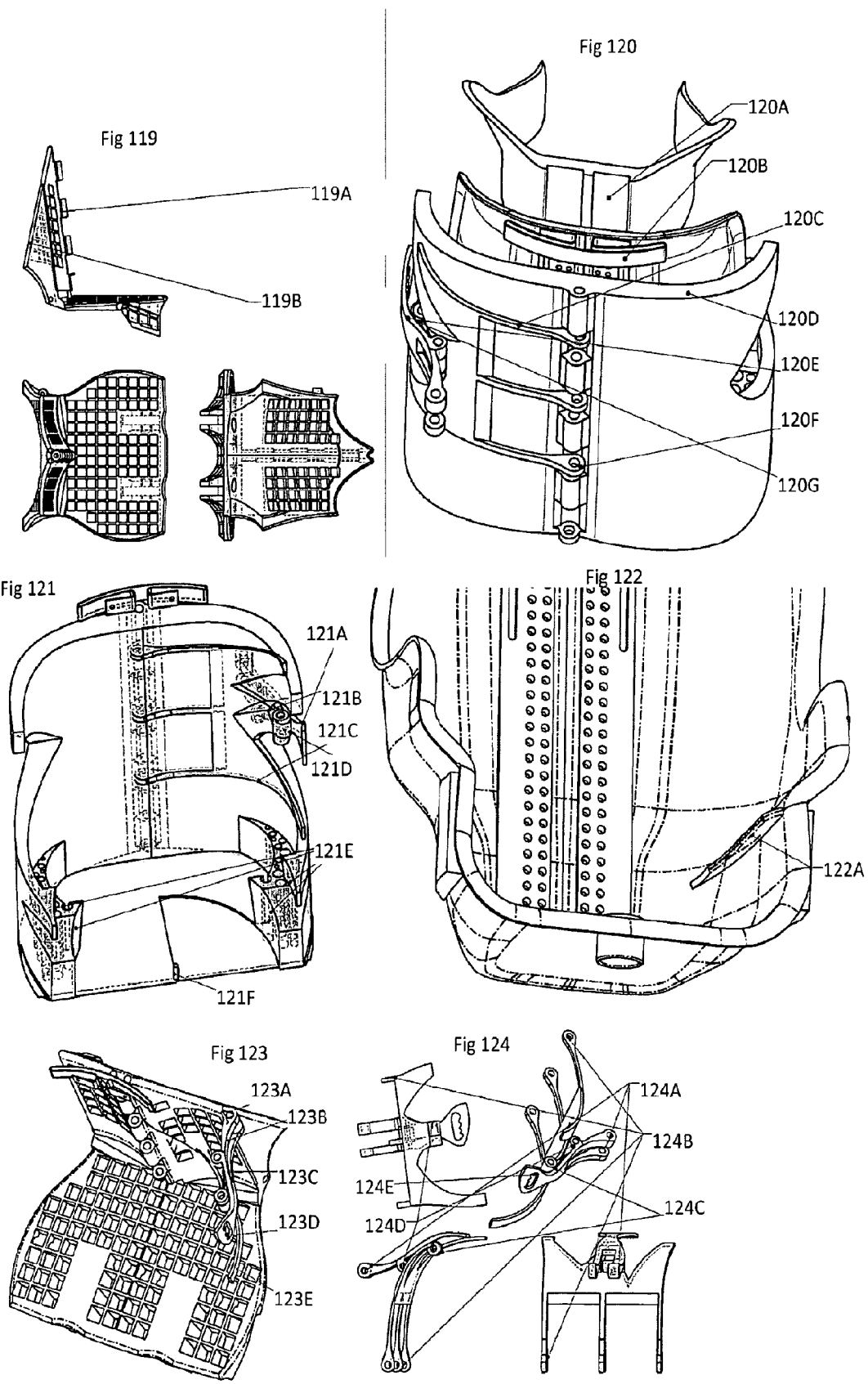

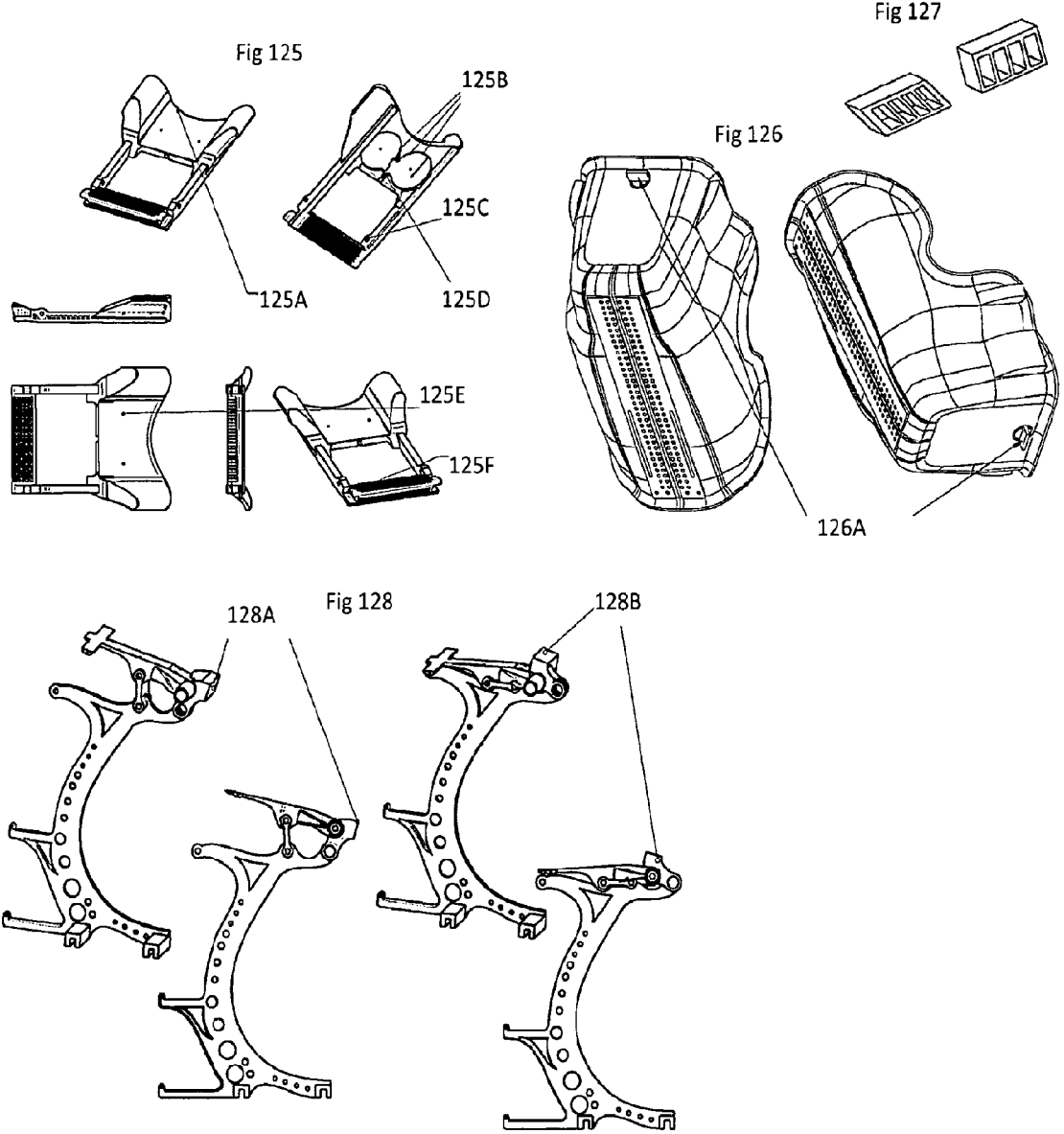

Fig 129
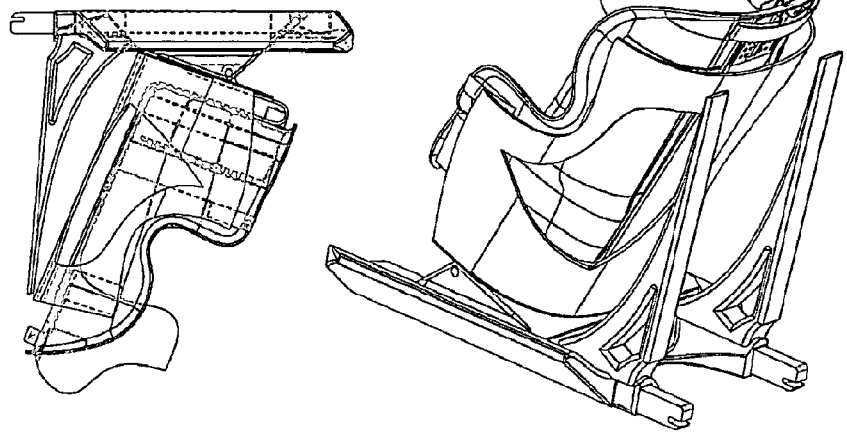
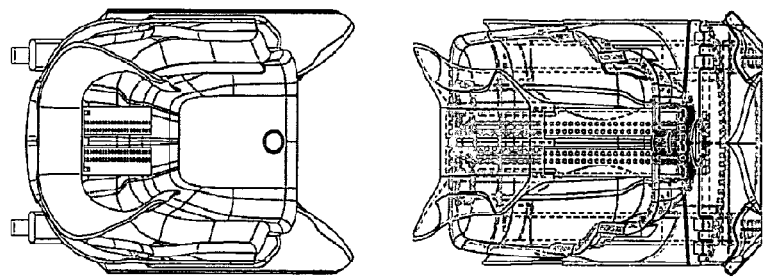
Fig 130
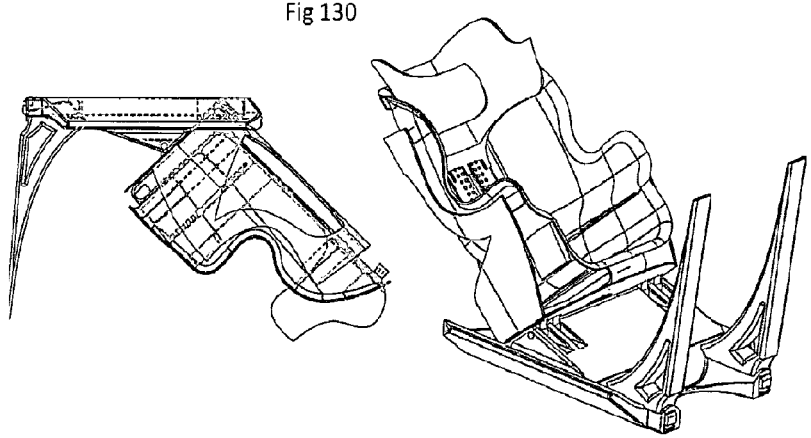
Fig 131
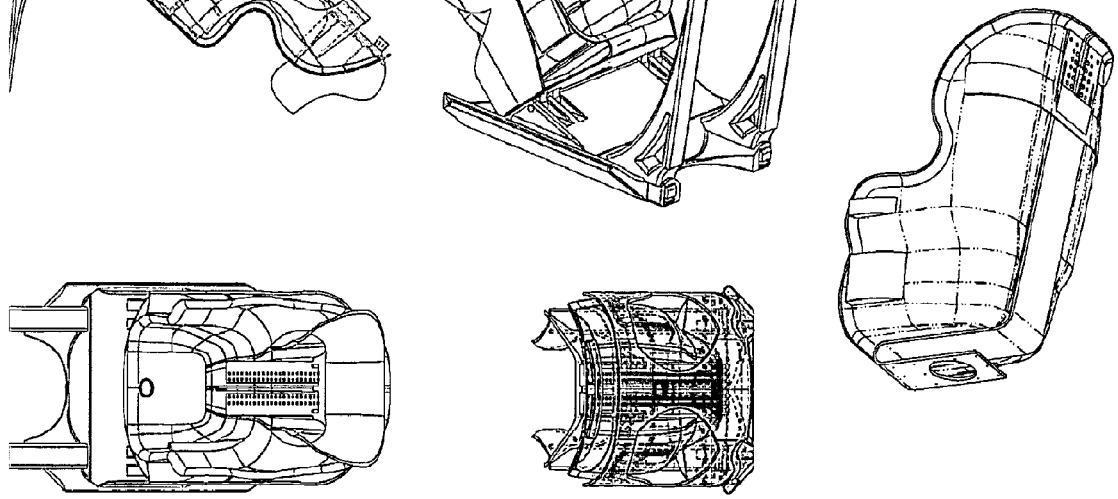

Fig 132
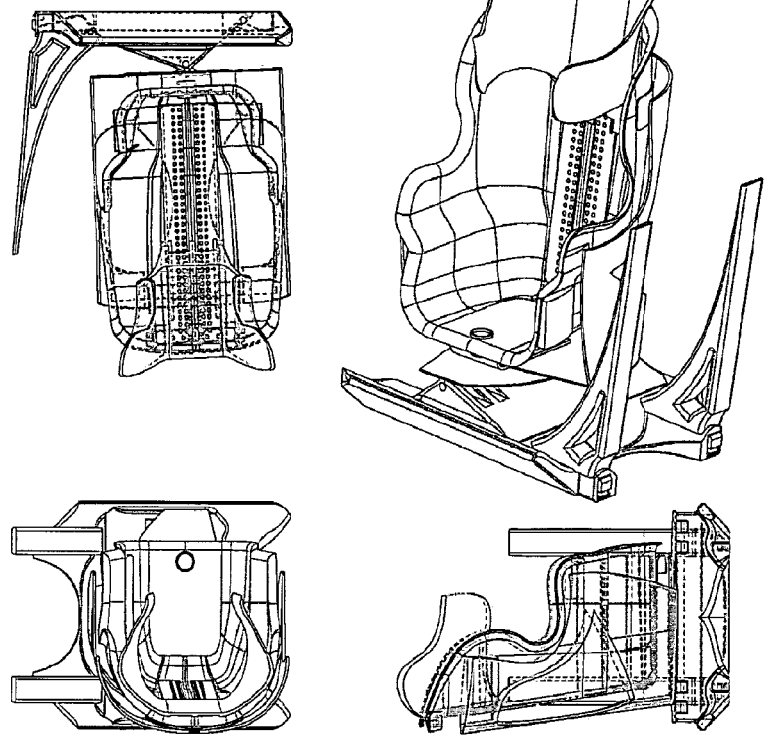
Fig 133
Fig 134
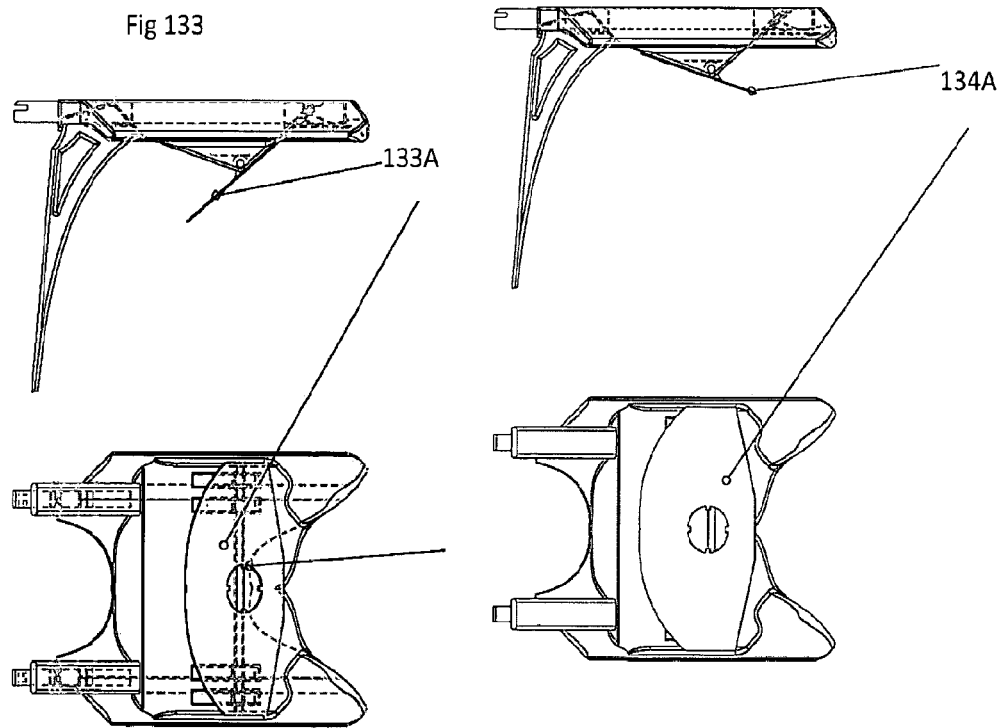

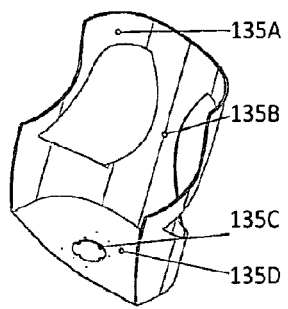
Fig 135
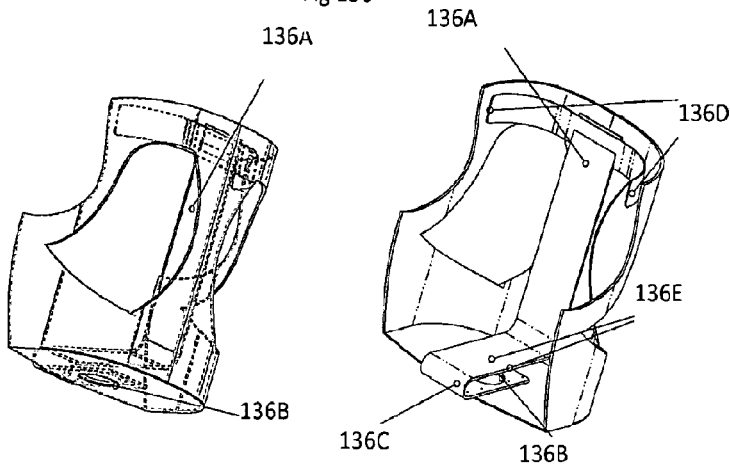
Fig 136
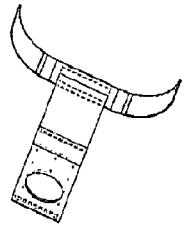
Fig 137
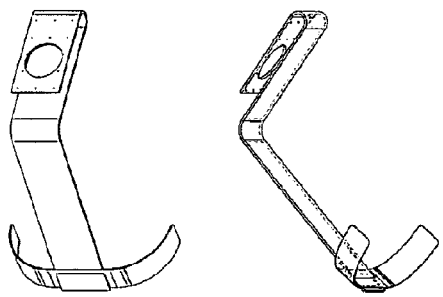
Fig 138
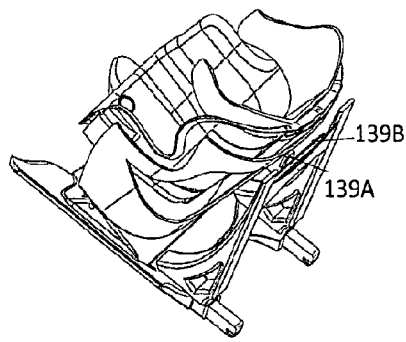
Fig 139
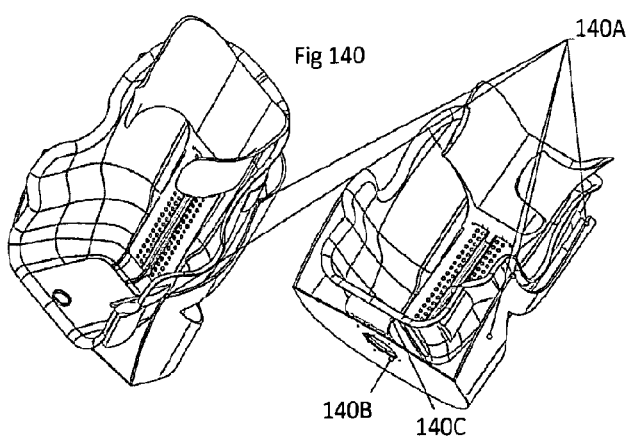
Fig 140

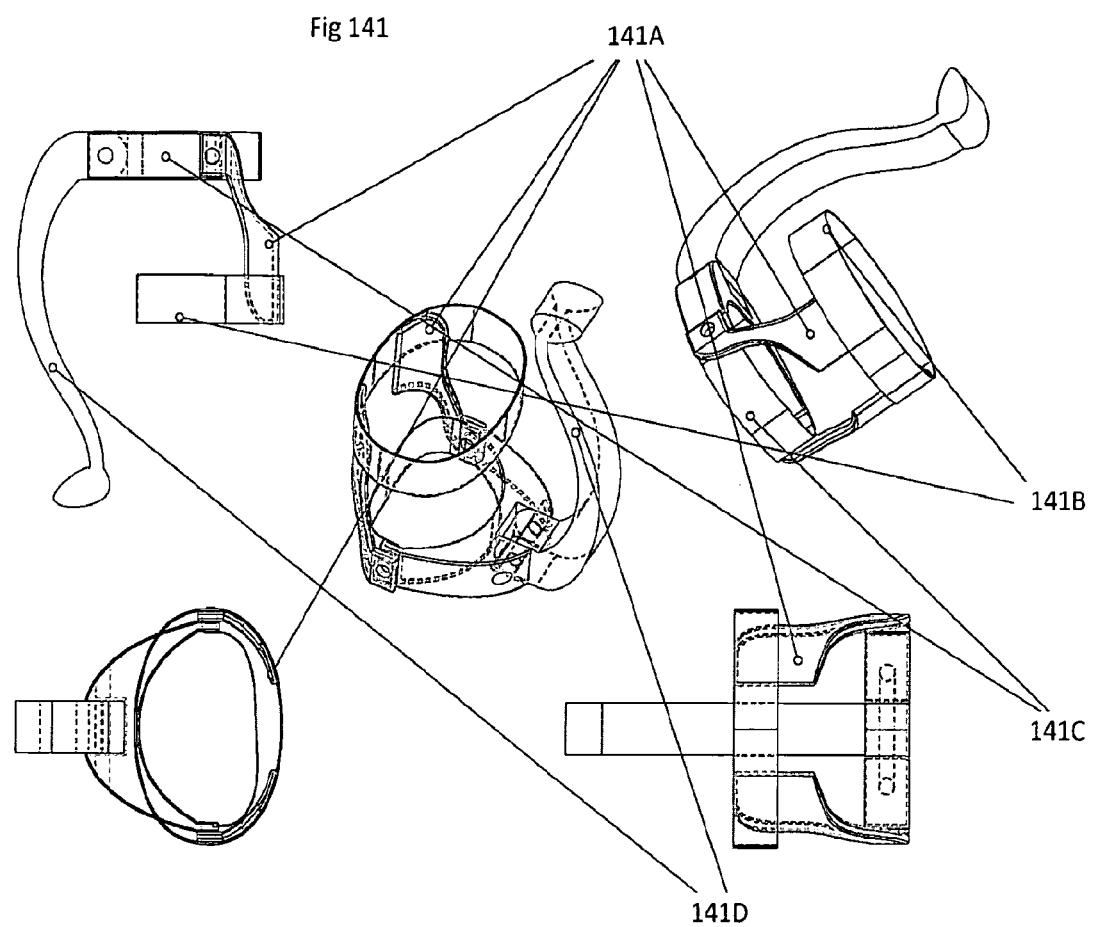

VEHICLE OCCUPANT SUPPORT

REFERENCES

This application hereby incorporates herein by reference the applications and claims priority from: U.S. Provisional application 61/062,002 filed Jan. 23, 2008; 61/066,372 filed Feb. 20, 2008; 61/072,241 filed Mar. 28, 2008; 61/072.495 fled Mar. 31, 2008; 61/123,345 filed Apr. 8, 2008; 61/188,175 filed Aug. 7, 2008; 61/191,309 filed Sep. 8, 2008; 61/198,541 filed Nov. 6, 2008, and PCT application PCT/US2008/005810 flied May 7, 2008, which claims priority from U.S. Provisional applications 60/960,620 filed Oct. 5, 2007; and 61/006,074 filed Dec. 17, 2007.

SUMMARY

The present invention provides a new structure and passenger transport paradigm for accommodating passengers in a vehicle with particular attention paid to safety, utility and provides new features for utility in a virtual navigation headset

BRIEF DESCRIPTION OF DRAWINGS

The Drawings illustrate embodiments of the vehicle occupant support that in some embodiments has provisions for dynamic responses to loading.

FIGS. 1-3 show different positions and views of the open bed cabin.

FIGS. 4, 5 show the deployment of these cabins in three tiers. (there can be 3 in the top tier if desired).

FIG. 11-13 show different views of a possible closed cabin. This embodiment has an open upper side but dosed lower side. Other embodiments can have open or closed side and top arrangement.

FIG. 14 shows another embodiment of the closed cabin architecture deployed in an aircraft cabin.

FIG. 15, 16 show tiered deployment of a possible open embodiment.

FIG. 17-19 are an embodiment of another occupant support for a child in a vehicle.

Figure 6:
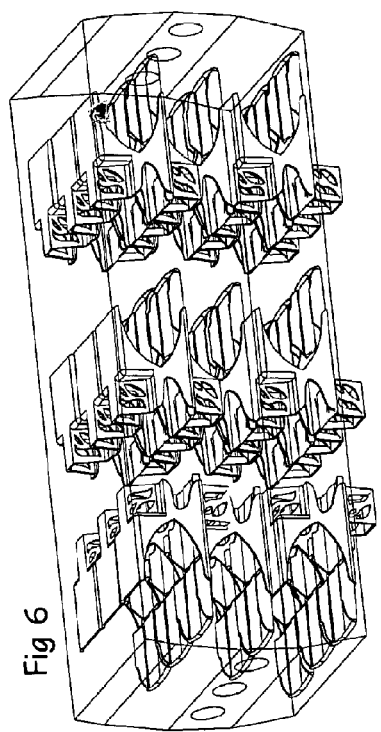
FIGS. 6-10 show deployment of tiered cabins in parallel ranks across low isles in an aircraft cabin. These embodiments use lateral deployment but the cabins can be placed at an angle to the aisle.
Figure 9:
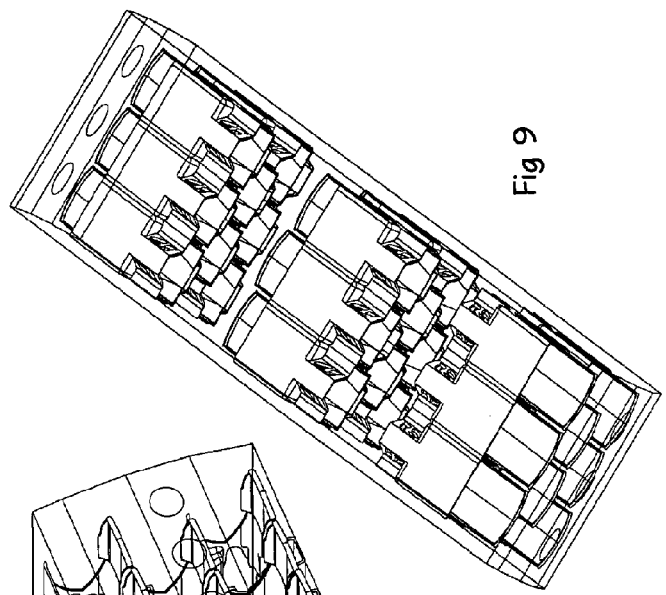
Figure 10:
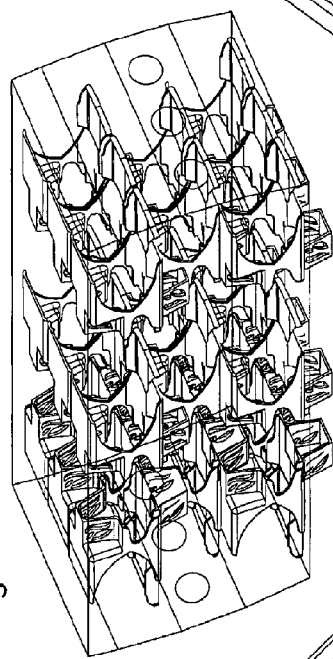
Figure 7:
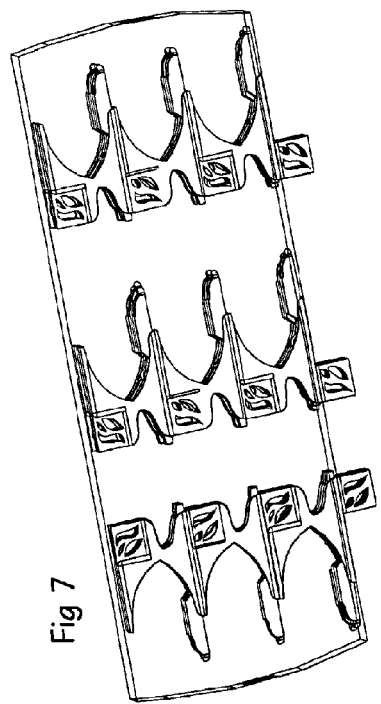
Figure 8:
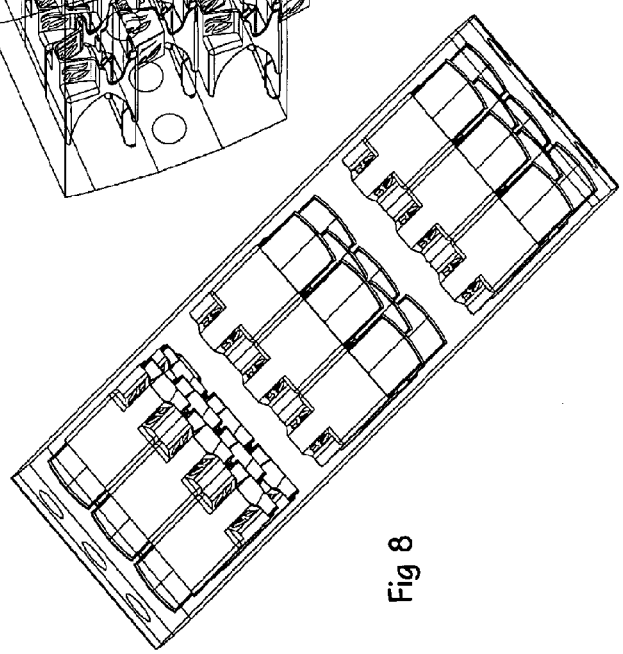

4A—Bunge Sling that allows the seat to move forwards in a front impact. One side is firmly attached to the frame, the other side is attached to the support of the vertical thrust bearings as shown; 4B—Moving Seat; 4C—Reaction surfaces on moving seat guides fixed bearings. The surface may have a groove that accommodates a sliding pin to ensure that there is limited vertical "lift" of the moving seat as it slides; 4D—bearing positioned to be as close to the vector of Inertial loading (passing through the center of Mass) in a lateral impact; 4E—Sliding surface of seat bottom; 4F—Base with pivot at back to allow rear facing deployment. Support Flanges (4M) can be set at different levels for changing the inclination of the seat; 4G—LateralPivot axis for fixed shell or frame; 4H—Tether Loop; 4I—Slot with spring dampers that can control the movement of the bearing (4K); 4J—Vertical reaction bearing support with slots and spring loading to accommodate pulse loading at impact; 4K—Bearing (ride on groove on back of moving seat); 4L—Lateral Brace supporting reaction bearings; 4M—Support flanges can be locked at different positions on gear (not shown) on base for rear facing deployment at the required angle.

FIG. 20 shows a relatively open architecture for the Air Sleeper. It shows an embodiment for the video screen (other positions and size are possible) and the oxygen mask door that is shown closed. The door in this embodiment is behind the screen and the latch will open the door with the screen open or closed. The Oxygen masks may be collapsible accordion type masks to save space. The Oxygen supply and controls for the latch are ducted to the main supply. Some embodiments have a modular architecture for the oxygen supply and controls which are connected to the main supply and control leads on installation of the module.

The Figure also show the life jacket in one possible position. The foot rest can be raised to provide the flat bed configuration. The side flaps are designed to fold out to allow the flat bed of full width but at the same time fold forward to ensure that the passengers in the sleepers below do not see the feet of the upper passenger. Other embodiments may have non retractable sides that will limit the width of the foot area in the flat bed position and still others may have a fan fold side flap arrangement that opens out when the foot rest is down and collapses when it is up in the flat bed configuration. 20A—Foot rest in the lower row does not need front or side flaps; 20B—Side flaps that flatten out when foot rest is up; 20C—Oxygen compartment door and Video screen deploy from the ceiling of the structure in this embodiment; 20D—Life jacket compartment.

FIG. 21 show a cabin architecture with two tiers of Air Sleepers. It also show the steps for reaching the upper sleepers and the handles to hold onto particularly for that purpose. It also shows the lower storage bin that is below the lower Air Sleeper with front and rear openings (with doors in most embodiments). Notably the rear opening can be accessed by folding forward the back of the seat. The seat back may also in some embodiments have a frame with one panel that can be opened like a door to reveal the rear opening and door of the lower bin. This will be particularly useful in flight when the passenger needs to access the rear bin. Also shown in the figure are the frames that support foot/frame that supports the Air Sleeper and are mounted at their lower edge to the feet that are in turned attached to the latches that engage the rails or tracks on the cabin floor. The support frame may in some embodiments be interlocking with the adjoining support frames to transfer loads as required. The two (or more) vertical sections are attached by link members for structural rigidity in this embodiment.

The fig shows three Air Sleeper "families" serviced by two aisles of the aircraft. The upper bin are seen—in this embodiment one for each passenger. Each having a front and rear opening (with doors in most embodiments). The family of Air sleepers on the left show the rear openings of the upper bin. These are readily accessed by the passengers from the upper row of Air Sleepers. The view shows the separate bins in this embodiment for the lower Air Sleeper passengers as well.

21A—The upper bin has rear and front access. Here one of reach upper sleeper passenger; 21B—Lower bin has both front and rear access for the lower sleeper passengers. Some embodiments of the seat backs can be opened to access the bins immediately behind and in others there is access to the bins below adjoining Air Sleepers; 21C—Steps for upper seat; 21D—Feet for attachment to tracks; 21E—Support frame side inside lower bin; 21F—Show views of the lower bin with the support frame shown (some embodiments would have the bin covering the support frame for cosmetic and/or safety reasons) and the lower row of Air Sleepers.

21G—The Handles on the upper Air Sleepers can be seen for aid in climbing up to the sleepers.

FIG. 22. shows a single Air Sleeper. (video screen and oxygen door closed). Also shows a single Air sleeper with a foot rest raised. It shows a view with a Camera for passenger monitoring. This is particularly easy to implement with fly-by-wire aircraft with networks that can include the video signals. Many embodiments will have a channel on each passenger's video screen with their own camera image so that privacy is controlled. Some embodiment may have cameras that can be moved so that the passenger has some control of what is in the field of view. Another set of embodiments can have the camera channel from one Air Sleeper available to other Air Sleepers and a microphone as well to allow passengers to communicate by video link without leaving their Air Sleepers. This may be activated in software that enables communication after consent by both Air Sleeper passengers. There can also be video conferences among many air sleeper occupants. The figure also shows a Life Vest/Jacket enclosure in a convenient position. 22A—Camera.

FIG. 23 shows a single support foot/frame with adjoining support foot/frames that interlock. They also show the Spring/damper loaded support rails on this support frame. These slide along the top of the support frame with guiding pins in the holes visible in the figs and spring dampers in the gaps shown in the figures. Such motion can damp the peak impact loadings on water or ground contact in an emergency landing.

Cross links are also shown. Some embodiments may have a variable lock position for the cross links to accommodate different rail/track spacing on the cabin floor in different air craft.

The top of the support rails are attached to the air sleeper above. In some embodiments this attachment may be pivotal to accommodate differential movement of the two (or more) support rails during impact conditions. 23A—location for spring for compression loading; 23B—Spring/damper loaded support rails in some embodiments support the sleeper above. It can slide along the support frame under compression loading of the spring to reduce peak acceleration of the sleeper and the peak loading of the seat tracks; 23C—Interlocking sleeper support frames; 23D—Cross links; 23E—Spring cavity.

FIG. 24 shows multiple support frames that are interlocked with the dovetail (other interlocking mechanisms can be used in other embodiments) Such locking transfers vertical and optionally horizontal load and results in a lowering the effects of impact forces on the rails as opposite moments of forces due to the loading of adjoining Air Sleepers during impact conditions can cancel out and optionally a bracing action of the rail and Cabin floor. (These when locked with their feet with latches to the floor rail/track they will have the strengthening effect on the floor rail of a beam that could be useful in the event of a crash.) 24A—Multiple interlocking support frames shown. Sleeper loadings are distributed as a result of the interlocking and peak tensile and compressive loadings of the feet and track mountings are reduced as a result.

FIG. 25 shows the hole for a guide pin for the spring/damper that attaches to the sliding support rail. 25A—Hole for guide shaft for compression spring.

FIG. 26 show a support frame with an angled top edge. The sliding support rail sits on this as before. On impact the support rails slides along the top edge of the support frame and rides up with the angle and therefore forces an inertial loading on the passenger in the vertical direction to lower the likelihood of leaving the Air Sleeper. The connection the Air Sleeper will have a reverse angle to ensure that the Air Sleeper will be horizontal. 26A—Angled top edge—higher towards the front of the aircraft. On impact each sleeper will ride up and create a downward force on the sleeping occupants even with a horizontal crash loading. The mating slider has a reverse angle on its surface that attaches to the sleeper to make the sleeper horizontal.

Figure 27:
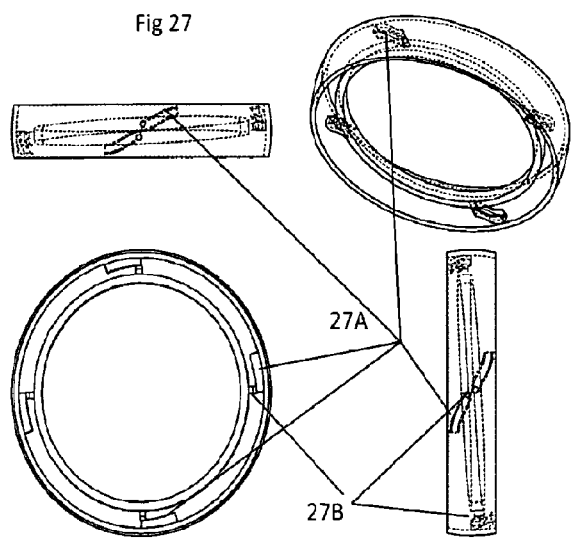

FIG. 27 Gravity Synthesizer embodiment with two parts the first is attached directly or indirectly to the seat bottom and the second is attached to the support structure. It is designed to use the inertial loading during an impact or rapid deceleration of the vehicle in the direction.

Here the Central ring is connected to the seat. Pins are at start of track. Knee end and trailing edge tracks move pin down. backrest and leading edge tracks move pin up on impact. Spring damper and end stops for this mechanism are not shown but would control the rotation with inertial loading. Other embodiments can have the inner ring horizontal in this position by offsetting the tracks. Furthermore, the outer ring (connected to the support structure in this embodiment) may have a smaller height by arranging all the tracks at the same level and offsetting the pins on the inner ring to engage them. The "rings" do not need to be rings but simply support structures for each set of guiding elements (1 &2) in this embodiment—the pins (element 1) and curved guides (element 2). Some embodiments will have multipronged load bearing pins for element-1. If element 1 is locally approximately linear the element 2 can be wider. Inner and outer positions of rings may be reversed for supporting the air sleeper vs. attachment to the support structure. If the element 1 is non-linear as shown the contact is usually approximately a line, point or roller contact. Also male and female structures of element 1 & 2 may be reversed. Many embodiments will have additional contact surfaces between the two rings to stabilize their motion i.e. support forces orthogonal to the guided direction. The figure shows the normal position. Central ring connected to seat. Pins are at start of track. Knee end and trailing edge tracks move pin down. backrest and leading edge tracks move pin up on impact. Spring damper and end stops for this mechanism are not shown but would control the rotation with inertial loading. 27A—tracks: note different axial motion as inner ring rotates for the pins; 27B—Pin on inner ring.

Figure 28:
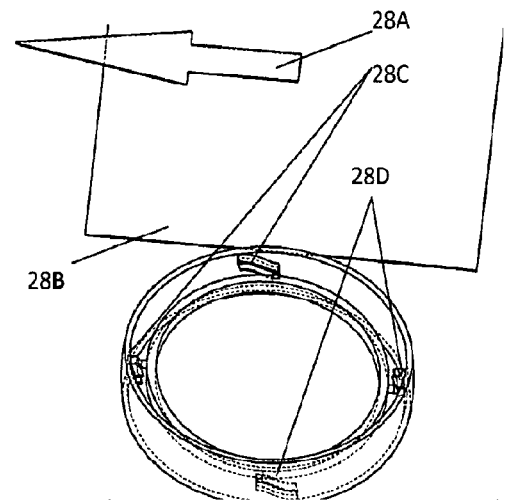

FIG. 28 Normal Position of Gravity Synthesizer: The shape of the guides will determine the vertical acceleration of the occupant at different points on the Air Sleeper during impact. This acceleration will also be dependent on the horizontal crash acceleration pulse shape. Show the position of the pins on the tracks. 28A—Direction of motion of aircraft/vehicle; 28B—Seat back location when in flat bed position (head end at top); 28C—Track leads pin up on impact; 28D—Track leads pin down on impact.

Figure 29:
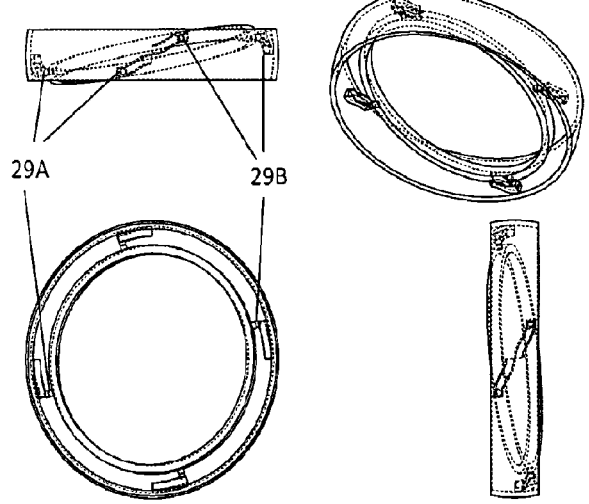
Figure 30:
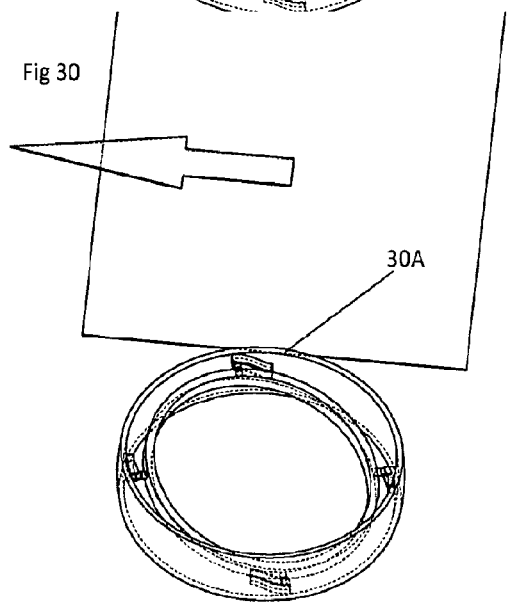

FIG. 29 30 Show the Impact end position. What is not show is spring damper arrangements that will control the motion along the guides.

FIG. 29 shows the pins at the end of the guide having moved along the guide to tilt the seat bottom of the Air Sleeper in the process. Note the rotation of the inner ring that in this embodiment is attached to the seat bottom directly or indirectly. Inner ring is tilted raising the head of the air sleeper and the fore edge side of the air sleeper with regard to the aircraft. This embodiment uses pins and guides but any other guiding mechanism can be used with the guider element on one of the rings and the guided element on the other ring. 29A—Track has guided pins down; 29B—Tracks have guided pins up.

FIG. 30 Shows another view of the Air Sleeper and in the context of some embodiments of the Air Sleeper structures disclosed herein it is important to ensure that the lateral motion of the Air Sleeper under impact loading is not prevented by the support structure for the Air Sleeper. Therefore for example in some embodiments where there is a flap to support the base of the backrest in the flat bed position, any vertical protrusions on the sides of the Air Sleeper must if present be deformable under load as the Air Sleeper rotates in a controlled fashion under impact. Notably the hip width of the Air sleeper at the seat bottom may be narrower and therefore have some clearance from the support structure and the adjoining Air Sleepers if any. This can provide the needed clearance. In fact some embodiments will use the difference in width between the hip section of the seat bottom/bottom end of the seat back and the higher on the seat back (towards the head) for the thickness of the support structure if needed. 30A—shows elevated end with regard to the head of the Air Sleeper.

Figure 31:

FIG. 31,32 Show another embodiment of the Gravity Synthesizer that is simply two sliding rings with the surface of contact an oblique section relative to the axis of the cylinders that define them. (it can also be multiple radial sections of one or more such cylinders with the same angle of the oblique section to the common axis of the defining cylinders.

Figure 32:
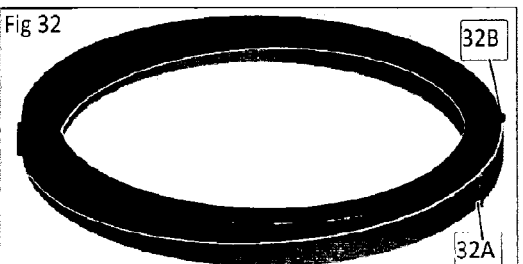
Figure 33:
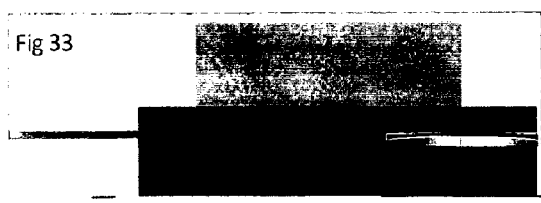
Figure 34:
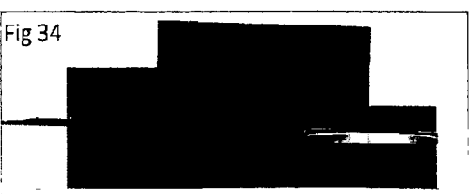

FIG. 31 show the normal position and FIG. 32 shows the impacted position that has tilted the upper ring while rotating it. 31A—Marker on static section of ring; 31B—Marker on dynamic section of ring; 32A—Marker on static section of ring; 32B—Marker on dynamic section of ring FIGS. 33,34 show the effect of the movement with planes attached to the fixed and moving sections of the rings.

FIG. 35, 36 show an additional (optional) feature of the Air Sleeper. It allows for the movement of the seat bottom backwards and forwards. The backward movement allows the occupant in the reclining or sitting position to capture more of the personal space available. There could be limit arrangements to limit rearward motion depending on the angle of recline to avoid contact with the side of the aircraft or extend into the aisle i.e. to keep each air sleeper within its designated space. This embodiment with a gravity synthesizer and an Air Sleeper frame structure for front and back movement and elevation of the knee edge of the seat bottom. It includes a pivoted frame that allows the front of the seat bottom to be elevated for comfort. Several embodiments are possible for this motion with other mechanisms disclosed in the background art.

The sliding frame that allows front and back motion of the seat bottom for comfort and convenience. Notably the rearward motion may be limited with stop mechanisms well disclosed in the background art for the condition when the seat back is reclined to ensure that there is a clearance between the seat back and what is behind it on the head side.

FIG. 35 shows the tilt frame raised that will allow the knee end of the seat bottom to be elevated for comfort and or convenience while the frame is shown in a standard or normal position, while FIG. 36 shows sliding to the rearward slide position.

FIG. 37 shows a deployment of Air Sleeper "families" or Banks with support at the top and/or sides. Often these would be support rails which may be support rails currently used for storage bins.

The roof and floor support of the Air Sleeper can strengthen the structure of the fuselage and some embodiments may use these designs for ensuring that the fuselage sections with the Air Sleepers do not disintegrate on water or ground contact. Further embodiments, may design fracture lines for the fuselage at the ends of the cabins in the event of a crash, and design underbelly rafts that can support these fuselage sections and thereby avoid the trauma of evacuation of the aircraft in a crash.

FIG. 38, 39 40 and 41 illustrate single Air Sleeper modules that can replace any of the Air sleeper modules disclosed herein.

FIG. 38 shows the open video screen and in this embodiment the oxygen access door which is behind the video screen.

FIGS. 39 40 and 41 show embodiments with the fan like side screens open in 39 and collapsed in 40, These can be manually or servo operated and are one of several possible screen mechanisms possible. The screens can also be fixed. A second fan style screen with a smaller radius and similar center can also be installed to go further forward for privacy lower relative to the Air Sleeper surface while clearing the higher obstacles if any. The screen may be installed on one or both sides of each Air Sleeper. The position so the seat back can take flat bed to upright positions. Side braces on the support structure for the sleeper back will need to be deformable if controlled rotation or other motion of the Air Sleeper is allowed under impact conditions. Such side braces may not be necessary in some embodiments.

The embodiment also shows privacy and support sides and back. Particularly useful when in the flat bed position with retaining surfaces for the occupant as well as pillows. The embodiment also shows an optional cut out at rear wall to allow camera view in all positions and/or screen/oxygen door retraction in all positions. Some embodiments may have locations where the top section of the seat back on the Air Sleeper have firmer support arrangements (in some cases foam) along the side edges for a distance from the top edge to a point level where the shoulders of most occupants will lie to resist riding up of the passenger in the flat bed position when the flat bet is at an angle to direction of the vehicle with the head ahead of the feet under impact loading conditions. Such firmer support may not even be felt under normal conditions with normal G reaction forces and the weight of the passenger but become relevant under impact loading and compression of the softer foams or other support arrangements. Some embodiments may have Air Sleeper with the seat bottom extended backwards on the slide frame.

The side sections that may need to be limited in extent to allow the rotational motion of the gravity synthesizer or other impact protection mechanism requiring a lateral movement of the seat bottom. Notably the width of the seat bottom may be designed to be less than the upper part of the seat back. This will allow some clearance of the seat bottom that is supported by the support structure to allow rotation of the seat bottom under impact in some embodiments. In some embodiments the narrower hip and seat bottom widths can enable the support structure to have side sections of considerable thickness and still allow the wider Sleeper back to utilize more of the lateral space as they are at a position that do not need the support structure. Some embodiments will allow the Air Sleeper to be retracted in to allow clearance of the head end and to be within the allowed space in the flat bed position. It also shows a possible camera position for monitoring the occupant. Notably there is a tradeoff between monitorability and privacy. The camera may be focused on the head area and a channel on the video system may carry each passenger his/her own image. The figures also show the cut out feature that also ensures that the screen and oxygen door are not blocked when the seat is in the upright position. 39A—Retractable "fan" screens; 39B—Support Sides that provide support and privacy. Particularly useful in the flat bed position as a retaining surface; 39C—Cut out on section of support side above head to ensure access to the screen and the oxygen door even in the upright position and to provide greater visibility behind the head if desired; 39D—Camera.

FIG. 41 shows the seat back in a backward extended position to give more space in the sit up or recline positions.

FIG. 42 Shows embodiment of a dynamic child seat. The position of the seat shell is during impact and is show rotated away from the side impact direction. It also shows the placement of the frame on the base and the notch that engages the frame for lateral stability. The pillow pads that support the head laterally and the rear head rest are not shown but the rotated position of the seat shell shows the left side arm of the head assembly ensconcing the head in the impact position. 42A—Notch for stability in front facing inclination; 42B—Seat Shell rotates following impact; 42C—Side support arms on head assembly support stalk show position to tilt pillow pads for capturing the head in the impact position shown.

FIG. 43 shows the embodiment of the dynamic child seat with the attachment to the tether marked and the slide bar shown with one or more pins that engage a sliding surface on the seat shell to allow rotation about the impact rotation axis. The pins (not shown) (which may be spring mounted) limit vertical motion of the seat shell. It also shows Pairs of feet on either side support the frame in front. A lateral bar (not shown) engages the slot shown and is spring loaded to be in the rear position of the slot normally in can be drawn forward manually to the front of the slot to disengage one of the multiple slots in the two towers attached to the base thereby changing the height of the front of the frame and the resulting inclination. And the pivot for inkling the seat frame particularly in the rear facing position. 43A—Attachment for tether. Some embodiments have a cross bar that is slidably (vertically) attached to the shown attachment point and with a surface that can hook over the back of the car seat. thereby providing lateral rigidity with friction loading. Moreover the cross bar may be in some of these embodiments have a tensioning arrangement to slide it down towards the car seat back and thereby provide minimal movement of the child seat; 43B—slide bar with one or more pins (not shown) that engage a sliding surface on the seat shell to allow rotation about a substantially stationary axis, The Pins may be spring mounted to minimize vertical motion of the inner shell; 43C—Pairs of feet on either side support the frame in front. A lateral bar (not shown) engages the slot shown and is spring loaded. It may be drawn forward and renegaged to one of several slots on two towers on the base (not shown) to change the inclination of the frame. 43D—towers are attached to base at these points. 43E—Pivot for inclining the frame.

FIG. 44 shows the dynamic child seat frame. The Upper and lower channel shown house spring damper assemblies—one on each side.

The Upper edge of one or both the channels that support the spring damper assembly in some embodiments has a slightly inclined top surface with a lower front edge so that when the pin or flange attached to the seat and supporting the Spring damper assembly rises on the side away from the impact it is captured by the slot preventing a rocking of the seat and channeling the energy to rotation about a near vertical axis. Also shown is the slot that houses a front brace that has a sliding surface and a pin both of which rides on a sliding surface coaxial with the impact rotation pivot shown. The pin engages the slot in the surface to prevent vertical motion of the seat at its edge during impact. This pin may be spring loaded to return the impact energy if raised, to the seat for its rotation. Also shown is the Pivot-impact rotation axis that may have a spring mount to allow a short axial displacement for redeploying the initial impact loading that can tend to rotate the seat about a horizontal axis.

44A—Upper channel. 44B—Lower channel, 44C—Upper edge of channel has slight inclined surface with a lower front edge. to keep the spring damper in the channel in the event of vertical forces upon impact. 44D—Slot that houses front brace with sliding surface (and an optional pin), 44E Pivot impact rotation axis may allow small displacement upon impact.

FIG. 45 shows the end of the upper channel that provides the reaction surface for the spring damper assembly during rotation of the frame following side impact. 45A—end of channel supports force.

FIG. 46 shows the cavity for metal reinforcement that is an extension to the tether support. the metal strip extends in this embodiment to wrap over the lower pivot hinge. This provides a rigid connection between the tether and the pivot rod at the bottom that is connected to the latches. 46A—Cavity for metal brace in structure for tensile and lateral bracing.

FIG. 47 Dynamic Child Seat—Headrest Height Adjust Arm. 1. The actuation lever in the normal position will be away from the back of the head assembly support stalk and be depressed towards the head rest support stalk to disengage the pins and move the head rest.

2. In other embodiments, with the pins located between the actuation lever and the pivot the normal position of the actuation lever will be next to the head assembly support stalk and be pulled out to disengage the pins.

In case 1. above a safety catch can be created (either pivotally or slidably attached to the stalk or the lever to fall between the stalk and the lever and color or marks indicating this position for safety.

In case 2. a safety catch may be pivotally or slidably attached to the stalk to capture (with a loop) the lever for the safe position. Coding being visible.

The Pivot for the height adjustment arm would usually be spring loaded to engage the socket holes in the normal position. The pivot in this embodiment is on the head assembly support stalk. However it may also be supported on the seat shell with multiple sets of holes on the head assembly support stalk to allow different heights.

The Actuation lever is shown.

Pins engage corresponding holes in the head rest support stalk to which the height adjustment arm is attached. It also engages multiple sets of such holes on the sheath on the seat shell containing the head assy support stalk, thereby allowing multiple positions for the height of the seat support stalk on the seat shell. 47A—Actuation Lever, 47B—Pivot for height adjustment, 47C pin for engagement for headrest height adjustment.

Figure 48:
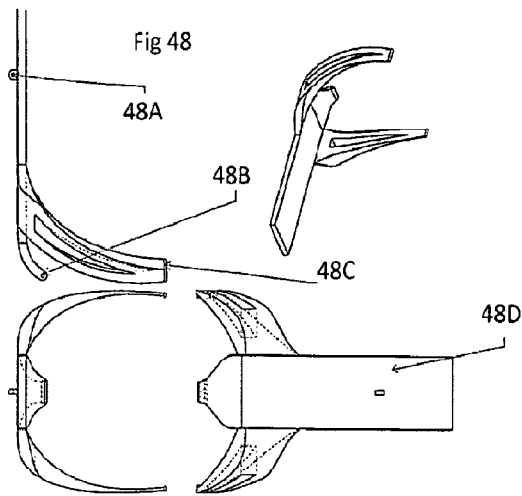

FIG. 48 Dynamic Child Seat—Head Assembly support stalk. Shows: 48A—Pivot for attachment of the headrest height adjustment arm 48B—Pivot support for attachment of the rear head rest. The rear headrest is pivoted to allow greater conformity with the rear of the head and neck. 48C—The ends of the side arms support the pillow-pads (not shown) that provide lateral support for the child's head and face. many embodiments allow the attachment to be pivoted about a substantially vertical axis so that it can tilt back on side impact thereby containing the head. 48D—Pin holes (not shown) will be arranged in a line to accommodate the pins on the headrest height adjusting arm. These same pin holes will engage multiple sets of holes on the sheath at the back of the seat shell to allow multiple positions of the Head Assembly Support Stalk on the Seat shell.

Figure 49:
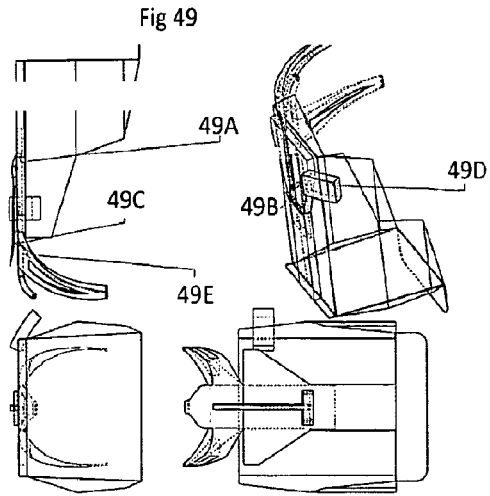

FIG. 49 Dynamic Child Seat—Seat shell assembly. Shows: 49A—Pins that may engage one or both sides of the sheath on the seat shell housing the head assembly support stalk. 49B—Inner edge of spring damper assembly which is secured to the seat shell. Some embodiments have a flange that engages the slot on the frame with a small clearance. Some embodiments has the inner edge supported by flange than may slide be displaced up or down to allow the spring damper free movement for rotation of the inner shell for egress and ingress.

49C—Headrest height adjustment arm, 49D—Position in some embodiments of the right spring damper assembly. Similar assemblies will be on the left and at the lower position as indicated on the frame.

Figure 50:
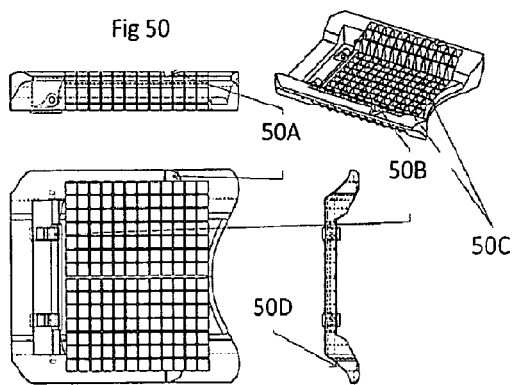
Figure 51:
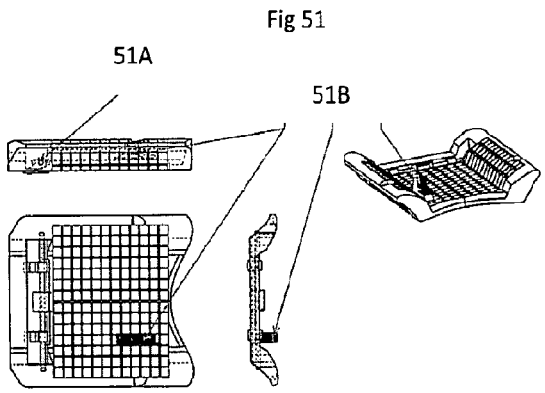

Head assembly support stalk FIG. 50,51 Dynamic Child Seat—Base. Shows: 50A—Notches that capture frame in lowest (front facing) position, 50B—Pivot for tilting the frame when seat is in the rear facing position. 50C—Pair of towers with notches that engage a lateral bar on the frame for different inclinations of the frame on the base. The frame will pivot on the rear Pivot. 50D—Sides beveled for car seat shape. 51A Pivot, 51B—Towers.

Figure 52:
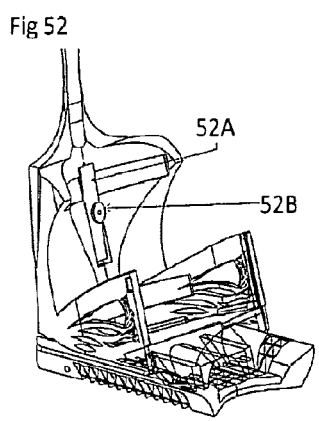

FIG. 52] Dynamic Child Seat—Bunge Sling Assembly. Shows: 52A—The Bunge Sling that stretches out on front impact to damp acceleration. Rear center of Bunge sling is attached to the frame. 52B—The Bunge Pin that slides inside Bunge Pin Slot attached to seat shell. It is enabled to engage the slot upon front impact to provide a reaction force, but enabled to slide out upon lateral movement of the back of the seat as in a side impact. Some embodiments of the slot have a depression on the inner surface of the slot that the pin will move into on motion of the slot forward on front impact, thereby securing the pin further in the slot.

Figure 53:
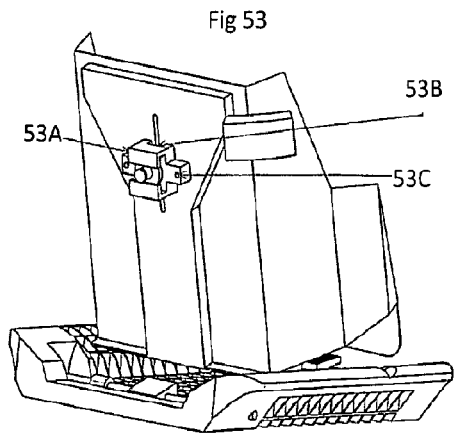

FIG. 53 Dynamic Child Seat—Bunge Sling Assembly. Shows: 53A—Bunge slot that engages Bunge pin during front impact and allows the bunge pin to slide out upon lateral movement of the seat back as in a side impact. 53 B—Bunge slot has a cut out to avoid contact with the headrest height adjustment arm, 53 C—Support of the Bunge slot to the seat shell straddles the head assembly support stalk and its housing on the seat shell.

FIG. 54 Dynamic Child Seat—Bunge Sling. Each of the two side that in their center attach to the frame and the seat shell respectively.

One or more points for securing bunge sling some embodiments use a hole and securing pin.

The sides of the Bunge sling stretch out as the two support points are pulled apart. The materials are designed to provide energy absorption and elastic properties to minimize injury for the occupant. 54A attached to seat, 54B—attached to frame, 54C—sides bend as two secured points move apart, 54D—points for securing Bunge (may be a hole and pin)

FIG. 55 Dynamic Child Seat—Bunge Slot. Shows: 55A—The depression in this embodiment engages the Bunge Pin on front impact to secure it further. The normal position of the Bunge pin will not engage the depression and therefore allows it to slide out upon lateral movement of the inner shell.

Support points on Shell. 55B—Bunge slot is secured at points that straddle the head assembly support stalk. In other embodiments it can be secured closer to the center if slots are created in the head assembly support stalk. 55—Cut out prevents contact from the head rest height adjustment arm.

FIG. 56 Virtual navigation device. Shows: the use of a light corridor to channel four image signals (in this embodiment but possibly more or less) that are used for the virtual navigation device disclosed in the references. Two fields are derived from a World View displaced by a distance that is substantially the inter eye distance and two of the fields are derived from views of the eyes and appendages of the user. These four channels are deflected using mirrors/prisms/lenses/optical fibers to become image A that is a composite image. There are several possible arrangements of the constituent images in the image A two options are shown in the figure. The embodiment in the Figure uses plane mirrors for the deflection of the image fields to the composite image A. However this in no way limits the scope of the invention that can use non-linear mirrors, lenses, prisms or optical fibers for the purpose. In some embodiments there may be a need for channeling the light corridor to the back of the head or any other location for better utility of the user. The Figure illustrates an embodiment that uses mirrors to transfer image A to image B. The invention is in no way limited to mirror for this stage and can utilize non linear and linear refractive and reflective elements as well as optical fibers. E1—EYE1, E2—EYE2, I1—IMAGE1, I2—IMAGE2.

FIGS. 57, 58, 60 illustrate a "family" or bank of Air Sleepers. These embodiments illustrate a upper bin for each occupant on the upper sleeper and a lower bin for each occupant in the lower sleeper (wider or narrower AirSleepers and/or bins can have shared resources among them). Both the lower and the upper bin have rear and front access with sliding pivoting doors or drawer structures. Moreover these embodiments show steps for egress and ingress from the upper sleepers. Handles may be deployed in some embodiments particularly to help upper sleeper occupants to egress and ingress. These handles may be attached on the edges of the sleeper structure or other locations that do not impede the movement of the sleeper. Safety Vests in some embodiments may be stored on the side of the sleeper as shown in some of these figures.

FIG. 59 shows an embodiment for the bottom bin for storage that has a drawer in front and a sliding door at the back for easy access to stored materials.

FIG. 61, shows the family of Air Sleepers with the rear access to the top and bottom storage bins clearly visible. The top bins can be reached by the upper sleeper occupant by simply reaching up while in the sleeper. The best solutions will have doors that slide or pivot away from the occupant so there is easy view of the stored contents. The lower bin rear opening can be accessed either directly by folding forward the seat back or in some embodiments the back cushion (or a part of it) of the air sleeper/seat may pivot on its side edges and be split in the center and therefore be enabled to open upwards as a pair of doors to reveal the bin opening below (with a sliding door if desired).

FIG. 62, 63, 64, 65 show an angled deployment of the Air Sleepers. As possible in all deployments of the Air Sleepers, the upper bins may be recessed back to allow the upper Sleeper occupant to stand on the foot rest and access the upper bin from opening. These figures also show some embodiments of handles to help the upper occupant egress and ingress. Also shown in these figures are gradually recessed steps for egress and ingress to the upper Sleepers. 62A—Recessed upper bin allows standing on the upper footrest for easy access to the upper bins in front: 62B—Gradually recessed steps allow easy ascent to the upper sleepers: 62C—Handles for support on sides of sleepers that do not obstruct egress and ingress: 62D—Aisle of aircraft is at an angle to the sleepers and not orthogonal.

FIG. 66 shows a latch structure that can be used for the lower seat tracks or the upper bin tracks to support the Air Sleeper structures.

Here locking stud, (66A) slides into the apertures in the track and slides along the groove in track. One latch on each frame (see other drawings) will have a pin to lock it horizontally, to allow displacement of the other latches from perfect alignment due tolerance errors. The track has apertures to insert the studs. Studs then slide to the central point between the apertures to allow tensile loading to be supported by the tracks. A pin is shown (66B) for locking the latch and supporting shear loads. This embodiment has a recessed shoulder to accommodate spring for loading pin towards the bottom of the circular slot in the track. Pin supports shear loadings along track.

The Foot/Frame FIG. 67 can rest (66C) on notch on latch body if high compressive loads are experienced particularly if the pin bends as a result of the loading. Track has apertures to insert the studs. Studs then slide to the central point between the apertures to allow tensile loading to be supported by the tracks.

FIG. 67 shows the attachment points for the frame/foot for the Air Sleeper. The vertical slots (67A) are shown to be elongated to allow for example the errors within tolerance of the positions of the adjoining frames/feet. The horizontal surfaces on the interlocking notches are designed therefore to have some slidability. However the interlocking notches in most embodiments will support vertical forces from each other to increase the rigidity of the structure comprising these frames/feet and reduce in many cases the tensile and compressive loads of the seat tracks under sharp acceleration conditions of the vehicle. The apertures at the bottom of the frames engage the latch apertures. In this embodiment a pin (no shown) is used for the attachment. The frame may have telescoping cylinders (67C) to allow for errors within tolerance of the seat track spacing. The Track latch (67B) engages the protrusion and is pinned in place Vertical loads can also be supported by the bottom surface of the protrusion in the notch of the latch.

Figure 71:
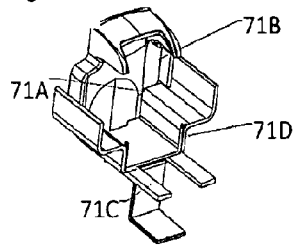
Figure 72:
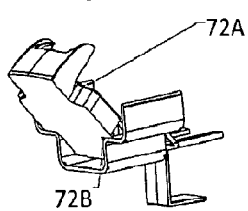
Figure 73:
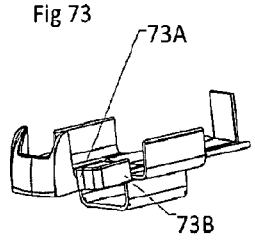

FIG. 71, 72, 73 show embodiments of the Air Sleeper with the backrest pivoted at about the level of the arm rests and pivotally attached near its lower edge to the seat bottom of the Air Sleeper near its rear edge. The front of the seat bottom is pivotally attached to arms that are themselves pivotally attached to the sleeper support at about the level of the arm rests. Therefore the seat back and the arms are approximately parallel. The lengths of the arms relative to the length between the lower end of the seat back and its pivot near the arm rests will a factor in the level of tilt of the seat bottom. A second factor for this tilt will be the angle of the arms relative to the seat back.

As the seat back is inclined backwards the seat bottom is raised until in the flat bed position the seat bottom is approximately at the arm rest height. 71A—Back rest is pivoted at the height of the arm rests and is attached to the seat bottom pivotally as well, to allow the tilting motion of the seat back to raise the seat bottom. Actuators or spring damper control can be used for activation. 71B Shoulder space pivots up with the seat back so that the elbow remains in the same position. 71C—seat bottom moves forward as seat is inclined. 71D—Pivot arms (normally concealed) that raise the seat bottom as the back rest is reclined. 72A, 73A—Head rest recessed here to accommodate the arm rests of the adjoining sleeper at a higher level. 72B, 73B—Sleeper reclines by pivoting at the level of the arm rest. The bottom is pivotally attached to the seat bottom and therefore raises the seat bottom. The other end of the seat bottom follows with the pivoting arm shown.

This embodiment allows the arm from the shoulder to the hands to be rested on either the side wings of the back rest or the arm rests. The elbow will be at a point near the pivot of the seat back.

Some embodiments as in this figure may have a recessed hear rest section to accommodate the adjoining arm rests of sleepers at a higher level. Such narrower head rest sections can also be designed to be effective for protection of the head during rapid deceleration of the aircraft or vehicle.

Figure 68:
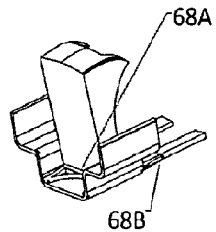
Figure 69:
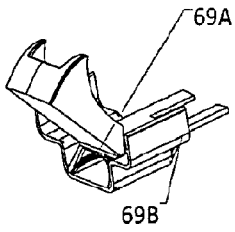
Figure 70:
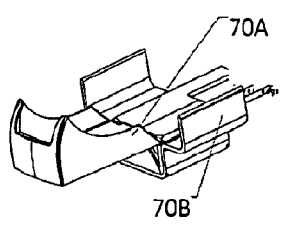

FIG. 68-70 have a seat back with an arm that raises the seat back as it is inclined to the horizontal flat bed position. This arm is substantially parallel to another shadow arm at the front of the seat support that is pivotally attached to the front of the seat bottom. As the seat back reclines this shadow arm and the seat back (which is pivotally attached near its lower edge to the seat bottom) raise the seat bottom to near the arm rest height to provide a broader sleeping surface. Considering that near the flat bed position, the force of the shadow arm on the seat bottom is nearly horizontal (orthogonal to the movement desired of the seat bottom) the movement needs to be enabled by manual or other actuation on the seat bottom. It will also need to support the seat bottom as the shadow arm may not be able to support the load in this position. 68A—Arm attached to the seat back to raise the seat back to the level of the arm rest when in the flat bed mode. The seat bottom is pivotally attached to its lower edge. 68B—A second pivoted arm works in unison with the arm on the seat back to raise the front of the seat bottom in a near horizontal orientation. The orientation can be varied by changing the length of the arm.

Figure 74:
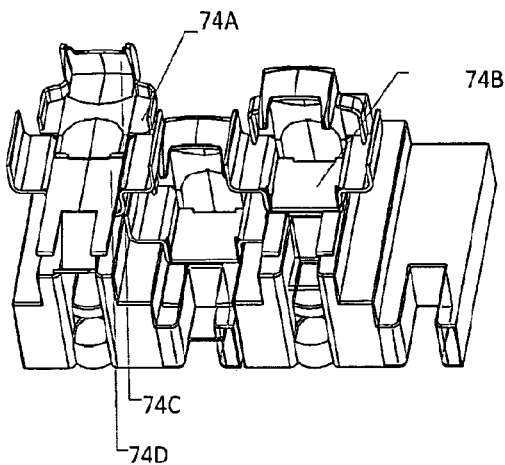
Figure 75:
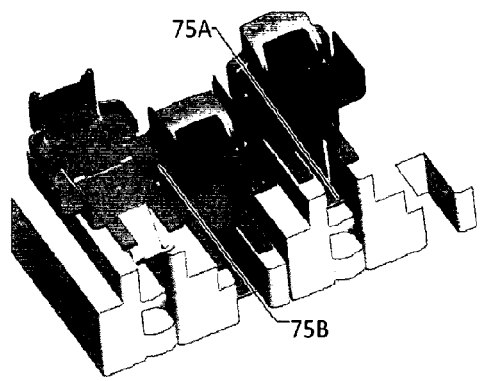
Figure 76:
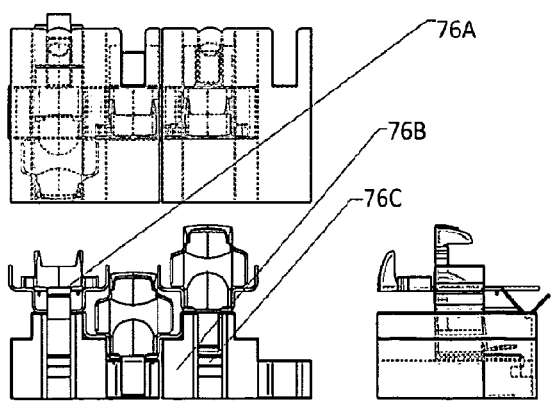

FIG. 74, 75 and 76 show embodiments that use the "interlocking" spaces between the AirSleepers at different levels efficiently. 74A—wide arm space from shoulder. 74B—Sit up position has seat bottom lowered to easily access steps. 74C—Narrower headrest space supports head in crash and also allows interlocking with wider arm rest space from adjoining sleepers. 74D—Flat bed has seat bottom at level of arm rests. 75A—Foot rest has two steps to get to floor level. 75B—Arm rest area corresponds to the shoulder area on back rest and lies above the shoulder area of the adjoining sleeper. 76A—Seat bottom rises to arm rest height in flat bed position. 76B extensive storage below sleepers. 76C—Steps for access to upper sleeper.

FIGS. 77, 78 illustrate the services to the Air Sleeper modules. The Oxygen supply comes from the standard supply source but connectors on the modular units duct the oxygen to the masks and the latch mechanism. An oronasal mask is configured to fit against a passenger's face and is held in place by an elastic band that extends about the back of the head as is normal practice. The usual inflatable reservoir bag is not necessary as the bellow like structure of the mask provide the buffering required for the breathing cycle of the user. An inlet valve controls the flow of oxygen into the collapsible mask. The mask includes an inhalation valve that is configured to allow oxygen that has accumulated in the bag to be drawn into the mask during inhalation and to prevent any flow from the mask into oxygen supply line. The mask additionally includes a dilution valve that is configured to allow ambient cabin air to be drawn in the mask only after the bag contents has been depleted. The mask also includes an exhalation valve that is configured to allow an exhaled breath to be expelled into the cabin.

The supply comprises of the emergency oxygen supply system. One or more cylinders of compressed oxygen serve to store the required supply of oxygen. A regulator reduces the pressure of oxygen that is distributed to the individual user interfaces via a network of conduits, wherein the flow of oxygen to each individual collapsible mask is controlled by the respective inlet valve. In use, the readiness of the oxygen supply is easily verifiable by monitoring the internal pressure of the supply cylinders. Should a substandard pressure be detected, the oxygen cylinder is either replaced or topped off. When a loss of cabin pressure occurs, all passenger collapsible masks are released from overhead storage compartments and a pressure regulated supply of oxygen is released into the distribution network.

The modular connection supplies the Sleeper in the module and also provides an auxiliary protected duct that leads to a position where a Sleeper below it can be supplied as well.

Supply volume flows are designed to be adequate for two sleepers below in many embodiments. If a chemical or modular generator is used for individual passengers these may be mounted behind the oxygen door or in its vicinity.

The Power Supply for the Sleeper modules may come from above or below near the seat tracks and is again connected at a central module connection and then distributed to the devices that require power including lights fans in a ventilation system.

The In-Flight entertainment system in some embodiments will have their supply line alongside the seat tracks and for these the Control boxes for one or more modules may be located in the lower bin. And connections for each module made at a predetermined location on the module. Internal wiring of the module will connect the control unit the video screen and other devices such as speakers or headphone jacks that may be located on the headrest part of the Sleeper back support. Inflight Entertainment System supply cable may also be located at above the Sleeper modules so that it will be ducted down as is the oxygen supply and connected to the connectors on the Sleeper modules.

Similar modular connections may be implemented for the Air Conditioning supply. 77A—Power supply line, 77B—oxygen supply line both attached to modular units. 77C—IFE cable may be attached to Foot/Frame or slot in floor. 77D—cable to upper sleeper.

78A Air Duct connection (modular). 78B Oxygen connection, 78C Power connection, 78D—Oxygen Latch (pressure or electric), 78E—Light collapsible oxygen mask. 78F—Light, 78G Speakers, 78H—Reading light, 78I—control for IFE, 78J—modular connector, 78K—Video monitor. 78L—Oxygen Mask, 78M valves. 78N—axial compression of mask, 78P lateral collapsing mask. 78Q—oxygen lead, 78R—face end. Collapsing masks do not need bladder. Notably such modular connections for of the module sleepers result in most of the connections and maintenance being done off the aircraft and the module simply installed and connected. The services noted may be used in any of the configurations of AirSleepers disclosed herein.

FIG. 79 shows a bank/Family of yet other embodiments of the Air Sleeper support structures. These structures have a recessed section for the arm rest. The space below the arm rest is used for additional space in the upper deck of Air Sleepers. In this embodiment however, as the arm rests are somewhat narrow, the space is not adequate for the head section of the Air Sleeper back to be in this top space. This space can however be used for service support componentry and will give a greater sense of space to the passenger. Notably for the Upper deck the top can be open if no bins are installed on it, thereby permitting the use of longer sleepers (if horizontal space permits) for taller passengers.

79A—Here the space saving from the arm rests from the lower level is not enough for the head of the lower level Sleeper therefore the height of the sleeper needs to be sized to accommodate the head in the full width section. The central raised section gives a psychological impression of space.

FIG. 80 shows an embodiment with wider sleepers and wider arm rests which allow the "head" space on the lower deck to be wider. In this case it is wide enough to accommodate the head of the passenger comfortably. In such embodiments the sitting height of the upper deck passengers is at the shoulder level of the lower deck passengers and therefore the vertical space can be better optimized in the air sleeper.

Upper Sleeper seat height at the shoulder level of the lower Sleeper reduces the height of the upper Sleepers. 80A—Upper Sleeper height is at shoulder. level of lower Sleeper. 80B—narrower seat width with sides gives additional lumbar support while seated; 80C—Bed is at arm rest level.

Again the upper deck top may be open if there is no bin supported by the bank of air sleepers.

In both these embodiments and in general the Sleeper support structure shown may be built In a modular fashion to allow sleepers of different widths to be introduced. One approach is to have a center section that is fixed and supports the air sleepers and a separate arm rest/head space that attaches to this support structure. The armrest/head space part can be varied to get different sized Sleepers. Notably, in the embodiments shown In FIG. 79, 80, the sitting section is narrower than the flat bed which is elevated to the arm rest height. This structure will allow the sitting space to be optimized with hip bolsters on the side and the back for support of the occupant. This will be a preferred feature to having a wide sitting area with no lateral-support for many occupants.

These figures show a flange at the bottom of the back end of the Sleeper support. These flanges are designed to support the Spine Anchor during Impact loading when the Sleeper in substantially a flat bed position.

All embodiments of the Support structures will accommodate the actuators or other equipment that are needed. This will usually be below the seat level of the lower sleeper. For the upper sleepers however, If these are located vertically below and in the center of these sleepers they will lie at the position of the vertical supports on either side of the lower sleepers. Therefore this will have to be accommodated with the support structure shape and it will be at the vertical support structures on the sides of the Lower Sleeper space. This is illustrated in FIG. 81, where the center of the upper sleepers are above the sides of the lower sleepers where the actuators will be housed.

The actuator mechanism may protrude on the edge of the lower sleeper directly behind the foot rest of the upper sleeper. A Cowling or cover 81A—may be used to cover this up. Moreover the structure may be designed to ensure that this opening for the actuator mechanisms do not weaken the structure.

Figure 83:
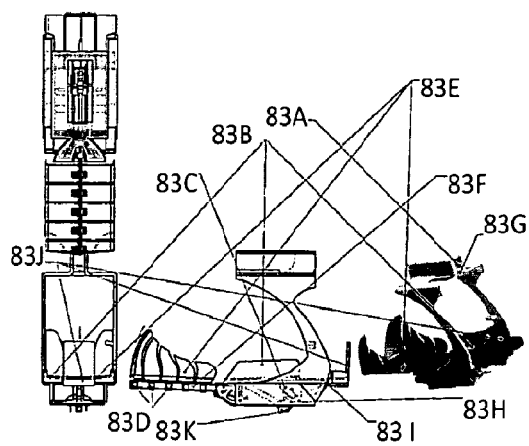
Figure 84:
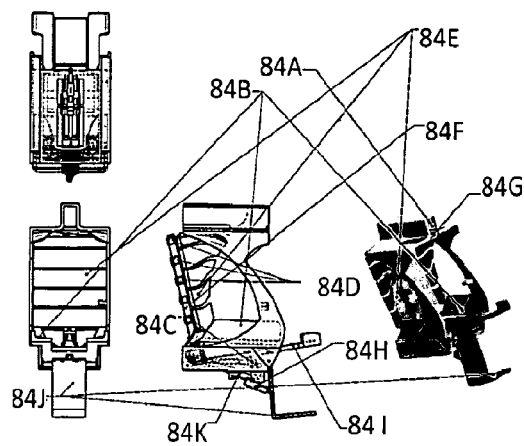

FIG. 82, 83, and 84 shows an embodiment of the Air Sleeper in a recline fiat bed and upright positions respectively.

This embodiment with a narrow Air Sleeper uses the top space for a Service Box for Oxygen and other services.

Figure 85:
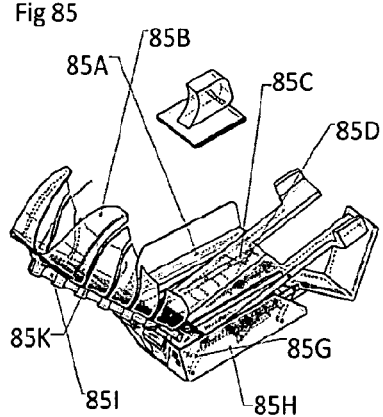
Figure 86:
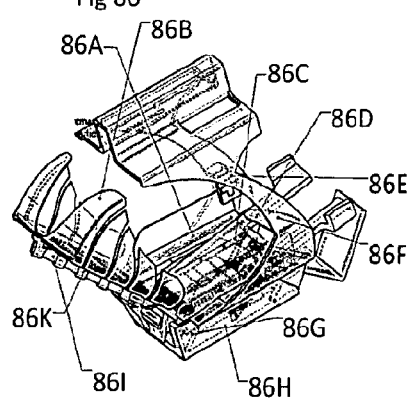

This may also use this additional space for local chemical generation of Oxygen. An actuator reclines the seat bottom pivoted at the rear on to the base of the Seat back. A second actuator inclines the foot rest and a third actuator in this embodiment reclines the seat back. The Optimal positions for the occupant will usually be a can is combination of these movements that can be preset in control software. The back rest has support fins which can flex during crash loadings to controlled extents. These in turn are supported by vertebrae that attach to the spine of the back rest. This embodiment also has a retractable hip bolster that moves inwards to the seat when in the upright position. It is pivoted on the common rear pivot of the seat bottom and the bottom pivot of the seat back and has a leg that gains support from the seat pan (defined herein) as the seat back gets to the upright position thereby pushing forward the bolster. Pneumatic bolsters can also be used. 82A,83A,84A—Service Box: Oxygen electronics and other; 82B, 83B, 84B—Armrest and side support; 82C, 83C, 84C—Actuator for seat bottom incline; 82D, 83D, 84D—Vertebrae; 82E, 83E, 84E—Back support fins allow lateral flexing under crash loads; 82F, 83F, 84F—Spine back support; 82G, 83G, 84G—Oxygen Door; 82H, 83H, 84H—Actuator for Footrest adjustment; 82I, 83I, 84I—Seat Bottom; 82J, 83J, 84J—Foot rest; 82K, 83K, 84K—Actuator for back recline; 82L—retractable hip bolster. FIG. 85, 86 illustrates several features of this embodiment of the Air Sleeper. The arm rests slide near its front end, on the substantially horizontal section of the Sleeper housing or other support It is pivoted at its back end to the seatback and therefore moves back as the seat is reclined. In the flat bed position it is flat as well and forms part of the sleeping surface. The arm rests are always located near reach and therefore may have interface componentry to the passenger supported on them. The seat back fins are contoured in some embodiments and are designed to deflect on impact. Also the space between the fins allow the deflection of the spine as well under impact. The cut out on the top of the fin assembly give an open view to the occupant. The Frame (disclosed herein) is kept near horizontal by two pivoted arms on the seat pan. The first is part of the seat back and a feature of the spine anchor and at the front it is a shadow arm that moves substantially parallel to the spine anchor lower section. Therefore these tow arms create a parallelogram with the bottom of the seat pan and the frame. The frame supports the actuators for the seat bottom inclination and the foot rest. Life vest and table may be mounted on the sides of the sleeper support structure as shown. The table may have multiple folding leaves. The Lower part of the spine anchor that is part of the Seat back is pivoted at one end to the seat pan and as it rotates about this pivot it raises or lowers the parallelogram created with the frame and also raises and lowers the back pivot of the seat bottom. When the seat back is in the flat bed position, the rear pivot supporting the seat bottom gets the seat bottom to substantially the height of the arm rests. Similarly the frame is also raised with this pivot. In some embodiments separate pivots on the seat back support may be used as well for the frame and the seat bottom.

Most of the loading of the Sleeper is taken by the seat pan. The seat pan supports the actuator for the seat back. The vertebrae shown transfer the load from the fins to the spine. The cross section of the spine and the orientation of the cross section induces an upward movement of the fins on lateral impact thereby creating an inertial loading o the occupant to keep the occupant in place during the impact. This asymmetric section can take any form but its orientation is important for this feature of the invention.

85A, 86A—Arm rests slide on the substantially horizontal section of the Sleeper housing and is pivoted on the seat back therefore moving back in the recline position and then to a horizontal position in the flat bed position-still at the elbow location. The Arm Rests may have control panels or elements as the location of the arm rest remains substantially constant to the arm position. 85B, 86B—The seat back fins are contoured and in some embodiments are designed to deflect on impact. The cut out on top gives a better view for the occupant.

85C, 86C—Frame—horizontal section supports the actuators for seat bottom and foot rest. 85D, 86D—Frame pivoted shadow arm stays substantially parallel to the seat back support arm which is also similarly pivoted. 86E—Life Vest case mounts on easily accessible surface.

86F—Table (that may have multiple folding or sliding flaps) folds into side. 85G, 86G—Seat Back arm is pivoted at bottom and raised the bottom edge of the seat back and the rear edge of the seat bottom to substantially the level of the arm rests. 85H, 86H—Sleeper Pan takes the main loads of the sleeper. The Seat back Actuator is supported on it. 85I, 86I—Spine has a section that induced upward movement of the seat back with lateral displacement on impact. 85K 86K—Vertebrae transfer the load on the fins to the spine.

Figure 87:
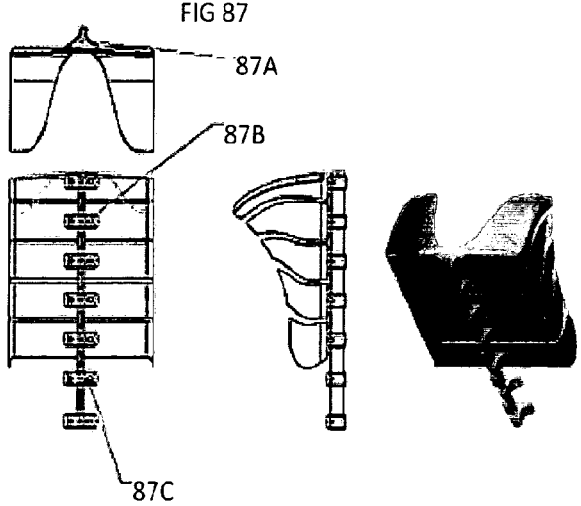

FIG. 87 shows the upper part of the back rest that comprises the spine, vertebrae and fins that support the occupant. The angled orientation of the spine (which may be of any cross section as long as it has asymmetric about the two directions orthogonal to the axis) has a rectangular cross section in this embodiment and on lateral inertial loading of the backrest on impact will rise as it flexes to a side and thereby raises the occupant to increase the inertial load that results in the occupant remaining in the Sleeper. Some cross sections in embodiments of this invention will in addition rotate to ensconce the occupant while the spine flexes. The lower vertebrae may support a hip bolster (not shown) that may use a pneumatic device to pump up to a comfortable level. The hip bolster may also be passive. 87A—Angled orientation of spine (any cross section with asymmetric properties about the two directions orthogonal to the axis of the spine may be used) Raises the fins on lateral impact and increases the inertial loading of the occupant. 87B—vertebrae provide independent support for each fin to the spine allowing the spine to deflect in a controlled manner on impact. 87C—Lower vertebrae may support a hip bolster that may be pumped up with air or may be passive fins as used in the higher vertebrae.

Figure 88:
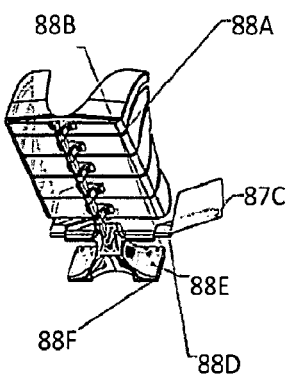

FIG. 88 shows the back rest of the Air Sleeper/seat along with the arm rests (seat and air sleeper are used interchangeably in this disclosure). The arm rests are pivotally attached to the spine anchor at their rear end and slidably attached to the Sleeper support at their front end.

The Fins have independent support on the vertebrae but not generally together but they may have materials and soft furnishings straddling the fins. Also shown in this figure is the pivot for the seat bottom, the frame and the actuator.

This is a separate pivot to the support of the Spine Anchor as shown. This is at the end of the arm as shown. 88A—Fins may have independent support of the respective vertebrae but may have attached soft furnishings and foam coverings for comfort; 88B—Pivot attachment to the Sleeper bottom and the actuator for the back support.

88C—Front edge of arm rests slide on the Sleeper support and is attached to the actuator and Sleeper seat bottom support at a second pivotal axis; 88D—Arm rest pivot at their backs to the back rest and in this case the spine anchor; 88E—Spine Anchor is pivoted to the end of the arm to the Sleeper support and is attached to the actuator and Sleeper seat bottom support at a second pivotal axis; 88F—Pivotal support attachment to Sleeper support structure.

Figure 89:
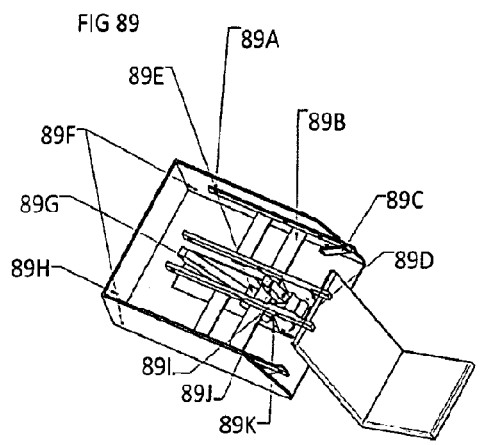

FIG. 89 shows the Pan (which may be integrated with the Sleeper Support structure.) The Frame is pivotally attached to the shadow arms on each side and at the rear end to the upper pivot point on the Spine Anchor (not shown) Therefore movement of the seat back about its lower pivot moves the frame with a substantially horizontal orientation but up and down and forward and backwards. The Frame supports the actuators for the Seat Bottom and the Foot rest. (The Foot rest may in addition have a Back Stop attached to the frame to ensure that it cannot flip down further than in the sitting upright position i.e. a normally oriented "L", in the event of a failure of the actuator or the connections) The actuator for the Back rest is attached in this embodiment to the Pan. The Pivots for the seat back are also shown. 89A—Rear of Frame pivots on the same pivot as the seat bottom rear end which is supported by the Seat Back Anchor; 89B—Frame that moves substantially parallel to the horizontal supports the actuators for the seat bottom and the foot rest; 89C—Shadow arm supports the frame front; 89D—Actuator for the Foot rest is attached on the frame; 89E—Actuator for the Back rest is attached on the Pan—separated flanges shown with pivot; 89F—Pivotal support for the spine anchor on the seat back support structure; 89G—Actuator for Seat Back support (seat back support not shown); 89H—Sleeper Support Pan; 89I—Support Flange for back rest actuator; 89J—Actuator for Seat Bottom; 89K—Actuator for foot rest.

Figure 90:
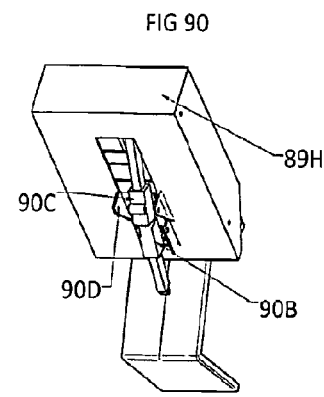

FIG. 90 shows a bottom view of the Pan. The Back rest actuator is seen protruding into the pan to attach to the upper axis of the Spine anchor as noted before. The Foot rest actuator is attached to the frame and is shown here also.

Notably the position of the support points of the actuators and the points of actuation on the seat bottom, the foot rest and the seat back will depend on the embodiment of the invention. The principles are well disclosed in the background art. 90A—Sleeper support Pan; 90B—Actuator for the Footrest is attached on the frame;

90C—Actuator for the Back rest is attached on the Pan—separated flanges shown with support pivot; 90D—Support flange for the back rest actuator.

Figure 91:
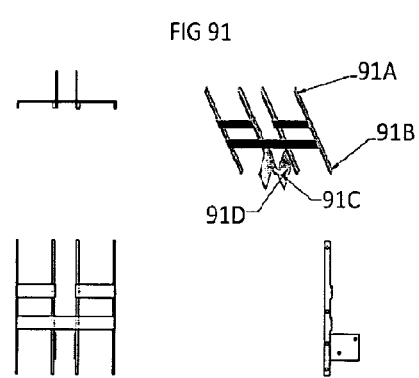

FIG. 91 shows the Frame, illustrating the pivot points for the seat back, the foot rest and the shadow arm and also the two actuators that are attached to it in this embodiment. 91A—Pivot axis for seat bottom and seat back attachments; 91B—Pivot axis for foot rest; 91C—Pivot axis for foot rest actuator; 91D—Pivot axis for seat bottom actuator.

Figure 92:
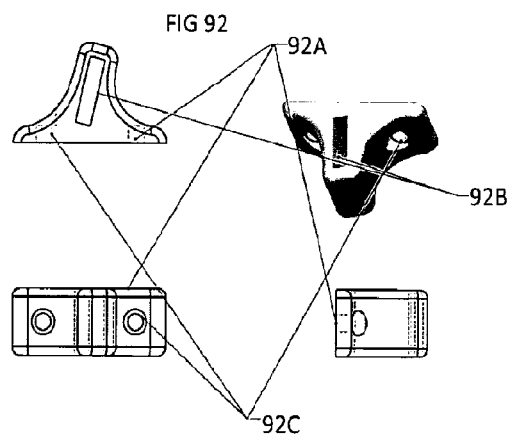

FIG. 92 shows a vertebra. It illustrates the angled orientation of the spine cross section to induce the upward motion while it deflects. 92A—Vertebra bottom attached to the Support fins that each support the occupant; 92B—Angled surface designed to deflect Sleeper Back Support Upwards on lateral impact; 92C—Support Fin attachment points.

Figure 96:
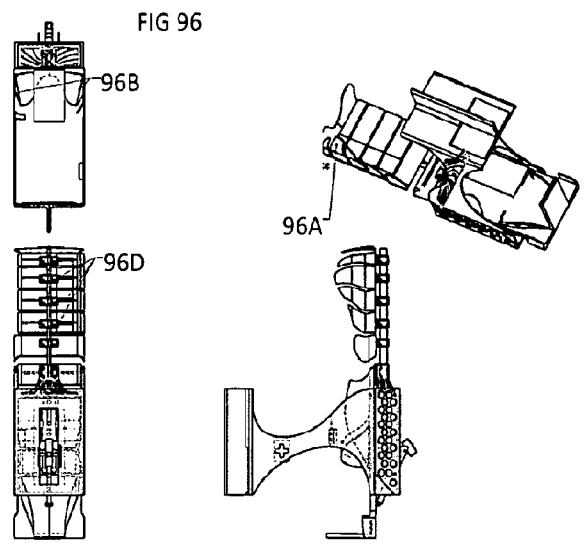

FIG. 96 shows the Air Sleeper in a flat bed position with retracted lateral support and tables.

Figure 95:
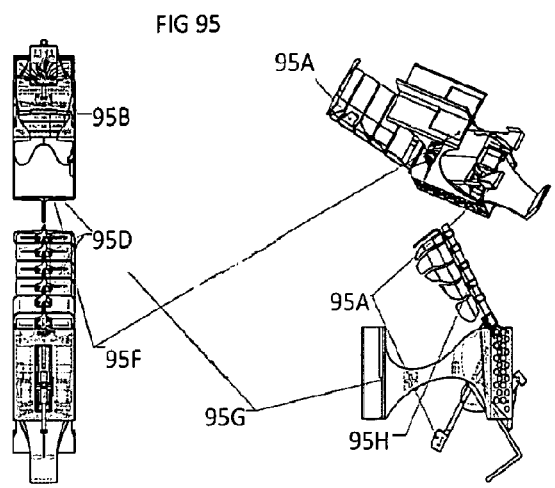

FIG. 95 shows the recline position with raised leg supports on the seat bottom allowing the occupant to relax with his/her legs up or on the foot rest below which can also be inclined.

Figure 94:
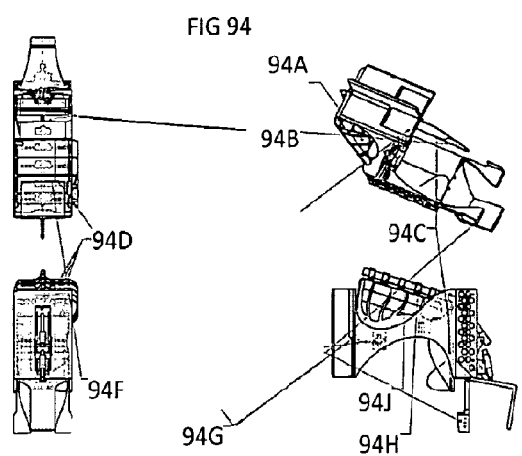

FIG. 94 shows the upright sitting position. Notably in the embodiment shown the support structure of the Air Sleeper has a cut out that accommodates the retractable lateral support that may extend beyond the normal envelope of the air sleeper. This is a common situation for example in conventional economy seating where seat widths are less than the required shoulder width for larger occupants.

FIG. 95, 98, 100 shows the Air Sleeper with the raised leg supports and angled seal bottom with a different embodiment for the foot rest.

Figure 97:
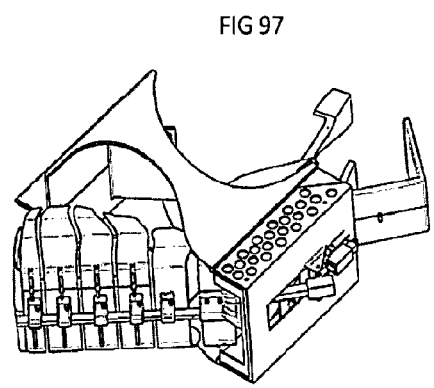
Figure 98:
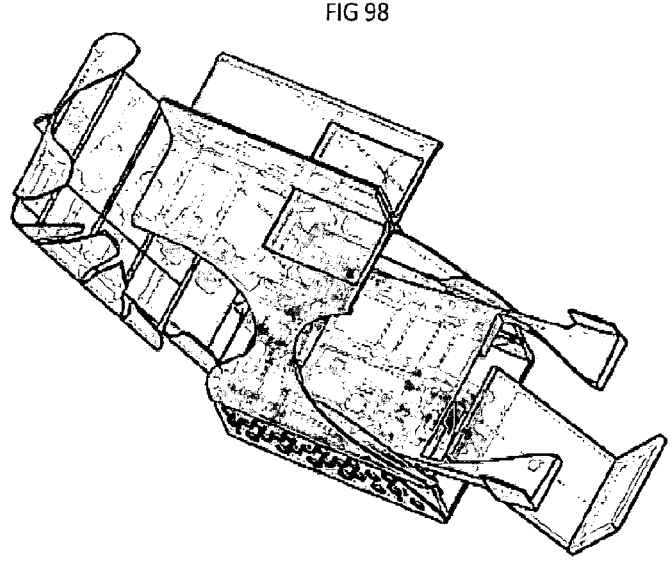

FIG. 97 Shows a bottom view of the Air Sleeper in the recline position. Some parts on the actuation mechanism are removed for clarity. The Figure shows the sliding feature of the Lateral Support. The spring damper mechanisms are not shown.

FIG. 101 shows a detail of the Lateral Support mechanism.

FIG. 99 shows the detail of the pivoting/sliding joint for the table tops on the arm rests.

For FIGS. 93, 94, 95, 96, 99:

A—Retractable lateral support forward of occupant with regard to the direction of motion of vehicle;

B—Folding arm rest/table in the narrow air sleeper gets out of the way for egress and ingress, but available for use by occupant. Moves with the arm rest and therefore is accessible in different recline positions. The hinge attachment on the arm rests also have axial movement to adjust the distance of the table from the occupant at his/her discretion.

C—Arm rest slides on front of support shell or on side flanges of the seat bottom (if present)

D—Slider support structure with spring damper to control movement of retractable lateral support.

E—Seat bottom inclined for Foot support in Normal position for recline. Feet may be on Foot support or Foot rest (maybe floor for lower tier)

F—Forward retractable screen facilitates emergency egress.

G—Forward retractable Oxygen Door facilitates Emergency Egress. Oxygen door may be smaller than screen to prevent door obstruction of access to the mask.

H—Vertebrae have slots for sliders for sliding lateral support. Other embodiments have sliders fixed to vertebrae or spine.

Figure 93:
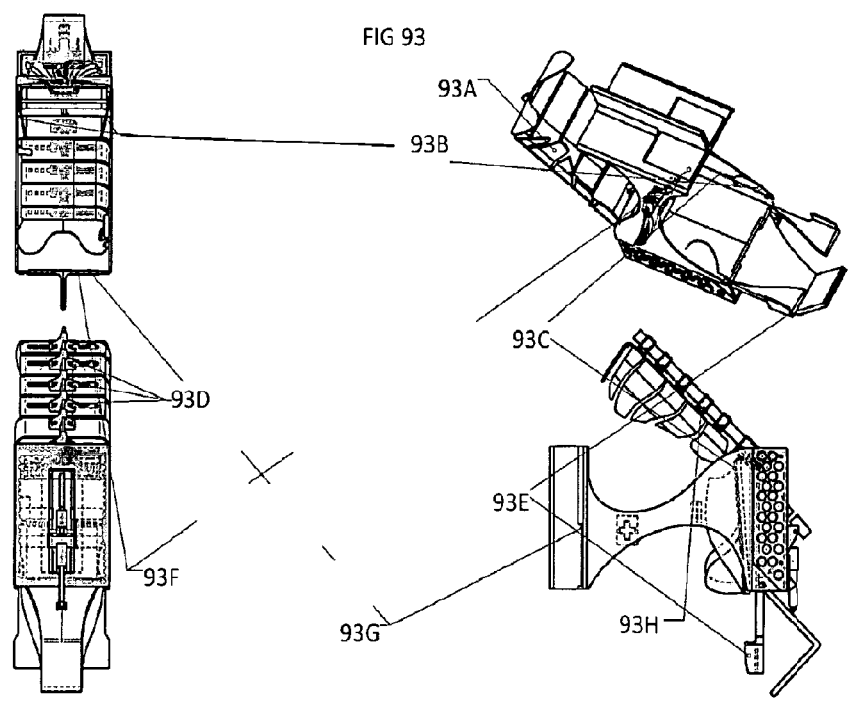

I—Seat bottom inclined with leg rest elevated above seat bottom (FIG. 95) and with leg rest horizontal (FIG. 93)

J—Seat back in upright position with recess to allow position (FIG. 94)

K—Sliding/pivoting table top attached to arm rest sliding at the front on the support structure and itself pivoted at the back on the seat back (FIG. 99)

All the figures show a three actuator mechanism for the seat back, the seat bottom and the foot rest. This mechanism lies in the center below each Air Sleeper and therefore the mechanism of the upper Air Sleeper is near the wall of the lower Air Sleeper and will be seen to be out of the way of the lower occupants. However, any design of the support structure will need to have apertures and/or shape changes to accommodate the parts of any actuator mechanism, ensuring of course that the structural strength is maintained.

FIG. 102 shows support feet for the Air Sleepers with two architectures. To save weight the bottom rung of the foot may be excluded in the design. This will however transfer a greater torque to the seat tracks. A more conservative design would use the bottom rung. In both cases the corners can be jointed and a diagonal shock absorber introduced for crash loadings. However, this will also block the space within each foot that can otherwise be used for storage.

FIG. 102 shows alternate variations of design for the foot frame; 102A—Open profile support foot. Depends on vertical track rigidity (or latch design to neutralize the loading—compressive and tensile.) more than in the closed profile but saves weight. Vertical loadings are transferred across support feet with interlocking structure as In the dosed profile. Here the tensile compressive loading that generate a torque at the latch points at the bottom are neutralized on the latch or on sections of the track; 102B—Here a closed profile support foot with a bottom horizontal runner reduced the loading on the tracks by sharing load. Less of the torque generated by the sheer load of the upper edge of the support foot is transferred to the track in this case.

In either case a diagonal shock absorber can be mounted and the corners of the support feet pivoted to accommodate crash loadings.

FIG. 103 shows a low mass embodiment of the Air Sleeper for the upper tier (except for the length and shape of uni-beam leg support the same structure can be used for the lower tier air sleeper). This embodiment of the Air sleeper has a minimal number of vertical connections from the support structure below to the level of the Air Sleeper. The figure shows the case with a single central support beam (uni-beam) for each of the Sleepers on the upper tier (also for the lower tier). The Figs also show lateral bars that increase lateral rigidity as adjoining Sleepers are connected by these bars (of any cross section) that will reduce the deflection of the vertical supports in the event of a rapid deceleration of the vehicle. This embodiment has supports that fit on the Support frame below with latches or other connection devices, and in this case the Air Sleepers are orthogonal to the direction of motion of the vehicle. Notably other embodiments that require greater stiffness and strength may have more than one beam connecting the support frame to the bottom of each of the Air Sleepers, For example another beam may originate from above the back rail or rear attachment points (both with regard to the occupant) of the support structure. This particularly in conjunction with the lateral interconnection of the lateral bars between the beams supporting adjoining upper tier sleepers will increase the resistance to the loading upon rapid deceleration of the vehicle. These embodiments use a uni-beam that is attached at the front of the air sleeper in order to maximize the lateral space available for the sleeper for its length from a part of the seat bottom to the shoulder and head.

The support for the monitor shown (which can also support a chemical or supplied oxygen mask and cabinet), is at the end of a stalk which will also function as a handle for assisting egress and, Ingress to the upper tier of the Air Sleepers. The stalk can also support a camera for monitoring the occupant and the use of the occupant. Moreover air supply and other amenities may be provided at the end of the stalk or on the seat back Also shown are the supports for the steps that facilitate egress and ingress for the upper tier. Notably these are between the occupants in the lower tier. 103A—Top fin or head guard that protects occupant and provides privacy. Cut out in center increases visibility; 103B—screen and optionally oxygen access door, oxygen generator and mask behind screen; 103C—screen support stalk carries data for screen and control signals for oxygen deployment if needed and also oxygen supply for centralized oxygen systems. Stalk is also a support handle for support of passengers; 103D—Sliding lateral supports on Fins that can reduce the width of the sleeper if required and/or extend under crash loadings.

103E—Arm Rest/table that can pivot up and also slide forward and back to meet the convenience of the occupant; 103F—arm rest support with pivot and slide arrangement to support the retractable arm rest; 103G—pivoting arm to support arm rest support at the front end; 103H—Extension of seat bottom for leg support in any angle of the seat bottom— May be inclined upwards for a "feet up" position; 103I—Seat Bottom Pivot, may be changed to adjust seat bottom inclination; 103J—Back Rest pivot—may be controlled to change back inclination; 103K—Foot rest. May be raised to the horizontal position, or a recline position; 103L—Vertebra, that may in some embodiments be slidable on the spine controlled by springs between then or elsewhere and controlled by cables to a spool as shown in 103P; 103M—Spine; 103N—Fins are attached to the vertebrae. This embodiment has sliding side supports for lateral support; 103O—holes for control cables controlling the distance of vertebrae from the spool; 103P—Spool assembly for the adjustment of the length of the backrest. Control of the position of the spool can be effected in some embodiments with a shaft through the spool centers that are ratchet controlled with a lever on the side of the occupant. Similar control can be effected for the other pivots.

FIG. 104, 105 also shows the embodiment of the air sleeper for the upper tier. 104, 105 A—Foot Rest>may be raised to the horizontal position or even higher as desired by the occupant; 104, 105 B—Support for step (step not shown); 104, 105 C—Support point on foot/frame.

105 D—Cross-bar between upper tier Air Sleepers for creating a lattice for rigidity under impact loading conditions. Multiple bars may be used for lattice (2 shown here and in this embodiment, attached to the foot rest axis and the seat bottom pivot axis.)

FIG. 106 and FIG. 107 how the recycle and a flat bed position respectively. 106A is the unibeam construction of this embodiment.

FIG. 108 show the lower tier embodiment of the Air Sleeper (Leg/foot rest not shown but may have identical support as in the upper tier sleepers). The support points for the foot frame lie between the support points used by the upper tier of Air Sleepers. Also shown are the cross-bars that may or may not be used in the lower tier sleepers. This lower tier embodiment has a similar structure to the upper tier sleeper but does not have the long unibeam for support as it is adjoining the support structure below. Moreover, it will not need to the same extent the lateral bars that brace the uni-beam supports as the moments of the force relative to the latch or other connections to the support structure directly below is much smaller.

Notably the upper and lower tier sleepers may be constructed to be identical and attached to either the upper sleeper or lower sleeper legs and lattice structures, thereby creating standardized and inter changeable solution. such embodiments may have the foot rests for the upper and lower sleepers attached to the respective sleeper legs.

FIG. 109 shows an occupant in the flat bed position.

FIG. 110 shows the occupant in a sit up position.

FIG. 111 shows multiple views of the arrangement of the two tiers as they are locked to the foot frame. It also shows a part of the lattice structure which can be locked ion place during the assembly of the legs of the upper and lower tiers. An approach for populating the cabin with this embodiment of the air sleeper is to first put in place the foot frame structure (may be used with other sized air sleepers as well) Then install the legs with the cross-links for the lattice which may locked together with retractable pins or other means well disclosed in the art. Finally locking in place the sleepers on the lower and upper pivots locations or just below these pivot locations. The Air sleepers may be identical in the lower and upper tiers.

FIGS. 103-111 show the structure of this uni-beam air sleeper structure. [n these embodiments the center of the seat bottom (laterally) is pivotally attached to the uni-beam support at the point on the seat that will allow the occupant to use his/her weight to manipulate the angular orientation of the seat bottom. The Foot rest is separately supported by the uni-beam support and therefore can be used for such leverage by the occupant. There are many possible locking mechanisms for the pivotal support to fix the angle of the seat bottom at the discretion of the occupant. One such arrangement is a splined hub that interlocks with the pivot in different positions and is spring mounted so it can be released along the axial direction of the pivot.

There are other possible mechanisms that can use friction and other methods.

The Seatback is pivoted to the seat bottom in this embodiment (although other embodiments can behave the seat back supported by the uni-beam as well) there is a similar pivot lock that allows the seat back to be pushed right back to the flat bed position. In the case of the seat back a spring loading could be beneficial in helping the occupant bring back the seat back to the upright position from the flat bed position.

Notably the seat bottom and even the seat back can be oriented to have the feet higher than the pelvic area and indeed the torso if so desired using the side wings of the seat bottom that straddle the foot rest. These side wings need to be recessed to give a comfortable space for the legs of the occupant when using the foot rest. Some embodiments (not shown) may have a flap that overlaps (below or above) the wide section of the side wings and is constructed to be slidably attached to the side wings and also attached by a mechanical linkage to the seat back, so that when the seat back is flattened to a flat bed position it pulls the linkages that pull the flaps over the recess for the legs that would be in use in the sitting position of the occupant.

The arm rests have a folding table that flip up when in the flat bed position to allow the required space. The arm rests ate pivoted on the seat bottom and back to ensure that it moves with the seat back inclination and in many embodiments, falls to the level of the seat bottom when in the flat bed position to maximize width of the bed.

The Foot rest as in FIGS. 103-111 has a pivotal support and can therefore be raised to get a recline or flat bed position. It has cutouts on its sides to accommodate the occupant in the lower tier for egress and ingress and may also have retractable side flaps to minimize visibility between the upper and lower tier occupants.

The embodiments shown if FIGS. 103-111 have fins for support of the occupant both on the seat bottom and the seat back. These may have air or other cushions for the comfort of the occupant and may be connected to get her if so desired. The embodiments shown also have side flaps that are retractable at the shoulder level (in these embodiments the top 3 fins have side flaps that are retractable. These will retract on contact with the flaps on adjoining Air Sleepers at the time the two adjoining air sleepers are at the same angular position. Usually if the full width of the shoulders that can be achieved with the flaps in the extended position is desired for two adjoining Air Sleepers, the occupants will choose different angular orientations for their respective Air Sleepers. An option that is not available in conventional high density seating in Aircraft. The exploded view of FIG. 112 shows the side flaps separate from the fins.

Figure 112:
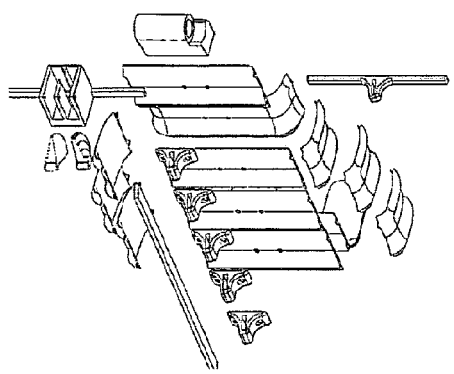

As shown in FIGS. 103-111 and in the exploded view of FIG. 112, the vertebrae that attach the back fins to the spine may be slidably attached to the spine so that the vertebrae can slide along the spine in a controlled manner. Such control can be achieved by having co-axial spools of different diameters that spool in cables that are attached to each of the vertebrae See FIGS. 112, 113, 114. So that it achieves the differential movement of the vertebrae required for the adjustment of the fins for the comfort of occupants of different height. I.e. the thorax and shoulders of shorter occupants will be accommodated by spooling in the cables (there will be greater movement required for the top vertebrae than the bottom vertebrae and therefore the differential diameters of the spools). The Vertebrae may have a spring loading relative to the spine or simply between the vertebrae to release the cable as it is un-spooled for taller occupants. The spool can be controlled with a lever that moves the spools over an angular displacement and a friction lock or other mechanism can be used to maintain the cables in a desired position.

In order to accommodate the width of different occupants each of the fins may have air filled cushions that are inflatable/deflatable to provide the required lateral support along the height of the seat bottom and back. Such air-filled cushions would be useful as pillow pads as well for head of the occupant.

FIG. 112 also shows a version of the spool with differential diameters for retracting the vertebrae.

Figure 113:
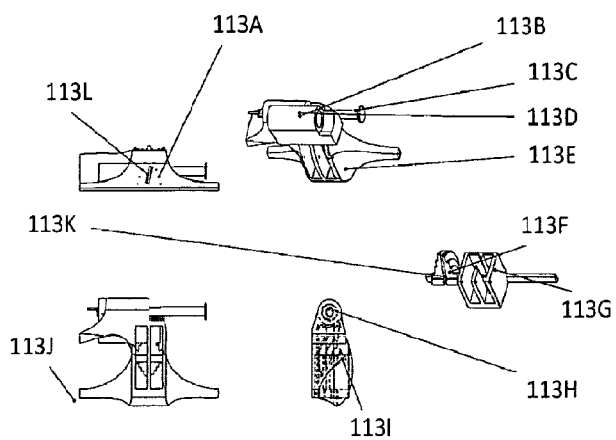

FIG. 113—Shows the structure of the Spool for seatback height adjustment and the pivot mechanism in one possible embodiment.

113A—Holes allow cable attachments to each of the ribs from the spool. Different radii of the spool for differential movement of the ribs is catered for; 113B—Splined cylinder; 113C—Axle with keyway for pin; 113D—Pin that rides in a keyway in axle; 113E—General housing that encapsulates the spool housing and the back pivot assembly. May have a structural function; 113F—Two symmetrical spools that rotate through 90 degrees to pull in or let out the cable controlling the rib positions; 113G—housing for the spools also have in this embodiment the support for the arm rests; 113H—Mechanism for back-pivot angular adjustment. retracting the pin in a key retracts a splined or geared cylinder that engages the section fixed to the seat back and coaxial with the splined or geared cylinder thereby releasing it to move over an angle. Releasing the pin will engage the splines or gears with the co-axial section attached to the seat back, thereby locking the seatback in the new angular position; 113I—The spool housing showing the position of the spools with different radii for each of the ribs; 113 J—Extension to housing to attach a lever that can pivot at this point and be attached at its end to the pin, thereby allowing actuation of the pin by depression of the lever; 113 K—Axis of the spools may be actuate by a long arm and a lever on the side of the occupant; 113 L—cut out for the spine. In this embodiment it is an angled architecture for impact deflection properties.

Figure 114:
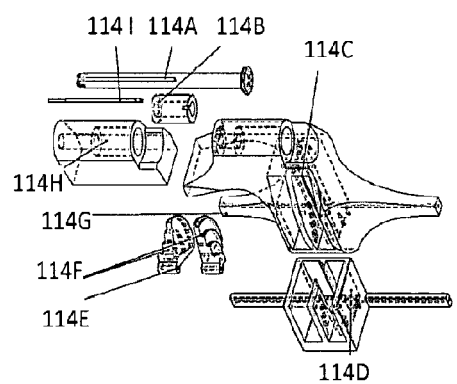

FIG. 114—Spool exploded view

114A—Axle with Key-way for pin. This axle may also be splined to the cylinder and to the part that is attached to the moving seat back.

114B—Splined cylinder (or keyed) to engage axle with geared end that engages the end of the cavity on housing attached to seat back.

114C—General housing that may substitute for or encapsulate the spool housing and may encapsulate the back pivot assembly (for the seat back motion) It may also have a structural function.

114D—Housing for spools also have in this embodiment the support for arm rests.

114E—Axis for the spools may be actuated by a long arm and lever on the side of the occupant.

114F—Two symmetrical "spools" that rotate by about 90 deg to pull in or let out the cable controlling the rib positions.

114G—Extension to housing can be used to pivot a lever that is pivotally attached to the Key, thereby leaving the key to move in and out, and thereby resulting in the engagement and dis-engagement of the gears between the cylinder and the cavity of the housing attached to the seat back. The occupant can thereby control the angular orientation of the seat back by depressing the lever and rotating the seat back up or down. There will in many embodiments be a spring loading against the weight of the seat back.

114 H—Cavity for cylinder with spring loading to push geared end of cylinder towards the part attached to the seat bottom. The cavity at its other end has a smaller diameter that accepts the axle and has a corresponding keyway as on the axle. The Key with a head that can pull the cylinder rides in the key-way; 114I—Pin that rides in the Key way on the axle.

Figure 115:
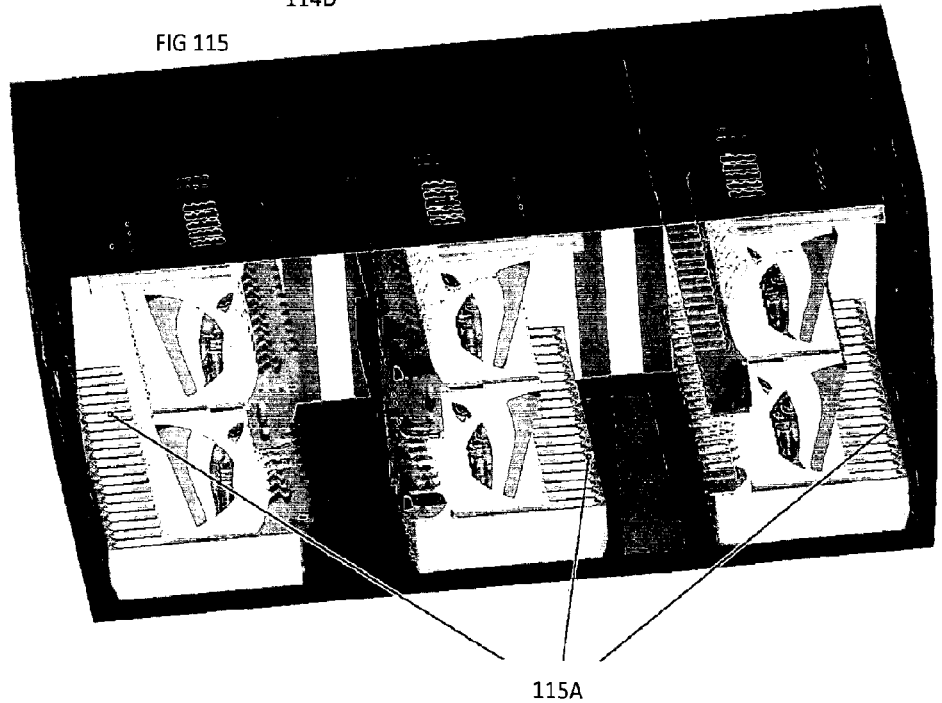

FIG. 115 show the Rapid Re-configuration Routine (RRR)—for one type of Air Sleeper.

This is yet another feature of the invention is a method for re-configuring the cabin of the vehicle/aircraft as noted earlier.

The Method of Rapid Re-configuration Routine (RRR) for re—configuring the cabin with different Air Sleepers or related accommodation units is achieved as follows:

1. Identify the range of Air Sleepers that need to be replaced.
2. Place all the Air Sleepers that are between the door and these Air Sleepers in an upright position, thereby creating a space behind the attachment points of the Air Sleepers that is adequate for moving detached AirSleepers to the door (115A).
3. Detach the AirSleepers for removal and relocate them along newly created temporary "corridor" behind the seats to the doorway and out of the aircraft.
4. Bring in the replacement AirSleepers along the same "Corridor" and lock them in place.

Notably this process can be semi-automated by placing slides (possibly in folding sections) with motorized traction points as used for loading and unloading containers from aircraft on top of the Support structure/frame/foot of the AirSleepers and simply unlock the AirSleepers and move them back to these slides that will relocated them to the door and then bring in the new AirSleepers as required as they are loaded at the door.

FIG. 128 shows an alternative version of the Air Sleeper with a narrow or uni-beam construction where the seat surface rises as it gets to the flat bed position. This is similar to the mechanisms elsewhere in the present invention. This is particularly useful in embodiments where the shoulder room between Air Sleepers is limited. By having alternative upper and lower level Air Sleepers have this mechanism these Air Sleepers may be elevated by about 4 inches from the adjoining Air Sleepers and thereby allow all the Air Sleepers to simultaneously in the flat bed position without a conflict for lateral space as alternate sleepers will be at a slightly higher level that the sleepers without the mechanism.

Notably the length of the arms that provide the articulation and the distance between the pivot points will determine the level Vehicle Occupant Support Child Seat FIG. 116 Shows the inner shell supporting the occupant of a child restraint system that will move under impact conditions. In particular this shell has a head rest that can slide on the shell along tracks with attachments in the slots as shown and with provision in this embodiment to have indexing holes that line up with holes on the head rest for indexing pins to hold the head rest in a particular position.

This embodiment has a central rotational sliding arrangement or a "virtual" or real pivot at the center of the base as shown towards its front and has compressible elements at the rear of the shell. Moreover the sides of the front of the shell has slides. These slide are shaped to have a surface that follows the section of a cylinder that has the same center as the central rotational sliding arrangement, thereby helping maintain the inner shell along the same axis of rotation. This combination of elements allow the shell to rotate away from the direction of a lateral impact thereby reducing injury. Such movement is enabled with the compressible elements compressing under load and the slides and central rotational sliding arrangement maintaining the front end of the shell with relatively little lateral movement but enabling rotational movement. However the slides and the virtual or real pivot may have shock absorbing elements as well to reduce the peak loading to these elements.

In a front impact the inner shell shown is supported by the Bunge sling that will provide a restraining force backwards while the shell pivots near the lower central rotational sliding arrangement (or pivot "pin"). 116A—Headrest slides up and down for adjustment. Pins can be used for fixing in any position; 116B—Bunge Sling; 116C—Pivot pin keeps rotation axis relatively static. Pivot pin may be a set of slides; 116D 0 Front slide limit movement laterally while allowing movement along slide surface for support element on outer shell; 116E—Rear deformable control elements allow controlled movement upon impact.

FIG. 117 shows the details of the Bunge Sling. This is an energy absorbing spring and/or a deformable element that extends during a front or oblique impact. The ends of the Bunge sling are attached to the inner shell and the central section in many embodiments passes through a loop that is attached to the outer shell or the frame that is attached to the car seat at the back near the tether support. The loop allows lateral siding of the Bunge Sling during side impact. 117A—Support on inner shell; Flexible tape or webbing attached to outer shell or frame passes over the center section. This allows lateral sliding of the webbing or tape on side impact but tensions and stretches the bunge sling on front impact.

FIG. 118 Shows an embodiment of the CRS System excluding the base. The headrest slides on the inner shell. The Bunge sling supports the back of the inner shell with a loop that is attached to the Brace frame (here through the tether support at the top (not shown). The loop can slide along the Bunge sling but will be loaded in a front impact. The Bunge sling may be calibrated to complement the crash characteristics of the vehicle to minimize injury. 118A—Headrest rotates away from side impact; 118B—Bunge sling supports the back of the inner shell with a loop that is attached to the Brace frame (here through the tether support at the top (not shown). The loop can slide along the bunge sling but will be loaded in a front impact. The Bunge sling may be calibrated to complement the crash characteristics of the vehicle to minimize injury; 118 C—outer shell or frame supports the inner shell through shock absorbing members. Differential support the rear and front of the occupant (through the inner shell or skin); 118D—"D" bar handle is used to unlock the outer shell/frame from the Brace Frame for egress and ingress. The mechanism allows the outer shell/frame to rotate outwards for easy egress and ingress. There are "D" bars on either side for use depending on the side of the seat that required egress and ingress. When locked it provides a rigid link between the outer shell/frame and the Brace Frame and thereby provides firm support by the outer shell/frame to the inner shell during lateral impact; 118E—Brace Frame supports the outer shell or frame to the vehicle seat. This embodiment shows a mechanism for rotating the outer shell for egress and ingress. The Brace frame sits on the seat base and is attached to the tether at the top; 118F—Pivot support for the Brace Frame to the seat base. Used for the rearward facing convertible deployments where the inclination of the seat bottom needs to be changed; 118G—Pivot for the lateral impact protection between the inner shell and the outer shell; 118H—Brace Frame has front feet that lock to the base at different elevations depending on front or rear facing deployments. The slot engages a long bar across the front that in turn engages slots at different heights on the seat bottom.

The inner shell is supported by the outer shell/frame that has a static or dynamic vertical axis for rotation at the front center of the bottom and sliding surfaces near the front sides. It also has impact absorbing compressible or extendable materials attached between the inner and outer shells between the two shells. These may in some embodiments be sections that are placed near the side of the ear of the inner shell. As a result the outer shell or frame supports the inner shell through shock absorbing members. Differential support the rear and front of the occupant (through the inner shell or skin)

The inner shell in this embodiment is supported for front impact through a Bunge Sling that is attached to the Brace Frame above the outer shell.

"D" bar handle is used to unlock the outer shell/frame from the Brace Frame for egress and ingress. The mechanism allows the outer shell/frame to rotate outwards for easy egress and ingress. There are "D" bars on either side for use depending on the side of the seat that required egress and ingress. When locked it provides a rigid link between the outer shell/frame and the Brace Frame and thereby provides firm support by the outer shell/frame to the inner shell during lateral impact. The pivot of the "D" bar may be spring loaded to ensure that it locks securely.

Brace Frame supports the outer shell or frame to the vehicle seat. This embodiment shows a mechanism for rotating the outer shell for egress and ingress. The Brace frame sits on the seat base and is attached to the tether at the top.

As this embodiment is a convertible seat, there is a pivot support for the Brace Frame to the seat base. This works in conjunction with the front feet shown to raise or lower the front of the seat relative to its back to increase or decrease the angular orientation of the seat. The mechanisms for attachment at different angular elevations are well disclosed in the background art. The Brace Frame has front feet that lock to the base at different elevations depending on front or rear facing deployments. The slot engages a long bar across the front that in turn engages slots at different heights on the seat bottom.

The figure also shows the pivot on the inner shell supported by the outer shell. Notably in this embodiment the pivot is not fixed but will move as the structure of the outer shell and the brace flex on impact and therefore provides some shock absorption as well.

FIG. 119 shows the Brace Frame. It has an axis substantially along the direction of the seat back of the CRS, supporting the outer shell/frame at its back. The top of this axis in some embodiments is attached to the tether. It also is looped over the Bunge sling in some embodiments.

The rear edge of the brace frame braces against the back of the car seat and is designed to have a broad stance to accommodate lateral forces in side impact. 119A—Axis supporting the outer shell/frame at its back. The top of this axis in some embodiments is attached to the tether. It also is looped over the bunge sling in some embodiments; 119B—rear edge of the brace frame braces against the back of the car seat and is designed to have a broad stance to accommodate lateral forces in side impact.

FIG. 120 shows the headrest that can slide up and down on the inner shell. It also shows the "Bunge Sling" which is attached to the inner shell and is attached by way of a loop (not shown) to the Brace Frame on the main pivot rod (not shown).

The "E" Brace is usually behind the outers frame/shell and pivots on or near the central pivot of the outer shell/brace it is locked in place to provide support for the outer shell/frame with the "D"-Bar that is pivoted on the Brace Frame and a pivoted link.

This mechanism works as follows: The "E" brace ensconces the outer shell frame—one on each side (only one side mechanism is shown) and resists movement of the outer shell/frame backwards about the central pivotal axis shown. The "E" Brace has a substantially vertical pivotal axis near its front that is pivotally attached to a Link that has pivots at both ends. The other end of the Link is pivotally attached to near the center of the "D" bar. The "D" Bar is pivotally attached to this Link and is also pivotally attached to the Brace Frame at its back. The pivots may have spring loadings and clips and latches, as necessary and well disclosed in the background art to keep the mechanism locked during operation and release easily when the "D" Bar is pulled. Notably this embodiment also has curves in the elements to locate the pivots such that to ensure that the direction of reactive forces between the outer shell/frame and the Brace Frame maintain the locked position.

Note that the "E" brace pivots in this embodiment on the mail pivot rod at the center of the seat. ("E" brace, the "D" bar and the Link are attached on both sides in most embodiments. Only one side is shown in the figure.) 120 A—Headrest can slide up and down on the inner shell; 120B—"Bunge Sling" is attached to the inner shell and is attached by way of a loop to the Brace Frame on the main pivot rod; 120C—"E" Brace is usually behind the outers frame/shell and pivots on or near the central pivot of the outer shell/bracket is locked in place to provide support for the outer shell/frame with the "D"-Bar that is pivoted on the Brace Frame and a pivoted link; 120D—Outer Shell/Frame; 120E—"D" bar link that attaches to the Brace Frame and the link to the Outer Shell/frame; 120 F—"E" brace pivots in this embodiment on the main pivot rod at the center of the seat; 120G—Link between the "D" bar and the outer shell/frames;

FIG. 121 Shows the outer shell frame and the mechanism for release for egress and ingress. "D" Bar, the "E" Brace and the Link. The Bunge Sling is also shown. 121A—"D" Bar; 121B—"E" Brace; 121C—cavity to house rear compressible members between inner and outer shells; 121 D—Link; 121E—Guides for front slide on inner shell; 121F—Pivot or central slide for inner shell.

FIG. 122 shows the "Lap Flap" is a soft extension of the arm rest surface on the seat that captures the upper leg during side impact (using any or all of for example inertia, friction, viscosity properties), but is soft under normal conditions for egress and ingress. This element may be fluid filled with appropriate flow control between the flap and a reservoir so that under impact conditions it is relatively non-deformable but with the fluid flow is deformable under normal use conditions. 122A—"Lap Flap"

FIG. 123, 124 show one side of the Egress ingress mechanism.

The Egress Ingress mechanism comprises in this embodiment the "E" brace that supports the outer shell/frame with a pivot at the center as shown and a pivot at it outer end. The Pivot at the outer end is pivoted to a Link that has two pivotal points at its ends. The Second pivotal point is attached to the near the center of the "D"

Pulling the handle out pulls the center pivot on the "D" bar arm which rotates the Link outwards which in turn pulls the pivotal attachment of the Link to the "E" brace back and thereby eases egress and ingress.

FIG. 123 also shows the Brace Frame. It shows the lower support surface of the Brace Frame that supports the outer shell. Notably this embodiment has a surface that will allow the outer shell/frame to slide on this surface as it pivots about the central support rod that passes through the hinge support sections shown in the center of the rear section of the Brace Frame. It is not necessarily a planar surface. 123A "D" bar pivotal attachment to Brace Frame; 123B—"D" Bar; 123C—Link between pivot on "D" Bar and the pivot on the "E" Brace; 123D—"D" bar handle. Pulling the handle out pulls the center pivot on the "D" bar arm which rotates the Link outwards which in turn pulls the pivotal attachment of the Link to the "E" brace back and thereby eases egress and ingress; 123E—"E" Brace (placed just outside the outer shell—not shown). 124A—"D" Bar pivot on Brace Frame; 124B—"E" Brace pivot on central support axis of Brace Frame which also supports the outer frame; 124C—"E" Brace pivot on the link; 124D—"D" Bar pivot on link; 124E—"D" Bar.

FIG. 125, shows an embodiment of the base that has a central aperture to allow the Brace frame to have a lower center of gravity. It is held together by two side members that may be hollow. The embodiment shown also shows an approach to lead a tension cable that is attached to each of the two latches and is guided along an aperture in the side members and around a guide to a hollow pivot rod holding the Brace frame to the Outer Frame/shell. The pair of cables from each of the two latches emerge from the top of this hollow axis and are attached through a tensioning mechanism to the tether support. Notably the two cables may be combined as they go up the hollow shaft. Another embodiment will have a single cable that goes around a pulley whose pivot is tightened to the tether cable or webbing attachment. The ends of the cable that go around the pulley then go own the hollow shaft and respectively around the two guides to the respective latches. The advantage in this embodiment is that the tensions of the two latches are equalized) the tether will usually have twice the tension loading of each of the latches.

Notably in FIG. 125 the latches (or ISO-FIX latches) hare held in a preferred orientation with the tabs above and below the body of the latches (only apertures housing the latches are shown in figure). This orientation will depend on the specific design of the CSRS system. 125A—Flat section has two towers (not shown) that engage the Brace-Frame angular adjustment lateral bar. This will allow different angular positions
for front/rear facing use. 125B—Pulley or curved static guide for latch/tether tensioning cable. Cable enters aperture along side members to the latch position at one end and enters the near vertical hollow pivot shaft attached to the Brace Frame at the other end; 125C—Pivot for the horizontal angular movement for inclinations required for the Brace Frame for front—rear facing positions; 125D—Entry point of the cable from the guide to access the bottom of the hollow near vertical pivot axis of the Brace Frame/Outer Shell. The bottom edge of the aperture is bevels and surface conditioned to allow the cable to slide on it; 125E—Pivot point of cable pulley or support point for static guide; 125F—Aperture for the cable or webbing attached to the latch to reach the near vertical hollow pivot rod on the Brace Frame (either directly or indirectly around the guides at the center of the Base.

FIG. 126 is an embodiment of the bottom attachment between the inner and outer shell. This strip is attached at its lower edge on the outer shell or frame. In the event of a lateral impact the strip provides a shear plane that will resist lateral motion. However as it is a thin strip and there is a moment due to the inertial mass of the seat and the occupant, it will twist, thereby providing the rotational motion required for impact protection of the child. In a front impact the strip will bend over as there is a moment rotating the top edge of the strip forward (lateral axis for the rotation) This will result in a longer period of deceleration of the child during front impact and a lower resulting peak acceleration. The strip connection may have different embodiments. One such embodiment will be a "U" shaped metal or other link where the curve of the "U" faces forward and the legs of the "U" are attached to the inner and the outer shell respectively. The legs may also be extended to provide a structural support for the inner shell. 126A—Strip connection between inner and outer shell for shear plane in lateral direction but the ability to twist and also allow the seat to tip forward by bending.

FIG. 127 shows the normal and compressed position of foam fingers that can be used to connect the inner and outer shell. A structure with opening will give a lower shear loading but provide compression support that may be useful in some of the connections.

FIG. 129 shows another embodiment of the child seat. Here the inner shell is supported by a shock strip that bends or distorts upon impact. This support is supplemented with support at about the head to shoulder level on the sides and other places that could improve the kinematics upon impact. The fig shows four views of the seat in the front facing position it also shows the extended latches. These latches in this embodiment are attached to cables that each run over a guide and up along a slot in the two towers at the back to attach to twin tethers that are secured together at the end through a tensioning device this not only tensions the tether but the latches as well. It is therefore a simple two stage operation. Push the latches into the back of the seat (the latches themselves may be spring loaded to ensure that pushing the seat back will also push and engage the latches. 2) clip on the tethers at the tether mount point and then use the single tensioner to tension all four securing points. A separator that can bear compressive forces may be used at the height of the Car seat back to keep the twin tethers apart at that point. This separator may also be designed to engage the top of the car seat to increase stability.

FIG. 130 shows the same seat in the rearward facing position. The seat is designed to take a low profile and therefore transfer the forces on front impact more directly to the latch points. More over some embodiments may have a sliding mid-section that can reduce or increase the leg room of the child in the rear facing position. The mid-section has a pivoting flange that supports the safety cage. This pivoting flange takes two positions for front and rear facing seats and an intermediate position for egress and ingress with a side facing seat. The flange is supported in the front facing position in some embodiments with a "cam" arrangement where the rotation of its axis enabled with levers on either or both side of the seat will increase the radius of engagement of the cam with the flange and push the front side of the flange up so that the angle for the front facing seat can be attained. It will of course need to be locked in that position and this can follow many solutions in the back ground art but also by having a reduction in the cam radius at its end where it is designed not to rotate any further and ensure that the flange is in the right position for front facing seats at that point. Any loading on the Cam will only push it forward to its end stop position. Arrangement need to be made for the locking the cam in place for the substantially flat egress, ingress position and also for the rear facing position.

FIG. 132 shows the same seat in the egress ingress position. Again the Cam is not shown but will support the flange and the seat in this position. The seat faces sideways for egress and ingress.

FIG. 133 show the flange without the seat on it. It is in the position for the rear facing seat. 133A shows the flange.

FIG. 134 shows the flange in the position for the front facing seat. Again the Cam or other actuation device to support the flange in this and other positions is not shown.

FIG. 135 shows the Safety Cage. 135A—support for the inner shell may be on any point on the cage to get optimal kinematics. 135B—Bunge sling if used will have either the bunge pin or slot attached here to the cage. 135C—Socket for Boss. Boss is used for engaging and releasing the safety cage from the flange for rotating and locking the seat in the front, back and side facing positions. The socket has teeth than engage into notches in the boss in the correct orientation for the positions noted. 135D shows the attachment points for the Shock Strip to the safety cage.

FIG. 136 shows the safety cage with the shock strip installed. 136A—Shock strip has extension here to the back of the shell for increase in the rigidity and strength of the inner shell. 136B—Shock strip and safety cage have matching apertures for the boss that engages these to the flange in multiple positions (front facing, rear facing and side facing for egress and ingress). 136C—Front curved surface of the shock strip will bend up on front impact or twist on side impact. 136D—Side wings of the upper section of the shock strip if present are used or support elements attached to the safety cage on the sides for optimize the kinematics under impact. 136E—Shock strip has upper leg supporting the inner shell. It may be extended to the back of the shell and in fact may even have arms to the sides to provide further strength to the shell.

FIG. 137 shows the shock strip. As can be seen it is attached at the bottom to the cage and has a boss engagement aperture. The boss may be spring loaded and be pushed up into the space above the aperture to disengage and rotate the seat.

FIG. 138 shows the shock strip under lateral impact loading. As can be seen the hairpin section at the bottom distorts to allow the bottom of the seat to rotate. The controlled forces on the top of the "T" arms will determine the extent of motion and rotation for the top end of the seat. The figure shows rotation for this embodiment from the normal position.

FIG. 139 shows an embodiment of this version of the child seat with a Bunge Sling as disclosed herein. The towers at the back have a support connector and the Bunge sling is attached with the Bunge Pin to it. the Pin will engage the Bunge Slot (not shown) that is attached to the safety cage (there may also be attachments between the safety cage and the shell to optimize the kinematics under loading) the Slot will however allow the Pin to slide out foe lateral movement of the seat back/safety cage back, under lateral loadings or for egress and ingress. 139 A Bunge Pin. 139B—Bunge Sling.

FIG. 140 shows the inner shell of the seat attached to the Shock Strip and the Shock Strip attached to the Safety Cage. 140A on the safety cage provides points for support of the inner shell to optimize the kinematics. 140B—is the aperture for boss that engages the cage to the flange below. 140 C—shock absorber supports the inner shell and twists for side impact and opens up for front impact in the front facing position.

FIG. 131 shows the inner shell attached to the Shock Strip.

FIG. 141 shows a work mate that is designed to help workers who bend forward to work. It is a mechanism that senses the position of the upper body and with an estimate of the occupant's upper body mass actuates a control arm that counterbalances the upper body, thereby keeping the center of mass of the user vertically above the feet of the user, and thereby reducing some of the loadings on the spine in keeping a bent posture while working. Some variations of the invention may also have wired or wireless sensors for the positions of the arms and other parts of the upper body to provide inputs for the control to get an even better estimate of the position of the center of mass of the upper body and thereby control the position of the control arm better for the same objective. A further enhanced embodiment uses the same mechanism for lateral movements of the upper body and uses a second arm or the same arm with control in a lateral direction to keep the resulting center of mass of the user and the invention above the feet of the user. 141A is a support arm; 141B is a support belt that keeps the support arm next to the user's upper body. 141C is the anchor belt that attaches above the hips of the user; 141D is the control arm that can have length and angular displacements of the weight at its end to counterbalance as noted above.

DETAILED DESCRIPTION OF INVENTION

Vehicle Occupant Support—Air Sleeper.

There are multiple challenges that need to be addressed in creating a flat bed that can also be modified to an upright seat in a multi occupant vehicle—particularly in aircraft.

1. The independent discretionary use of the position desired by the occupant regardless of the positions chosen by other occupants.

2. The independence of egress and ingress to and from the seat/flatbed, regardless of the position of other occupants in adjoining seats/flatbeds.

3. The safety in the event of a rapid deceleration of the aircraft or other vehicle in any position of the flatbed/seat (i.e. reclining, flat or upright).

4. The utilization of space and real-estate on the vehicle to minimize the cost of transport in the vehicle for each occupant.

There have been many efforts to mitigate and even solve these problems. This invention provides a unique solution for solving any or all of these problems in different embodiments. There are several versions of the present invention and some embodiments are provided herein as examples.

The principal consideration in a vehicle such as an aircraft for the design of seats and flat beds is the utilization of space. The present invention has a unique arrangement for tiered seat/flat beds that allow a sitting position for the occupant as well as a flat bed position by staggering the lateral location of the occupants thereby utilizing space that in a sitting position With a small form factor accommodates sitting and flat bed positions and all positions in between. In this invention the position of the occupant in an upright sitting position utilizes the space between the shoulders of occupants on the lower tier, thereby allowing a smaller height requirement for each of the tiers of seats/flatbeds. Moreover, the arrangement does not obstruct egress or ingress of the occupants in the lower tier. Furthermore the architecture allows each of the occupants to take any position without affecting the egress ingress of other occupants or obstructing any position chosen by other occupants. This arrangement can therefore be an enabling technology for attaining passenger densities comparable and even exceeding conventional seating arrangements in aircraft without flatbed options. For example in the figures there are several embodiments that can have three tiers that fit into a conventional aircraft cabin (either lateral or angled). The seat/flat bed widths shown are approximately 30" which is far in excess of what is possible for seats in economy (for example with a 32" pitch and 20" width). The passenger densities can be increased further by reducing the width of the seat/flatbeds. If taller occupants need to be accommodated, the seat/flatbeds may be angled as shown in some of the figures.

The seat/flatbed back can itself have a shape that maximizes the available length. i.e. the top of the seat back can be angled with the longer side providing more headroom for taller occupants.

Moreover, the seat bottom can be tilted up at the front to give more leg room if necessary. This can be achieved in some embodiments with a pair of pivots at the back of the seat bottom so that the seat bottom can be pivoted up at the front edge to give more leg room. This can also be done with a sliding seat with pivoted rails on which the seat bottom can slide front and back, pivoted on the back.

Lateral Deployment

The Sleepers in flat bed configuration require the length of the bed only. Therefore a six foot adult can comfortably stretch out in beds that are deployed three abreast. In addition if this is serviced by two aisles that are each 21" wide then we have a cabin that is 258" wide accommodating three abreast. Considering that the Occupant supports can be tiered vertically and that three tiers with sitting height can be accommodated in the present invention, a form factor that is even more efficient than conventional economy class can be reached.

Three tiers and the staggering of the tiers while the middle tier loses one Flat bed per row in a cabin.

Angled Deployment

The Flat beds can have heads that are angles to utilize all the available space

The angle can be raked to the extent necessary to allow a fit.

The width of the flat beds can be changed to accommodate more flat beds.

Safety—Certification for any Position

Some embodiments of the present invention can be certified for all positions of the occupant in flight including take off and landing, considering that there can be lateral reaction surfaces to support the occupant in the event of a rapid deceleration of the vehicle—such as in an emergency landing or a crash.

The lateral support element or elements may be the sides of the cabin—if it has sides that are raised above the level of the seatback and bottom, or with the seat back and bottoms themselves—if they have side wings. Notably only one side wing ahead of the occupant in the direction of motion of the vehicle is required.

In the event of an angular deployment of the occupants, The present invention will still enable the deployment of support surfaces ahead of the occupant. However in addition there will be a reaction surface required for the feet of the occupant as well. Therefore in such angled embodiments, that need to have the safety arrangement, there will usually be a near vertical foot support surface. Thus may even be a part of the foot rest that hinges up as seen in some of the figures.

Possible Geometries for the Flat Bed Cabin

The Enclosed Cabin

Screens that can be deployed by occupant. The panels of the enclosed cabin may be hard or soft and may be made of light fabric on a frame.

The screens may be in two sections the top part of the screen may be open and the bottom may be deployed for privacy.

The Open-Bed Cabin

Here the head of the occupant protrudes along with the seat back behind the cabin enclosure, when in the flat bed position and moves towards the enclosure as the seat back is raised. In such an embodiment, deployment of reading lights and headphones could be on the back rest of the seat/flat bed. Such an embodiment while providing less privacy will give a sense of greater space particularly in tight deployment configurations.

In both these cabin embodiments the video screen can be on the formed sections ahead of the occupant. If they are large screens they can be folded on to the side of the cabin for egress and ingress.

The Fully Open Cabin.

This embodiment is even more open than the open-bed cabin. The advantage is that the occupants in the lower air sleepers do not have the formed region in front that they will face in the sitting position. In this configuration it is likely that the screen will be flipped down from the ceiling or from the side. Similarly the cabin controls may be installed on the ceiling or the side.

In order to protect the lower Air-sleeper occupants from encountering the feet of the upper Air Sleeper occupants, the foot rest in this configuration may have sides (please see figures)

The Foot rest will have a bottom as this embodiment does not have the cowling that the enclosed and open-bed cabins have. The strength of the foot rest is also designed to accommodate the weight of the occupant.

The side wings of the foot rest may be designed to open out as the foot rest is raised thereby giving the occupant a wider foot area when in the reclining or flat bed configurations.

This embodiment (and possible others also) may have a folding and/or retractable ladder mounted on the top Air sleeper foot rest and also on the edge of the ceiling of the lower Air sleeper to aid the top Air Sleeper occupant for egress and ingress.

The Double Bed Configuration

Any of the cabin architectures are potentially adaptable to having a double bed configuration. Here the side supports of the Upper flat bed are folded down or lowered (manually or by mechanical/automated means). They may also be folded out where possible to provide a contiguous surface when the occupant support is in a flat or recline position. Certification for the flat bed in the double bed configuration may be limited as the lateral supports are not deployed to support the occupant in the event of rapid deceleration. The enclosed cabin may require the retraction of a part of the side panels.

Tilting Seat Bottom

With a view to gaining greater comfort an inclined position of the seat bottom may be preferred. The occupant support provides a tilting and sliding surface for the seat bottom. This bottom may be mounted on a pair of rails that can be tilted to raise the seat lip, and such that the seat bottom can slide on these rails.

The TV Screen

Several possibilities including a large flat screen that can fold to the side. Another version can have the TV screen mounted on one of the front surfaces that the occupant faces. (see figure)

Front Privacy Screen.

Security and occupant monitoring and video intercom for passengers.

A camera may be mounted on each of the cabin tops to note the presence and position of the occupants—particularly during takeoff and landing. The field of the Camera may be limited to allow privacy. The occupant may also be given the view provided by the camera on one of the video channels on his/her screen.

Bottom Tier—Treatments

The geometry of the present invention can allow storage to alternate with the leg space of the bottom tier occupants.

However, if vertical space needs to be conserved, the bottom tier occupant leg space can be in wells that are created on the floor of the vehicle (in an aircraft there is flexibility in structural requirements of the floor and it can accommodate such wells) Alternatively the bottom tier seat/flat beds may have no vertical sitting option but simply the option to angle the seat bottom to create the required leg room. Bottom tier occupants may be given other amenities to compensate for this or even pay a lower fare.

Getting to the Top Flat Bed

If there are three or more berths, and no elevated walkway to access the higher tiers, ladders for each of the top seats or for gangs of top seats need to be engineered. The figures some options for these. One alternative would be to have a ladder that folds into the foot rest of the top tier seat and another that fold over the ceiling of the lower berth.

Another solution is to have a pull out walk way (see figure) with a single ladder on the end of each gang of seats.

There are multiple challenges that need to be addressed in creating a flat bed that can also be modified to an upright seat in a multi occupant vehicle—particularly in aircraft.

5. The independent discretionary use of the position desired by the occupant regardless of the positions chosen by other occupants.

6. The independence of egress and ingress to and from the seat/flatbed, regardless of the position of other occupants in adjoining seats/flatbeds.

7. The safety in the event of a rapid deceleration of the aircraft or other vehicle in any position of the flatbed/seat (i.e. reclining, flat or upright).

8. The utilization of space and real-estate on the vehicle to minimize the cost of transport in the vehicle for each occupant.

There have been many efforts to mitigate and even solve these problems. This invention provides a unique solution for solving any or all of these problems in different embodiments. There are several versions of the present invention and some embodiments are provided herein as examples.

The principal consideration in a vehicle such as an aircraft for the design of seats and flat beds is the utilization of space. The present invention has a unique arrangement for tiered seat/flat beds that allow a sitting position for the occupant as well as a flat bed position by staggering the lateral location of the occupants thereby utilizing space that in a sitting position With a small form factor accommodates sitting and flat bed positions and all positions in between. In this invention the position of the occupant in an upright sitting position utilizes the space between the shoulders of occupants on the lower tier, thereby allowing a smaller height requirement for each of the tiers of seats/flatbeds. Moreover, the arrangement does not obstruct egress or ingress of the occupants in the lower tier. Furthermore the architecture allows each of the occupants to take any position without affecting the egress ingress of other occupants or obstructing any position chosen by other occupants. This arrangement can therefore be an enabling technology for attaining passenger densities comparable and even exceeding conventional seating arrangements in aircraft without flatbed options. For example in the figures there are several embodiments that can have three tiers that fit into a conventional aircraft cabin (either lateral or angled). The seat/flat bed widths shown are approximately 30" which is far in excess of what is possible for seats in economy (for example with a 32" pitch and 20" width). The passenger densities can be increased further by reducing the width of the seat/flatbeds. If taller occupants need to be The present application focuses on several possible 2 tier embodiments that have a storage bin for each passenger.

The Storage Bins

The upper row of Air Sleepers have an upper bin and the lower row of air sleepers have a lower bin. (other embodiments can have larger and longer bins to serve multiple passengers as in conventional aircraft architectures). Each of the storage bins in these embodiments have two access openings (with doors or covering mechanisms possible in some embodiments) The upper bin can be accessed from the Aisle as in conventional architectures and by the upper row Air Sleeper passenger from the back as well while in the Air Sleeper. The lower bin can be accessed below the lower Air Sleeper and by the passenger in the lower Air Sleeper by tilting forward the seat back for the rear access opening with appropriate doors. In a variation of these embodiments the seat back itself may have a hinged or sliding panel that allows access to the lower bin when the Air Sleeper is in the Flat Bed Position.

The Video Screen

In the embodiments in the present invention the video screen is shown to hinge down from the ceiling.

Emergency Oxygen Supply

The emergency oxygen supply can be from masks stored behind an emergency door that in some embodiments may be behind the video screen. The door for the emergency oxygen supply is designed to open regardless of the position of the video screen. In other embodiments the oxygen supply door may be separate to the video screen. In some embodiments if the space at the top of the Air Sleeper (and below the seat bottom of the Air Sleeper above is not sufficient for normal oxygen masks, accordion type collapsing masks may be employed. The oxygen supply leads and the control wires for the deployment are in many embodiments modular and may be connected to the main supply and control leads when the Air Sleeper module is installed.

Security and occupant monitoring and video intercom for passengers.

A camera may be mounted on each of the cabin tops to note the presence and position of the occupants—particularly during takeoff and landing. The field of the Camera may be limited to allow privacy. The occupant may also be given the view provided by the camera on one of the video channels on his/her screen. A possible position of the camera is shown in some of the figures. There may also be a facility for video conferencing between Air Sleepers using the network of the Air craft particularly if there is a microphone available as well for the Air Sleeper passengers. Such a system could require consent between two or more passengers for a conference or a video call.

The microphone can be mounted on the side of the seat back with a flexible stem for the convenience of the passenger.

Bottom Tier—Treatments

The lower row of Air Sleeper passengers are placed in staggered positions to the top row air sleeper passengers and therefore even when the top tier passengers have their leg rests down in the sitting position, the lower tier passengers have egress and ingress possible. The foot rest for the lower tier does not need the bottom flange ad the floor of the cabin will serve that purpose in these embodiments.

Getting to the Top Flat Bed

These embodiments have 3 step to reach the upper Air Sleepers. The figures show these steps and also the handles that are mounted on the sides of the upper tier of Air Sleepers to facilitate this action. Moreover these handles can be used to steady passengers walking along the Aisle in turbulent conditions.

Foot Rest—Top Flat Bed

The foot rest for the top air sleeper has a horizontal support flange in some embodiments. There may also be alternative embodiments (as in related applications filed) where the Air Sleeper frame has a horizontal support flange.

The sides of the bottom flange that will support the weight of the passenger when in the sitting position in the embodiments shown in the figures will usually have side flanges so that the feet of the upper tier passengers are not encountered by the lower tier passengers. These side flaps may be rigid as shown in some embodiments, pivotally attached to fold down when the foot rest is in the flat bed position or in still other embodiments fabricated with a fan fold structure so that it collapses to a flat form when in the flat bed position but fans out when the foot rest is lowered.

Life Vest/Jacket

Safety requires easily accessible life vests. Some of the figures illustrate a possible position for the installation of the Life Vest container with suitable markings.

Support for Seat Back in Flat Bed Position

Some embodiments will have an Air Sleeper enclosure that extends sufficiently behind the seat bottom to below part of the seat back when in the flat bed position to provide it support. This will reduce the structural load in fabrication of the seat back support at the pivot points.

Reading Light/Head Phones

These may be installed at the top end of the seat back so that they may be used in all positions of the seat back.

Support Frame and Optional Support Rail

The Air Sleeper architectures in these embodiments have a support frame/foot that has vertical sections usually vertically above the cabin floor tracks/rails where these vertical sections are mounted with their feet to the latches on the cabin floor rails/tracks. The two or more vertical sections are tied together with cross links to give the support frame structural stability. These cross links in some embodiments may be secure at different points by the vertical sections to accommodate difference cabin floor tracks/rails in different air craft.

Many embodiments have adjoining vertical sections of the support frames interlocking using approaches well disclosed I the literature, so that forces are transmitted across these members and greater structural strength and stability is attained. One important benefit in this interlocking is that the inertial loading on impact on the air sleepers will be mitigated at the latch points. This is unlike conventional seats where each seat creates a couple that has a tensile and a compressive loading on the latches.

The support frames may be directly connected to the lower tier of air sleepers. They may also be connected through a spring damper loaded support rail that slides on the top of the support frame. This facility allows the inertial loading of the Air sleeper on impact of the aircraft, to slide the support rail forward a limited amount thereby reducing the peak loading on the passengers and also on the latches attached to the cabin floor rails/tracks.

The support rails may also be attached pivotally (with a vertical axis) to the air sleeper above to allow a possible differential movement between the two or more support rails.

In some embodiments the top edge of the support frame can be inclined such that on impact (water or ground contact) the support rail rides up while it rides forward. This will provide a mechanism to force sleeping occupants down on their Air Sleepers. It is notable that all the connected Air Sleepers will move the same way with the inertial loading and therefore all ride up the inclined support frame top edges. The interlocked support frames will have a top edge that will have a saw tooth profile and each support rail will ride up one of these. In these embodiments the attachment points of the support rail to the Air Sleeper may have a reverse incline to ensure that the AirSleepers are horizontal.

Support Frame and Optional Support Rail

The Air Sleepers themselves are modular and may in some embodiments be interlocked together for further strength and structural stability. The staggered configuration will further strengthen the structure (very much as a honey comb structure would).

Overall the air sleepers and the support structure for these reasons will have a tendency to increase the strength of the fuselage sections where they are deployed and therefore reduce the damage in a severe crash thereby protecting the passengers.

However, some fuselage designs will require some flexing of the structure and therefore the foot-frames may be limited to transferring the substantially vertical forces between adjoining foot-frames that will tend to neutralize the alternating tensile and compressive loads of the individual foot-frames while allowing some sliding in the direction of the tracks. One such embodiment would be simply a flange at the bottom of the fore foot-frame that lies below a recess on the aft foot-frame for each pair of adjoining foot-frames.

Notably this design for support is not limited to direct connection of the foot-frames to the tracks but can be with latches and also with intermediate support structures that transfer the loads to the tracks.

The Air sleeper architectures may further strengthen the fuselage sections if they are linked to the upper side of the fuselage as well as possibly on tracks that support the storage bins in conventional architectures.

Other embodiments may be attached to the bin tracks and other support points towards the upper part of the cabin with load limiters so that the maximum level of stability can be gained from these connections without exceeding the design limits for those support points.

Gravity Synthesizer

Gravity Synthesizer embodiment with two parts the first is attached directly or indirectly to the seat bottom and the second is attached to the support structure. It is designed to use the inertial loading during an impact or rapid deceleration of the vehicle in the direction of motion to one or both of:

1. create an inertial loading vertically with regard to the air sleeper thereby increasing the reactive force of the Air Sleeper/seat and the related
 a. Frictional loadings to retain the occupant in a flat bed position or reclining position
 b. To compress softer materials supporting occupant thereby providing a contoured harder surface to hold selected parts of the occupant in positions that could reduce injury. Such support could be in a firm support just above the shoulders to prevent the shoulders riding up in an Air Sleeper that is in a substantially flat bed position and also inclined to have the head further forward than the feet in the direction of motion of the vehicle. Thereby reducing compression of the neck.
2. To rotate the Air Sleeper by a small angle about an axis substantially aligned to the axis of the occupant thereby rotating the normal reaction from the Air Sleeper on the occupant in a substantially flat bed position to be slightly rear facing thereby providing a support surface during deceleration while in that substantially flat bed position. The pins (guiding element 1) and tracks (guiding element 2) together lead the motion of the Air Sleeper in the desired direction. Some embodiments will have a pivotal point for the Air Sleeper that is attached to one of the two guiding elements and the pins (in some embodiments) will move about that pivotal point along the surfaces of the guides (in some embodiments). There can be several such pin/guide combinations at different angular directions from the pivotal point—the pins and the guides are designed such that all such pins moving along their respective guides to ensure that the pivotal point is maintained to provide the 3 dimensional rotation of the Air Sleeper desired. Motion of the moving guide elements may be on surfaces of spheres centered at the pivot point at one or more diameters from the pivot point.

The shape of the guides will determine the trajectory of the Air Sleeper.

Notably in many embodiments the head end of the Air Sleeper will be cantilevered and a small angular rotation of the Gravity synthesizer can result is a significant movement of the head end of the Air Sleeper for the required protection role.

It is important to ensure that the lateral motion of the Air Sleeper under impact loading is not prevented by the support structure for the Air Sleeper. Therefore for example in some embodiments where there is a flap to support the base of the backrest in the flat bed position, any vertical protrusions on the sides of the Air Sleeper must if present be deformable under load as the Air Sleeper rotates in a controlled fashion under impact.

In this context, notably the hip width of the Air sleeper at the seat bottom may be narrower and therefore have some clearance from the support structure and the adjoining Air Sleepers if any. This can provide the needed clearance. In fact some embodiments will use the difference in width between the hip section of the seat bottom/bottom end of the seat back and the higher on the seat back (towards the head) for the thickness of the support structure if needed.

Another embodiment of the Gravity Synthesizer is simply two sliding rings with the surface of contact an oblique section relative to the axis of the cylinders that define them. (it can also be multiple radial sections of one or more such cylinders with the same angle of the oblique section to the common axis of the defining cylinders.

Frame—Sliding and Tilting of Seat Bottom

An additional (optional) feature of the Air Sleeper is the frame structure. This may be used with or without the Gravity Synthesizer. It allows for the movement of the seat bottom backwards and forwards. The backward movement allows the occupant I the reclining or sitting position to capture more of the personal space available. There could be limit arrangements to limit rearward motion depending on the angle of recline to avoid contact with the side of the aircraft or extend into the aisle i.e. to keep each air sleeper within its designated space. Particularly in the absence of a Gravity Synthesizer, this frame structure can in addition have a linear spring damper arrangement in the direction of motion of the vehicle to protect the occupant by damping the motion during rapid deceleration.

Motion can be actuated manually or with servo mechanisms.

Air Sleeper—Support by and/or Strengthening of the Aircraft Fuselage.

Another embodiment of the Air Sleeper in a vehicle such as an aircraft may be deployed so that the roof and floor support of the Air Sleeper can strengthen the structure of the fuselage and some embodiments may use these designs for ensuring that the fuselage sections with the Air Sleepers do not disintegrate on water or ground contact. Further embodiments, may design fracture lines for the fuselage at the ends of the cabins in the event of a crash, and design underbelly rafts that can support these fuselage sections and thereby avoid the trauma of evacuation of the aircraft in a crash.

Such designs may reduce the structural demands of the floor in a multi deck aircraft and thereby allow cut outs that facilitate visual or physical access between the levels for example along the aisles.

Ambiance.

In many embodiments the clearance between the upper bins and the ceiling will provide a sense of space which can be enhanced with special lighting on the ceiling.

Another Air Sleeper Embodiment and Internal Features

Several embodiments of the Air Sleeper module have been. The following are features that can be incorporated in many of these embodiments. Fan type screens for side privacy. The screen may be installed on one or both sides of each Air Sleeper. A second fan style screen with a smaller radius and similar center can also be installed to go further forward for privacy lower relative to the Air Sleeper surface while clearing the higher obstacles if any. Side braces on the support structure for the sleeper back will need to be deformable if controlled rotation or other motion of the Air Sleeper is allowed under impact conditions. Such side braces may not be necessary in some embodiments.

The embodiment also shows privacy and support sides and back. Particularly useful when in the flat bed position with retaining surfaces for the occupant as well as pillows.

The embodiment also shows an optional cut out at rear wall to allow camera view in all positions and/or screen/oxygen door retraction in all positions.

As noted herein with regard to protection under impact or deceleration conditions, locations around the top section of the seat back on the Air Sleeper in some embodiments will have firmer support arrangements (in some cases foam) along the side edges for a distance from the top edge to a point level where the shoulders of most occupants will lie to resist riding up of the passenger in the flat bed position when the flat bet is at an angle to direction of the vehicle with the head ahead of the feet under impact loading conditions. Such firmer support may not even be felt under normal conditions with normal G reaction forces and the weight of the passenger but become relevant under impact loading and compression of the softer foams or other support arrangements.

As noted elsewhere, the side sections of the Air sleeper frame that protrude vertically from the support section under the seat bottom, may need to be limited in extent to allow the rotational motion of the gravity synthesizer or other impact protection mechanism requiring a lateral movement of the seat bottom at its rear end. The seat may be narrowed at the front end as well to allow this small rotational displacement.

Notably the width of the seat bottom may be designed to be less than the upper part of the seat back. This will allow some clearance of the seat bottom that is supported by the support structure to allow rotation of the seat bottom under impact in some embodiments.

In some embodiments the narrower hip and seat bottom widths can enable the support structure to have side sections of considerable thickness and still allow the wider Sleeper back to utilize more of the lateral space as they are at a position that do not need the support structure.

Camera—Monitoring—Inter-Passenger Video Conference

A network of cameras may be mounted in each of the Air Sleepers to fulfill the monitoring requirements. A possible camera position for monitoring the occupant is illustrated. Notably there is a tradeoff between monitorability and privacy. The camera may be focused on the head area and a channel on the video system may carry each passenger his/her own image.

Such a camera on each Air Sleeper the image in the network will also facilitate a video conferencing system between passengers that will allow passengers to "call up" other passengers and see their video images. Microphones can be installed on the backrest of the Air Sleepers.

Architecture: Ensures Oxygen and Screen Deployment Always

The cutout structure in the seat back ensures that the oxygen door is never obstructed as is the screen—even when the seat back is upright.

Guides for Cables and Ducting Below Floor to Allow Foot Wells in High Density Deployments In some embodiments of the Air Sleeper with multiple tiers where vertical space is critical, the lowest tier may be lowered by installing foot wells for the bottom tier occupants. If there are cables and other ducting and pipes below the floor, guides can be installed to streamline these so that they avoid locations where the wells may be placed.

Using the Length of the Air Sleeper Efficiently in Angular Deployments

In embodiments where the Air Sleeper is oriented at an angle to the lateral position, the side wall of the fuselage will be at an angle to the top of the Air Sleeper. Therefore the seatback of the Air Sleeper that reclines to the flat bed may have an angled top to utilize all the space right up to the surface of the fuselage inner wall with a clearance. Occupants can utilize extra length while sleeping by orienting to place the head at the corner that is longer.

Grabber Surface on Sleeper for Impact Protection

With reference to the gravity synthesizer in the referenced applications incorporated herein by reference, a transient inertial loading is applied to the occupant to push the occupant towards the sleeper thereby preventing injury. This mechanism is made more effective with a set of ridges that are formed on the surface of the sleeper back and bottom below the soft cushions or comfort surface. During the impact the soft cushions or comfort surface will bottom out to allow the occupant to contact the ridges and thereby be held in place for the few milliseconds of the impact. Clearly the ridges are designed not to injure the occupant but provide adequate resistance to movement. Some embodiments will have the ridges at right angles to the sleeper axis (occupant axis) Others may have it at an angle to the axis. The choice of the angle will depend on two functions: First to stop the occupant body from moving towards the top of the sleeper and thereby compress the neck in the event of contact of the head with the top edge of the sleeper; Second to resist the motion of the occupant towards the front of the vehicle or aircraft in the event of a sharp deceleration or collision.

Table in Air Sleepers

A deployable table top may be included in some embodiments of the Air Sleeper for example in those in FIG. 4-1.

Such table tops bay be pivotally attached to the side of the Air Sleeper structure and fold in to the available space. In addition, some embodiments may have a spring loaded pivotal attachment with a vertical axis near the pivot of support on the side of the Air Sleeper structure, so that in the event of an emergency, evacuation is easy, by simply pushing the tabletop forward with the body, to allow the table top to pivot forward and to the side of the occupant thereby allowing egress quickly. The spring loading will keep the table top in the desired position in normal use.

Seat Bottom Forward Extensions.

Embodiments may have several possible shapes and sizes of forward extensions of the seat bottom on the sides of the foot rest. These have the functionality of providing a broader flat bed surface when the sleeper is in that position and also may be used as a temporary seat during egress and ingress. These forward extensions may be adjusted in size and shape to allow the lower Sleeper occupant to stand adjoining the Sleeper front.

Privacy Separators on Foot Rest

With a view to isolating the space of the lower Sleeper occupant from the Foot rest space of the upper sleepers, separators may be deployed on the edge of the foot rest and the edge of the Seat Bottom Forward Extensions noted.

These may have a "fan-fold" structure and fold up to a narrow strip when the foot rest is in the flat bed position or fan out downwards when in the sit up or recline. The separator may also be a pair of rigid flaps that are pivotally mounted on the vertical edges for the foot rest (vertical being in the sit up position for the footrest) and deployed to touch the side extensions and even in some embodiments to be slidably connected to the side extensions. When the foot rest is lowered the flaps slide down with the foot rest and lie on either side of the foot rest. When the foot rest is raised, the flaps slide up and when in the flat bed position the flaps may be pivoted out on top of the forward extensions, to provide a flat surface.

Lower Sleeper Foot Rest—Alternative Embodiments

The foot rests for the lower sleeper may be as shown in the figures or may simply be a flap with no bottom surface as the occupant will stand on the floor of the vehicle or aircraft.

Bottom Storage Bin

Some embodiments of the bottom bin have a drawer in front and a sliding door at the back for easy access to stored materials.

Accessing the Rear Opening of the Lower Storage Bin

The lower bin rear opening can be accessed either directly by folding forward the seat back or in some embodiments the back cushion (or a part of it) of the air sleeper/seat may pivot on its side edges and be split in the center and therefore be enabled to open upwards as a pair of doors to reveal the bin opening below (with a sliding door if desired).

Recessed Upper Storage Bin to Enable Upright Standing on the Foot Rest of the Upper Sleeper.

The Upper Storage Bin may be recessed backwards to allow the occupant to stand on the foot rest upright. It is particularly useful for accessing the front opening of the upper bin.

Handled for Egress and Ingress to Upper Sleepers.

The Figures show handles that may be deployed in many positions for supporting the occupant during egress and ingress.

Angled Deployment of Sleepers in the "Family" or Bank.

As shown in the figures the Air sleepers may be deployed at an angle to the lateral position.

Such deployments may used a skewed support frame/foot (similar to the square frame/foot shown in FIG. 67) where the vertical members that are in the direction of the seat tracks are placed so that the two parallel members attach to the angled Air Sleeper rather than a lateral Air Sleeper. I.e. one vertical member is ahead of the other and the ties (shown as cylinders) are at an angle to the orthogonal from these vertical members. This will ensure that each sleeper has its own frame. The tie structure across these frames for the family for Sleepers is the same as in the orthogonal case.

Latch for Attachment to Seat Tracks and Other Tracks.

A latch structure that can be used for the lower seat tracks or the upper bin tracks to support the Air Sleeper structures.

Here locking stud, slides into the apertures in the track and slides along the groove in track. One latch on each frame (see other drawings) will have a pin to lock it horizontally, to allow displacement of the other latches from perfect alignment due tolerance errors. The track has apertures to insert the studs. Studs then slide to the central point between the apertures to allow tensile loading to be supported by the tracks.

A pin is shown for locking the latch and supporting shear loads. This embodiment has a recessed shoulder to accommodate spring for loading pin towards the bottom of the circular slot in the track.

Pin supports shear loadings along track.

The Frame (e.g. as in FIG. 67) can rest on notch on latch body if high compressive loads are experienced particularly if the pin bends as a result of the loading.

Frame/Foot Attachment and Design

From the figures it may be seen that: The vertical slots are shown to be elongated to allow for the errors within tolerance of the positions of the adjoining frames/feet. The horizontal surfaces on the interlocking notches are designed to have some slidability to allow such errors in tolerance. However the interlocking notches in most embodiments will support vertical forces from each other to increase the rigidity of the structure comprising these frames/feet and reduce in many cases the tensile and compressive loads of the sat tracks under sharp acceleration conditions of the vehicle. The apertures at the bottom of the frames engage the latch apertures. In this embodiment a pin (no shown) is used for the attachment. The frame may have telescoping cylinders to allow for errors within tolerance of the seat track spacing and to allow deployment in aircraft with different inter track distances.

Some embodiments will be designed to allow flexing of the airframe during impact conditions, rather than utilize the rigidity of the beam structure with regard to flexing of the airframe. However, such embodiments will need to provide the substantially vertical forces between the foot-frame sections for supporting the airsleepers. ie during a rapid deceleration of the aircraft the tendency of each foot frame to tilt forwards with the inertial loading of the air sleeper, which is countered by support flanges in the fore foot-frame below and engaged to support flanges in the immediately aft foot-frame.
Alternative Embodiment of Air Sleeper with Rising and Forward Moving Seat Bottom in Flat Bed Position.

Other embodiments of the Air Sleeper with the backrest pivoted at about the level of the arm rests and pivotally attached near its lower edge to the seat bottom of the Air Sleeper near its rear edge. The front of the seat bottom is pivotally attached to arms that are themselves pivotally attached to the sleeper support at about the level of the arm rests. Therefore the seat back and the arms are approximately parallel. The lengths of the arms relative to the length between the lower end of the seat back and its pivot near the arm rests will a factor in the level of tilt of the seat bottom. A second factor for this tilt will be the angle of the arms relative to the seat back.

As the seat back is inclined backwards the seat bottom is raised until in the flat bed position the seat bottom is approximately at the arm rest height. The entire sleeper also moves forwards.

This embodiment allows the arm from the shoulder to the hands to be rested on either the side wings of the back rest or the arm rests. The elbow will be at a point near the pivot of the seat back.

Alternative Embodiment of Air Sleeper with Upper Tier at Shoulder Height of the Lower Tier.

Some embodiments as in this figure may have a recessed hear rest section to accommodate the adjoining arm rests of sleepers at a higher level. Such narrower head rest sections can also be designed to be effective for protection of the head during rapid deceleration of the aircraft or vehicle.
Alternative Embodiment of Air Sleeper with Rising and Rearward Moving Seat Bottom in Flat Bed Position.

Another embodiment has seat back with an arm that raises the seat back as it is inclined to the horizontal flat bed position. This arm is substantially parallel to another shadow arm at the front of the seat support that is pivotally attached to the front of the seat bottom. As the seat back reclines this shadow arm and the seat back (which is pivotally attached near its lower edge to the seat bottom) raise the seat bottom to near the arm rest height to provide a broader sleeping surface. Considering that near the flat bed position, the force of the shadow arm on the seat bottom is nearly horizontal (orthogonal to the movement desired of the seat bottom) the movement needs to be enabled by manual or other actuation on the seat bottom. It will also need to support the seat bottom as the shadow arm may not be able to support the load in this position.
Emergency Oxygen System An oronasal mask is configured to fit against a passenger's face and is held in place by an elastic band that extends about the back of the head as is normal practice. The usual inflatable reservoir bag is not necessary as the bellow like structure of the mask provide the buffering required for the breathing cycle of the user. An inlet valve controls the flow of oxygen into the collapsible mask. The mask includes an inhalation valve that is configured to allow oxygen that has accumulated in the bag to be drawn into the mask during inhalation and to prevent any flow from the mask into oxygen supply line. The mask additionally includes a dilution valve that is configured to allow ambient cabin air to be drawn in the mask only after the bag contents has been depleted. The mask also includes an exhalation valve that is configured to allow an exhaled breath to be expelled into the cabin.

The supply comprises of the emergency oxygen supply system. One or more cylinders of compressed oxygen serve to store the required supply of oxygen. A regulator reduces the pressure of oxygen that is distributed to the individual user interfaces via a network of conduits, wherein the flow of oxygen to each individual collapsible mask is controlled by the respective inlet valve. In use, the readiness of the oxygen supply is easily verifiable by monitoring the internal pressure of the supply cylinders. Should a substandard pressure be detected, the oxygen cylinder is either replaced or topped off. When a loss of cabin pressure occurs, all passenger collapsible masks are released from overhead storage compartments and a pressure regulated supply of oxygen is released into the distribution network.

The modular connection supplies the Sleeper in the module and also provides an auxiliary protected duct that leads to a position where a Sleeper below it can be supplied as well. Supply volume flows are designed to be adequate for two sleepers below in many embodiments.

The Power Supply for the Sleeper modules may come from above or below near the seat tracks and is again connected at a central module connection and then distributed to the devices that require power including lights fans in a ventilation system.

The In-Flight entertainment system in some embodiments will have their supply line alongside the seat tracks and for these the Control boxes for one or more modules may be located in the lower bin. And connections for each module made at a predetermined location on the module. Internal wiring of the module will connect the control unit the video screen and other devices such as speakers or headphone jacks that may be located on the headrest part of the Sleeper back support.

I-Flight Entertainment System supply cable may also be located at above the Sleeper modules so that it will be ducted down as is the oxygen supply and connected to the connectors on the Sleeper modules.

Similar modular connections may be implemented for the Air Conditioning supply.

Notably such modular connections for of the module sleepers result in most of the connections and maintenance being done off the aircraft and the module simply installed and connected.

The invention can be single tier Sleeper structures or double tier structures as illustrated. Considering that the single tier structure does not have the complexity of the double tier structure the discussion is limited to the double tier structure. Egress ingress and a number of other factors related to the Air Sleeper are incorporated by reference. The Banks or Families of Air Sleeper structures have a recessed section for the arm rest in these embodiments. The space below the arm rest is used for additional space in the upper deck of Air Sleepers. In this embodiment however, as the arm rests are somewhat narrow, the space is not adequate for the head section of the Air Sleeper back to be in this top space. This space can however be used for service support componentry and will give a greater sense of space to the passenger. Notably for the Upper deck the top can be open if no bins are installed on it, thereby permitting the use of longer sleepers (if horizontal space permits) for taller passengers.

However in the embodiment shown in FIG. 80 there is a wider sleepers and wider arm rests which allow the "head" space on the lower deck to be wider. In this case it is wide enough to accommodate the head of the passenger comfortably. In such embodiments the sitting height of the upper deck passengers is at the shoulder level of the lower deck passengers and therefore the vertical space can be better optimized in the air sleeper.

Again the upper deck top may be open if there is no bin supported by the bank of air sleepers.

In both these embodiments and in general the Sleeper support structure shown may be built in a modular fashion to allow sleepers of different widths to be introduced. One approach is to have a center section that is fixed and supports the AirSleepers and a separate arm rest/head space that attaches to this support structure. The armrest/head space part can be varied to get different sized Sleepers. Notably, in the embodiments shown in FIG. 79, 80, the sitting section is narrower than the flat bed which is elevated to the arm rest height. This structure will allow the sitting space to be optimized with hip bolsters on the side and the back for support of the occupant. This will be a preferred feature to having a wide sitting area with no lateral support for many occupants.

These figures show a flange at the bottom of the back end of the Sleeper support. These flanges are designed to support the Spine Anchor during impact loading when the Sleeper in substantially a flat bed position.

All embodiments of the Support structures will accommodate the actuators or other equipment that are needed. This will usually be below the seat level of the lower sleeper. For the upper sleepers however, if these are located vertically below and in the center of these sleepers they will lie at the position of the vertical supports on either side of the lower sleepers. Therefore this will have to be accommodated with the it will be at the vertical support structures on the sides of the Lower Sleeper space.

This invention includes a locked Lattice architecture for support of the Air Sleepers that can reduce the loading on the seat tracks of the Aircraft. The torque generated for each seat has a compressive load towards the front and a tensile load towards the back of the aircraft on the tracks. The locked lattice architecture neutralizes these forces thereby reducing the net loading on the tracks under impact conditions. In conventional architecture, the inertial loading of a crash loading along the axis of the aircraft with front facing seats will create a compressive loading on the front legs and a tensile loading on the rear leg. This effect with many seats on the same track will create a sinusoidal tensile and compressive alternating loading on the seat tracks. Usually the critical loading on the seat track is the tensile loading that can tear out the lip of the track. In the present invention the locked lattice created by the feet/frame (see references) will average out the alternating compressive and tensile loadings. Stiffening of the lower horizontal beam will increase this effect of averaging. These structures are another aspect of the present invention. Bin tracks and monument support tracks or points on the ceiling may be used to support the Support structure of the Air Sleepers as well at the top or side. These may have load limiters to allow limits on their performance. In Air Sleeper embodiments that are narrow, the top space may be used for a Service Box for Oxygen and other services. This may also be used for local chemical generation of Oxygen. An actuator reclines the seat bottom pivoted at the rear on to the base of the seat back. A second actuator inclines the foot rest and a third actuator in this embodiment reclines the seat back. The Optimal positions for the occupant will usually be a combination of these movements that can be preset in control software. The back rest has support fins which can flex during crash loadings to controlled extents. These in turn are supported by vertebrae that attach to the spine of the back rest. This embodiment also has a retractable hip bolster that moves inwards to the seat when in the upright position. It is pivoted on the common rear pivot of the seat bottom and the bottom pivot of the seat back and has a leg that gains support from the seat pan (defined herein) as the seat back gets to the upright position thereby pushing forward the bolster. Pneumatic bolsters can also be used.

In some embodiments of the Air Sleeper, the arm rests slide near its front end, on the substantially horizontal section of the Sleeper housing or other support It is pivoted at its back end to the seatback and therefore moves is back as the seat is reclined. In the flat bed position it is flat as well and forms part of the sleeping surface. The arm rests are always located near reach and therefore may have interface componentry to the passenger supported on them. The seat back fins are contoured in some embodiments and are designed to deflect on impact. Also the space between the fins allow the deflection of the spine as well under impact. The cut out on the top of the fin assembly give an open view to the occupant. The Frame (disclosed herein) is kept near horizontal by two pivoted arms on the seat pan. The first is part of the seat back and a feature of the spine anchor and at the front it is a shadow arm that moves substantially parallel to the spine anchor lower section. Therefore these tow arms create a parallelogram with the bottom of the seat pan and the frame. The frame supports the actuators for the seat bottom inclination and the foot rest. Life vest and table may be mounted on the sides of the sleeper support structure as shown. The table may have multiple folding leaves. The Lower part of the spine anchor that is part of the Seat back is pivoted at one end to the seat pan and as it rotates about this pivot it raises or lowers the parallelogram created with the frame and also raises and lowers the back pivot of the seat bottom. When the seat back is in the flat bed position, the rear pivot supporting the seat bottom gets the seat bottom to substantially the height of the arm rests. Similarly the frame is also raised with this pivot. In some embodiments separate pivots on the seat back support may be used as well for the frame and the seat bottom.

Most of the loading of the Sleeper is taken by the seat pan. The seat pan supports the actuator for the seat back. The vertebrae shown transfer the load from the fins to the spine. The cross section of the spine and the orientation of the cross section induces an upward movement of the fins on lateral impact thereby creating an inertial loading o the occupant to keep the occupant in place during the impact. This asymmetric section can take any form but its orientation is important for this feature of the invention.

Figs show the upper part of the back rest that comprises the spine, vertebrae and fins that support the occupant. The angled orientation of the spine (which may be of any cross section as long as it has asymmetric about the two directions orthogonal to the axis) has a rectangular cross section in this embodiment and on lateral inertial loading of the backrest on impact will rise as it flexes to a side and thereby raises the occupant to increase the inertial load that results in the occupant remaining in the Sleeper. Some cross sections in embodiments of this invention will in addition rotate to ensconce the occupant while the spine flexes. The lower vertebrae may support a hip bolster (not shown) that may use a pneumatic device to pump up to a comfortable level. The hip bolster may also be passive. Figs show the back rest of the Air Sleeper/seat along with the arm rests (seat and air sleeper are used interchangeably in this disclosure). The arm rests are pivotally attached to the spine anchor at their rear end and slidably attached to the Sleeper support at their front end.

The Fins have independent support on the vertebrae but not generally together but they may have materials and soft furnishings straddling the fins.

Also shown in this figure is the pivot for the seat bottom, the frame and the actuator. This is a separate pivot to the support of the Spine Anchor as shown. This is at the end of the arm as shown.

Figs show the Pan (which may be integrated with the Sleeper Support structure.) The Frame is pivotally attached to the shadow arms on each side and at the rear end to the upper pivot point on the Spine Anchor (not shown) Therefore movement of the seat back about its lower pivot moves the frame with a substantially horizontal orientation but up and down and forward and backwards. The Frame supports the actuators for the Seat Bottom and the Foot rest. (The Foot rest may in addition have a Back Stop attached to the frame to ensure that it cannot flip down further than in the sitting upright position i.e. a normally oriented "L", in the event of a failure of the actuator or the connections) The actuator for the Back rest is attached in this embodiment to the Pan. The Pivots for the seat back are also shown.

Figs show a bottom view of the Pan. The Back rest actuator is seen protruding into the pan to attach to the upper axis of the Spine anchor as noted before. The Foot rest actuator is attached to the frame and is shown here also. Notably the position of the support points of the actuators and the points of actuation on the seat bottom, the foot rest and the seat back will depend on the embodiment of the invention. The principles are well disclosed in the background art.

Figs show shows the Frame, illustrating the pivot points for the seat back, the foot rest and the shadow arm and also the two actuators that are attached to it in this embodiment.

Figs show shows a vertebra. It illustrates the angled orientation of the spine cross section to induce the upward motion while it deflects.

Figs show the angled Spine with the deflection under load showing the upward movement as well. This Spine has a constant cross section and therefore has more of the flexing near its base.

The Spine may be designed to have a tapered cross section along its length so that the deflection is controlled to be where it is desired and to control the rise of the head end during impact conditions. The actual deflection profile will depend largely on human kinematics during impact.

The present invention also includes a method of design where the cabin aisle edge length is used in the optimization of the Sleeper or seat orientations and sizes. Moreover, by orienting the passenger's leg space to be adjoining the aisle, a continuous beam structure is enabled for the support of an occupant support structure that can support a load with a high center of mass under crash loading conditions.

Several additional features of the Air Sleeper are presented. Many of these are particularly useful for narrower designs of Air Sleepers. This special need stems from the relative size of the maximum human frame that could be an occupant and the dimensions of the Air Sleeper.

These figures show an embodiment of the Air Sleeper that shows a table that pivots on the arm rest. This pivot axis also allows the table to slide forward and backwards for the convenience of the occupant.

The arm rest itself slides at its front end on the sleeper structure or an extension flange on the edge of the seat bottom. The rear of the arm rest is pivotally attached to the seat back. Therefore as the seat back is tilted backwards to a recline or flat bed position, the rear pivot of the armrest moves back and therefore slides the arm rest backwards and as a result located the arm rest at all times where the arms of the occupant lie.

Furthermore as a result of this motion the pivoting table moves as well to be located at a position comfortable to the occupant. In the flat bed position as the bed width becomes important the table is pivoted up.

A second feature illustrated here is a retractable lateral support that supports the occupant in the event of a crash. The surface of the lateral support may be designed to flex under impact. As in previously disclosed embodiments the back support and lateral supports may be made of carbon fiber or other light materials. This retractable support is in the embodiment shown slid able laterally controlled by spring dampers to ensure firm support in the event of a crash but limited movement laterally under normal operating conditions. The normal position may be the extended position with oft springs that allow retraction when there is physical contact with a neighbor's backrest or shoulder. This embodiment may also have firm resistance to further extension for protection in a crash. Another embodiment would have the lateral support in the normal retracted position that does not intrude into the neighbor's space but when an occupant requiring more shoulder space occupies the Air Sleeper the lateral support extends to the extent required with soft spring control. However, under crash conditions the movement is heavily damped to provide stiff resistance to movement any further than under normal conditions. The situation of larger occupants needing more shoulder space than is possible in the seat is a common one particularly in conventional economy seating. Typically there is an accommodation among passengers for larger ones that intrude into the seats of the neighbors. The Air Sleeper has a distinct advantage as the seat backs of neighbors need not be in the same angular orientation and therefore the situation arises only when an Air Sleeper changes the angular orientation of the seat back and gets to a similar angular orientation of a neighbor. At this point this accommodation is necessary for a transitory period till the neighbors move to different angular positions. Many Air Sleepers allow occupants in different orientation at all stages of flight thereby minimizing the transitory accommodation period which is nearly permanent in conventional seating in high density seating as in economy class seating. Some embodiments of the Air Sleeper have retractable lateral supports that retract downwards as the seat moved from the flat bed position to the upright position. Such Lateral Supports usually do not accommodate wider shoulder requirements but will provide support in a crash when in the flat bed position. Such supports may be deployed with a mechanical linkage attached to the seatback that uses the relative position of the seat back to the support structure to "push up" the retractable Lateral Supports.

Yet another feature that is illustrated in these figures are a screen and oxygen chamber door that are hinged on the edge nearer the occupant's head thereby allowing automatic retraction—if deployed—during emergency evacuation. The Oxygen door may be much smaller than the screen to provide minimal interference with access to the mask. Yet another feature of the invention shows yet more profiles for the foot rest and the extended seat bottom for the leg support. The extended seat bottom for leg support is a unique feature of the Air Sleeper not found on any other aircraft seats or beds. Often the shapes of these two elements will be determined by market preferences between easy access to the lower Sleeper against the convenience and comfort of a wider leg support section of the sea bottom.

The embodiment shows a top fin which is optional for additional structural support for the upper tier of Sleepers from the lower Sleepers. However there are several alternative locking mechanisms available in the background Art.

As noted before, this invention includes a locked Lattice architecture for support of the Air Sleepers that can reduce the loading on the seat tracks of the Aircraft.

To save weight the bottom rung of the foot may be excluded in the design. This will however transfer a greater torque to the seat tracks. A more conservative design would use the bottom rung. In both cases the corners can be jointed and a diagonal shock absorber introduced for crash loadings. However, this will also block the space within each foot that can otherwise be used for storage.

Another feature of the Air Sleeper is that the Air Sleeper system is modular and the Sleepers are interchangeable. Different models of the Air Sleepers have the same connectivity to the Air supply, Oxygen, Network, Electrical harness. Each model has unique features for example some embodiments of the Air Sleeper have wider sleep surfaces and privacy screens. Others are narrower and some are designed for occupant densities comparable and even exceeding conventional economy seating in some configurations. Another benefit of this modular architecture is that as markets change on different routes Air Sleepers can be plugged out and new ones plugged and locked in. Moreover the modular structure allows most if not all the maintenance work to be done off the aircraft, thereby enabling higher utilization rates for the aircraft.

The methods used for replacing seating on an aircraft in conventional configurations amounts to removing the seat sections and carrying them through the aisle out of the aircraft door. This can be somewhat difficult as aisles are typically quite narrow thereby slowing down the task and thereby reducing the utilization of the aircraft. The Air sleeper as a result of its novel design in many embodiments has a support structure only below the seat bottom and the entire back rest right up to flat bed position has no connections to any support surface. As a result the removal and transfer of individual Air Sleepers through the cabin can be much easier as the Air Sleepers on the route to the door may be put in the upright position thereby freeing up a wide space behind the Air sleeper for removing and transferring out the detached Air Sleepers and bringing in the more appropriate sizes.

The Support feet/frames may be designed in some embodiments to attach to any size of Air Sleeper with standard fitting and standard latch attachments at predetermined intervals. Some embodiments of the support feet/frames may even have seat track type locking mechanisms to benefit from the wide industry standard track locking mechanisms. Therefore the support feet/frame does not need to be removed when the locking mechanisms are standard across Air Sleepers and the new Air Sleepers are simply locked in place of the removed ones. Further embodiments of the Air Sleeper may not have the closed structure for the upper tier of Air Sleepers but simply support appendages for the screen and oxygen compartment. Bins may be attached above these with conventional bin tracks. Yet other embodiments may have the oxygen and screen mounted for the upper tier on the bins. This will however compromise the modularity of the Air Sleeper system.

Another unique feature of the Air Sleeper is that it optimizes the 3D space available in the aircraft cabin adaptively taking into account the human need the related geometries and the structural mechanics and physics related to the postures and positions of the human occupants. Some examples of these are:

1. The Headroom of the Air Sleeper is that of a car but the standing height is much higher and more than what many conventional aircraft cabins offer for passengers standing up at their seats. This is achieved by noting the head and torso positions for standing up to maintain the center of gravity over the feet. This requires the head to be ahead of the feet while standing up and therefore the design accommodates this by providing greater headroom at that location which is designed to be within the aisle space in most embodiments.

2. The sleep position uses the space as far from the aisle as possible for the head to minimize disturbance and noise. Again this is part of the design.

3. The occupants face the service attendants at all times and are in the vicinity of the service attendant when seated upright, thereby enabling easy communications.

4. Each passenger has aisle access for easy egress and ingress and in particular emergency evacuation.

The Figs show additional views of the Air Sleeper as disclosed previously.

Figs show an embodiment of the spool arrangement as disclosed previously and incorporated herein by reference. This embodiment has the back support pivot in the same housing that could increase the strength of the back support section.

The spool here consists of two pulleys or segments of two pulleys to save space, where the multiple cables are attached each to one of the grooves of each of the pulleys. There are two pulleys of the same radius, in symmetrical positions across the center line of the back support and to each of these is attached a cable that passes of the pulley and goes through a hole in the housing and possibly through holes in the intervening rib supports to reach the rib that it controls. Therefore there are two cables that can pull in each rib symmetrically about the spine on which it can slide. The pulleys can be locked with mechanisms well disclosed in the background art in any angular position with a control arm that is accessible to the occupant of the Air Sleeper. As the cables cannot support compressive loads, spring mechanisms may be deployed between the ribs to hold them apart so that the springs move them apart as the cables are released, and compress as the cable is spooled in through an angle of rotation. Notably, as each of the pulleys have a different radius, they will spool in the ribs differentially. The relative radii of the pulleys or sections thereof used can be chosen to get the distances required for average people of different heights. I.e. Shorter people are not necessarily scaled versions of taller people and therefore there may be non linearities that are maintained right through the scaling. In addition, having variable radii on each pair of pulleys this invention can even have different levels of scaling and relative movement between different sized people.

Finally, in another embodiment with separate pairs of pulleys, and separate rotational controls each of the rib position s may be independently set by the occupant.

Other embodiments may use actuators to set one or more of the pulley positions.

The back pivot joint in the embodiment shown represents a mechanism for locking the seat back in different angular position as desired by the occupant. This may be substituted for many mechanisms for that function available in the background art. In the embodiment disclosed, the seat back is attached to the housing which has a cavity with a lateral hole to accept the pivoting axle. On one side of this of this cavity it has a gearing on its surface—either perpendicular to the axis or angled to the axis. This gearing is designed to engage a complementary gear on the same axis and about the same axle. This gear is on a cylinder that may move axially along the axle. It is also keyed (or splined) to the axle. The key (that rides in a keyway of both the axle and the cylinder has a protrusion at its end on the side of the gearing of the cylinder that will allow the key if retracted away from the housing connected to the seat back, will pull the cylinder away from the geared engagement in the cavity as noted before.

The axle also supports the part that is attached to the seat bottom, which is also keyed to the axle. Therefore the rotational movement of the seat bottom relative to the seatback is identical to the axle and the cylinder. A compression spring between the cylinder and the seat bottom attachment keeps the cylinder engaged to the housing attached to the seat back and therefore there is no rotation possible. However, when the key (pin) is retracted, the gears disengage and the seat bottom can move relative to the seat back.

A lever may be used by the occupant to actuate the pin/key.

Finally the attachments may be reversed with the housing mounted on the seat bottom and the keyed assembly attached to the seat back.

Another variation of this embodiment is shown in FIG. 128. Here in this Air Sleeper with a narrow or uni-beam construction where the seat surface rises as it gets to the flat bed position. This is similar to the mechanisms elsewhere in the present invention. This is particularly useful in embodiments where the shoulder room between Air Sleepers is limited. By having alternative upper and lower level Air Sleepers have this mechanism these Air Sleepers may be elevated by about 4 inches from the adjoining Air Sleepers and thereby allow all the Air Sleepers to simultaneously in the flat bed position without a conflict for lateral space as alternate sleepers will be at a slightly higher level that the sleepers without the mechanism.

Notably the length of the arms that provide the articulation and the distance between the pivot points will determine the level of angular changes of the seat bottom and the related angular movement of the seat back. While the illustration shows the foot/leg rest pivot still on the uni-beam support leg, a version of this embodiment may have the foot rest also attached to the front of the seat bottom with a pivotal joint.

Several embodiments of the Air Sleeper have been disclosed herein, each with multiple features. The embodiments serve to show the diversity in design possibilities for the present invention. The present invention includes embodiments with interchangeable features among the embodiments disclosed.

Vehicle Occupant Support—Dynamic Child Seat

The dynamic child seat in this invention uses reaction bearings both at the back and the sides on surfaces on the dynamic or moving shell to guide the shell in the desired direction to reorient the child in an impact.

The Rear bearing is spring mounted as shown to accommodate the vertical shock at impact but retain the seat in the desired direction soon thereafter by damping the energy of the impact. The side bearings are also spring loaded with the long spring axles that they are mounted upon.

These are principally actions that are used to mitigate the lateral impact situations by reducing the peak acceleration of the occupant and reorienting the occupant in such an impact.

The Bunge sling at the back of the seat is operative at the time of a front impact by deforming to allow the top of the seat to move forward. The bottom of the seat under the base is fixed to a pivot that will allow this motion. The result is a damped front impact loading.

The embodiment of a dynamic child seat that rotates about a substantially vertical axis on side impact and moves forward on front impact controlled by a Bunge Sling. The Figures show the position of the seat shell is during impact and is show rotated away from the side impact direction. It also shows the placement of the frame on the base and the notch that engages the frame for lateral stability. The pillow pads that support the head laterally and the rear head rest are not shown but the rotated position of the seat shell shows the left side arm of the head assembly ensconcing the head in the impact position.

Figs show the embodiment of the dynamic child seat with the attachment to the tether marked and the slide bar shown with one or more pins that engage a sliding surface on the seat shell to allow rotation about the impact rotation axis. The pins (not shown) (which may be spring mounted) limit vertical motion of the seat shell. It also shows Pairs of feet on either side support the frame in front. A lateral bar (not shown) engages the slot shown and is spring loaded to be in the rear position of the slot normally in can be drawn forward manually to the front of the slot to disengage one of the multiple slots in the two towers attached to the base thereby changing the height of the front of the frame and the resulting inclination. And the pivot for inkling the seat frame particularly in the rear facing position. Figs show the dynamic child seat frame. The Upper and lower channel shown house spring damper assemblies—one on each side.

The Upper edge of one or both the channels that support the spring damper assembly has a slightly inclined top surface with a lower front edge so that when the pin or flange attached to the seat and supporting the Spring damper assembly rises on the side away from the impact it is captured by the slot preventing a rocking of the seat and channeling the energy to rotation about a near vertical axis. Also shown is the slot that houses a front brace that has a sliding surface and a pin both of which rides on a sliding surface coaxial with the impact rotation pivot shown. The pin engages the slot in the surface to prevent vertical motion of the seat at its edge during impact. This pin may be spring loaded to return the impact energy if raised, to the seat for its rotation. Also shown is the Pivot—impact rotation axis that may have a spring mount to allow a short axial displacement for redeploying the initial impact loading that can tend to rotate the seat about a horizontal axis. Notably the Pivot is designed such that on front impact the axis can bend or tilt forward and work in conjunction with the Bunge Sling to control the motion of the occupant in a front impact.

Figs show the end of the upper channel that provides the reaction surface for the spring damper assembly during rotation of the frame following side impact.

Figs show the cavity for metal reinforcement that is an extension to the tether support. the metal strip extends in this embodiment to wrap over the lower pivot hinge. This provides a rigid connection between the tether and the pivot rod at the bottom that is connected to the latches.

Figs show Dynamic Child Seat—Headrest Height Adjust Arm. 1. The actuation lever in the normal position will be away from the back of the head assembly support stalk and be depressed towards the head rest support stalk to dis engage the pins and move the head rest.

2. In other embodiments, with the pins located between the actuation lever and the pivot the normal position of the actuation lever will be next to the head assembly support stalk and be pulled out to disengage the pins.

In case 1. above a safety catch can be created (either pivotally or slidably attached to the stalk or the lever to fall between the stalk and the lever and color or marks indicating this position for safety.

In case 2. a safety catch may be pivotally or slidably attached to the stalk to capture (with a loop) the lever for the safe position. Coding being visible.

The Pivot for the height adjustment arm would usually be spring loaded to engage the socket holes in the normal position. The pivot in this embodiment is on the head assembly support stalk. However it may also be supported on the seat shell with multiple sets of holes on the head assembly support stalk to allow different heights.

The Actuation lever is shown.

Pins engage corresponding holes in the head rest support stalk to which the height adjustment arm is attached. It also engages multiple sets of such holes on the sheath on the seat shell containing the head assembly support stalk, thereby allowing multiple positions for the height of the seat support stalk on the seat shell.

Figs show Dynamic Child Seat—Head Assembly support stalk. Shows:

Pivot for attachment of the headrest height adjustment arm

Pivot support for attachment of the rear head rest. The rear headrest is pivoted to allow greater conformity with the rear of the head and neck.

The ends of the side arms support the pillow-pads (not shown) that provide lateral support for the child's head and face. many embodiments allow the attachment to be pivoted about a substantially vertical axis so that it can tilt back on side impact thereby containing the head.

Pin holes (not shown) will be arranged in a line to accommodate the pins on the headrest height adjusting arm. These same pin holes will engage multiple sets of holes on the sheath at the back of the seat shell to allow multiple positions of the Head Assembly Support Stalk on the Seat shell.

Figs show Dynamic Child Seat—Seat Shell assembly. Shows:

Pins that may engage one or both sides of the sheath on the seat shell housing the head assembly support stalk. Inner edge of spring damper assembly which is secured to the seat shell. Some embodiments have a flange that engages the slot on the frame with a small clearance.

Headrest Height Adjustment Arm

Position in some embodiments of the right spring damper assembly. Similar assemblies will be on the left and at the lower position as indicated on the frame.

Head Assembly Support Stalk

Figs show Dynamic Child Seat—Base. Shows:

Notches that capture frame in lowest (front facing) position

Pivot for tilting the frame when seat is in the rear facing position

Pair of towers with notches that engage a lateral bar on the frame for different inclinations of the frame on the base. The frame will pivot on the rear Pivot Sides Beveled for Car Seat Shape Figs show Dynamic Child Seat—Bunge Sling Assembly. Shows:

The Bunge Sling that stretches out on front impact to damp acceleration. Rear center of Bunge sling is attached to the frame.

The Bunge Pin that slides inside Bunge Pin Slot attached to seat shell. On side impact the pin slides out. On front impact the pin engages the slot to provide a reactive force. Some embodiments of the slot have a depression on the inner surface of the slot that the pin will move into on motion of the slot forward on front impact, thereby securing the pin further in the slot.

Figs show Dynamic Child Seat—Bunge Sling Assembly. Shows:

Bunge slot that engages Bunge pin during front impact and allows the bunge pin to slide out of the sides during a side impact.

Bunge slot has a cut out to avoid contact with the headrest height adjustment arm Support of the Bunge slot to the seat shell straddles the head assembly support stalk and its housing on the seat shell.

Figs show Dynamic Child Seat—Bunge Sling. Shows:

Each of the two side that in their center attach to the frame and the seat shell respectively.

One or more points for securing bunge sling some embodiments use a hole and securing pin.

The sides of the Bunge sling stretch out as the two support points are pulled apart. The materials are designed to provide energy absorption and elastic properties to minimize injury for the occupant.

Figs show Dynamic Child Seat—Bunge Slot. Shows:

The depression in this embodiment engages the Bunge Pin on front impact to secure it further. The normal position of the Bunge pin will not engage the depression.

Support points on Shell. Bunge slot is secured at points that straddle the head assembly support stalk. In other embodiments it can be secured closer to the center if slots are created in the head assembly support stalk.

Cut out prevents contact from the head rest height adjustment arm.

With reference to the applications which are incorporated herein by reference, the in application 61/066,372, FIG. 42, the inner edge of the spring damper may be supported by the inner shell with retractable flanges. Such flanges in the operating position will support the spring dampers and provide reaction forces as required. However, during egress and ingress they may be retracted to allow the inner shell to rotate for ease of egress and ingress.

The inner shell supporting the occupant of a child restraint system that will move under impact conditions. In particular this shell has a head rest that can slide on the shell along tracks with attachments in the slots at the back and with provision in this embodiment to have indexing holes that line up with holes on the head rest for indexing pins to hold the head rest in a particular position.

This embodiment has sliding arrangements to rotate the seat about a static or dynamic point relative to the support structure. This may be embodied in a pivot at one point and substantially co axial slides on the sides of the seat. Another embodiment of this sliding arrangement can be a coaxial sliding surfaces near a virtual pivot as shown in the figures. This sliding arrangement at the center of the base as shown towards its front is complemented with slides on the sides of the front of the seat, and has compressible elements at the rear of the shell. The slide are shaped to have a surface that follows the section of a cylinder that has the same center as the central static or dynamic virtual pivot, thereby helping maintain the inner shell along the same axis of rotation. This combination of elements allow the shell to rotate away from the direction of a lateral impact thereby reducing injury. Such movement is enabled with the compressible elements compressing under load and the slides and pivot maintaining the front end of the shell with relatively little lateral movement but enabling rotational movement. Some embodiments may have differential compressibility properties between the upper and lower compressible members on the sides of the rear of the seat to allow the initial inertial loading on the lower part of the seat to position the upper part of the seat and headrest for early support of the head and upper body during impact. Some embodiments may have these compressible members as blocks of foam or other compressible materials. Further some such embodiments may have hollow sections of these blocks that can accommodate inserts that have different compression properties to change the average compression properties of the elements for protection of occupants of different mass and size as the inertial loadings would vary depending on the mass of the occupant. Apertures for insertion of these inserts can be designed from the inside or the outside but to have a direction that is at the highest possible angle to the direction of motion of the seat under impact loading, such that the impact does not drive the inserts out. Further deep screw threads on the inserts and the cavity in the blocks will server to maintain the integrity of the blocks under load. Yet another feature of this invention that may be used in some embodiments is to align the surfaces of the inner shell and the outer shell that contact the compressible elements to be substantially normal to the direction of compression. This attachment or reaction surface may have a stepped profile to maximize the possible width of the elements relative to the usually curved surfaces of the inner and outer shells. In some embodiments, the slides and pivoting arrangements towards the front of the seat may have shock absorbing elements as well to reduce the peak loading to these elements. Yet another feature of this invention is the adaptation of the surface of the inner shell that contacts the crushable material blocks, such that the ends of the blocks insert into a ridge that keeps it in place. This ridge may be higher at the back as the shear loading in side impact will push the foam towards the back ridge. However, this ridge may be designed so that in the event of a front impact the foam may escape this edge by distortion of its tip, but get firmly embedded in the ridge during side impact when there is significant compressive loading as well. Moreover, considering that the center of mass of the occupant may be above the level of the highest of the slides in front a force moment may be needed to provide the counteracting torque to keep the inner shell horizontal. Some of this will be provided by the reaction force on the base. However, in addition one or more grooves that also follow the same center of rotation on the slides particularly if they are deep will help provide the required force moment. In the case of the dynamic center of rotation or a dynamic virtual pivot, the slides are supported by surfaces that are compressible to a small extent. Yet another additional innovation is the impregnation of this compressible material (which can be any open weave material or a foam) with lubricants that are release on compression thereby enabling the sliding motion while protecting the lubricant during normal use that can be several months or years ahead of a potential collision.

In a front impact the inner shell shown is supported by the Bunge sling that will provide a restraining force backwards while the shell pivots near the lower pivot or virtual pivot as described above (the pivot may be a ball joint in some embodiments or may be a pin or slide with a vertical axis for rotation with a second degree of motion about the lateral axis in front impact enabled by the moment of the inertial force of the occupant. This may be a controlled fracture but not separation of the seat bottom by design along a lateral line or a hinge that is enabled by the forward movement of the shell (with a latch that disengages with this forward motion of the seat shell. For example this can be enabled in some embodiments with a hinge with a lateral horizontal axis with one flap attached to the pivot as shown with a vertical axis and the other flap attached to the inner shell, where the first flap has a latch pin that normally engages a hole in the shell and is released when the shell moves forwards during impact along a short support guide that links the second flap of the hinge to the shell, thereby allowing rotation about a lateral near horizontal axis during front impact.

The Bunge Sling is an energy absorbing spring and/or a deformable element that extends during a front or oblique impact. The ends of the Bunge sling are attached to the inner shell and the central section in many embodiments passes through a loop that is attached to the outer shell or the frame that is attached to the car seat at the back near the tether support. The loop allows lateral siding of the Bunge Sling during side impact.

The Bunge Sling is composed of materials that carefully control its extension during impact and may have different cross sections along its length to allow this. Notably as cars of different sizes and shapes will have different impact absorbing properties, the Bunge Sling in some embodiments may be designed to complement the crash characteristics of the car to minimize human injury.

Figs show an embodiment of the CRS System excluding the base is shown. The headrest slides on the inner shell. The Bunge sling supports the back of the inner shell with a loop that is attached to the Brace frame (here through the tether support at the top (not shown). The loop can slide along the Bunge sling but will be loaded in a front impact. The Bunge sling may be calibrated to complement the crash characteristics of the vehicle to minimize injury.

The inner shell is supported by the outer shell/frame that has a vertical virtual (or real) pivot at the front center of the bottom and sliding surfaces near the front sides. It also has impact absorbing compressible or extendable materials attached between the inner and outer shells between the two shells. These may in some embodiments be sections that are placed near the side of the ear of the inner shell. As a result the outer shell or frame supports the inner shell through shock absorbing members. Differential support the rear and front of the occupant (through the inner shell or skin)

The inner shell in this embodiment is supported for front impact through a Bunge Sling that is attached to the Brace Frame above the outer shell.

"D" bar handle is used to unlock the outer shell/frame from the Brace Frame for egress and ingress. The mechanism allows the outer shell/frame to rotate outwards for easy egress and ingress. There are "D" bars on either side for use depending on the side of the seat that required egress and ingress. When locked it provides a rigid link between the outer shell/frame and the Brace Frame and thereby provides firm support by the outer shell/frame to the inner shell during lateral impact. The pivot of the "D" bar may be spring loaded to ensure that it locks securely.

Brace Frame supports the outer shell or frame to the vehicle seat. This embodiment shows a mechanism for rotating the outer shell for egress and ingress. The Brace frame sits on the seat base and is attached to the tether at the top.

As this embodiment is a convertible seat, there is a pivot support for the Brace Frame to the seat base. This works in conjunction with the front feet shown to raise or lower the front of the seat relative to its back to increase or decrease the angular orientation of the seat. The mechanisms for attachment at different angular elevations are well disclosed in the background art. The Brace Frame has front feet that lock to the base at different elevations depending on front or rear facing deployments. The slot engages a long bar across the front that in turn engages slots at different heights on the seat bottom.

The figure also shows the slides that enable the rotation on the inner shell supported by the outer shell. Notably in this embodiment this pivoting arrangement is not fixed but will move as the structure of the outer shell and the brace flex on impact and therefore provides some shock absorption as well.

The Brace Frame has an axis substantially along the direction of the seat back of the CRS, supporting the outer shell/frame at its back. The top of this axis in some embodiments is attached to the tether. It also is looped over the Bunge sling in some embodiments.

The rear edge of the brace frame braces against the back of the car seat and is designed to have a broad stance to accommodate lateral forces in side impact.

The headrest that can slide up and down on the inner shell. Figs show the "Bunge Sling" which is attached to the inner shell and is attached by way of a loop (not shown) to the Brace Frame on the main pivot rod (not shown).

The "E" Brace is usually behind the outers frame/shell and pivots on or near the central pivot of the outer shell/brace it is locked in place to provide support for the outer shell/frame with the "D"-Bar that is pivoted on the Brace Frame and a pivoted link.

This mechanism works as follows: The "E" brace ensconces the outer shell frame—one on each side (only one side mechanism is shown) and resists movement of the outer shell/frame backwards about the central pivotal axis shown. The "E" Brace has a substantially vertical pivotal axis near its front that is pivotally attached to a Link that has pivots at both ends. The other end of the Link is pivotally attached to near the center of the "D" bar. The "D" Bar is pivotally attached to this Link and is also pivotally attached to the Brace Frame at its back. The pivots may have spring loadings and clips and latches, as necessary and well disclosed in the background art to keep the mechanism locked during operation and release easily when the "D" Bar is pulled. Notably this embodiment also has curves in the elements to locate the pivots such that to ensure that the direction of reactive forces between the outer shell/frame and the Brace Frame maintain the locked position.

Note that the "E" brace pivots in this embodiment on the mail pivot rod at the center of the seat. ("E" brace, the "D" bar and the Link are attached on both sides in most embodiments. Only one side is shown in the figure.) Shows the outer shell frame and the mechanism for release for egress and ingress. "D" Bar, the "E" Brace and the Link. The Bunge Sling is also shown.

The "Lap Flap" is a soft extension of the arm rest surface on the seat that captures the upper leg during side impact (using any or all of for example inertia, friction, viscosity properties), but is soft under normal conditions for egress and ingress. This element may be fluid filled with appropriate flow control between the flap and a reservoir so that under impact conditions it is relatively non-deformable but with the fluid flow is deformable under normal use conditions.

The Egress Ingress mechanism comprises in this embodiment the "E" brace that supports the outer shell/frame with a pivot at the center as shown and a pivot at it outer end. The Pivot at the outer end is pivoted to a Link that has two pivotal points at its ends. The Second pivotal point is attached to the near the center of the "D"

Pulling the handle out pulls the center pivot on the "D" bar arm which rotates the Link outwards which in turn pulls the pivotal attachment of the Link to the "E" brace back and thereby eases egress and ingress.

The lower support surface of the Brace Frame that supports the outer shell in some embodiments has a surface that will allow the outer shell/frame to slide on this surface as it pivots about the central support rod that passes through the hinge support sections shown in the center of the rear section of the Brace Frame. It is not necessarily a planar surface. The outer shell frame will have a mating sliding surface or surfaces.

Some embodiments of the invention may have the outer shell/frame with a higher cross section so that a part of it may provide resistance to the headrest directly as well during side impact. Considering that the seat design has rotation for egress and ingress this is feasible without reducing access to the CSRS.

Figs show an embodiment of the base that has a central aperture to allow the Brace frame to have a lower center of gravity. It is held together by two side members that may be hollow. The embodiment shown also shows an approach to lead a tension cable that is attached to each of the two latches and is guided along an aperture in the side members and around a guide to a hollow pivot rod holding the Brace frame to the Outer Frame/shell. The pair of cables from each of the two latches emerge from the top of this hollow axis and are attached through a tensioning mechanism to the tether support. Notably the two cables may be combined as they go up the hollow shaft. Another embodiment will have a single cable that goes around a pulley whose pivot is tightened to the tether cable or webbing attachment. The ends of the cable that go around the pulley then go own the hollow shaft and respectively around the two guides to the respective latches. The advantage in this embodiment is that the tensions of the two latches are equalized) the tether will usually have twice the tension loading of each of the latches.

Notably in the latches (or ISO-FIX latches) hare held in a preferred orientation with the tabs above and below the body of the latches (only apertures housing the latches are shown in figure). This orientation will depend on the specific design of the CSRS system.

The headrests in some embodiments have support elements between the side wings and the inner shell for additional support. Some embodiments may have custom pads on the sides inside and outside (against the inner shell) for different age groups to change the geometries and impact characteristics.

Notably while the embodiment shown has an inner shell an outer shell/frame and a brace frame other embodiments may have only two of these three parts where the functionality for egress ingress rotation between the Brace Frame can be used with a single shell (rather than inner and outer shells) and the impact protection functions can be maintained with the inner and outer shells but without the rotational offered by the Brace Frame for egress and ingress. Clearly in an embodiment with an inner and outer shell alone the Bunge will be attached to the outer shell which has a rear geometry of the Brace Frame to brace against the rear of the seat and have the tether attached to it.

In yet another embodiment of the Child seat, see (FIG. 129-140). Here the inner shell is supported by a shock strip that bends or distorts upon impact. This support is supplemented with support at about the head to shoulder level on the sides and other places that could improve the kinematics upon impact. The latches in this embodiment are attached to cables that each run over a guide and up along a slot in the two towers at the back to attach to twin tethers that are secured together at the end through a tensioning device this not only tensions the tether but the latches as well. It is therefore a simple two stage operation. Push the latches into the back of the seat (the latches themselves may be spring loaded to ensure that pushing the seat back will also push and engage the latches. 2) clip on the tethers at the tether mount point and then use the single tensioner to tension all four securing points. A separator that can bear compressive loads may be used at the height of the Car seat back to keep the twin tethers apart at that point. This separator may also be designed to engage the top of the car seat to increase stability.

In the rearward facing position, the seat is designed to take a low profile and therefore transfer the forces on front impact more directly to the latch points. Some embodiments have a long stem on each latch extending to the front end of the base in a slot, thereby facilitating the sliding of the latches in and out of their sockets and providing further strength and rigidity to the base. The latched extension stems may also have sliding attachments to central section with the pivot for the flange. More over some embodiments may have a sliding mid-section (with the lateral pivot for the flange) that can reduce or increase the leg room of the child in the rear facing position. The mid-section has a pivoting flange that supports the safety cage. This pivoting flange takes two positions for front and rear facing seats and an intermediate position for egress and ingress with a side facing seat. The flange is supported in the front facing position in some embodiments with a "cam" arrangement where the rotation of its axis enabled with levers on either or both side of the seat will increase the radius of engagement of the cam with the flange and push the front side of the flange up so that the angle for the front facing seat can be attained. It will of course need to be locked in that position and this can follow many solutions in the back ground art but also by having a reduction in the cam radius at its end where it is designed not to rotate any further and ensure that the flange is in the right position for front facing seats at that point. Any loading on the Cam will only push it forward to its end stop position. Arrangement need to be made for the locking the cam in place for the substantially flat egress, ingress position and also for the rear facing position.

In the egress ingress position the Cam is not shown but will support the flange and the seat in this position. The seat faces sideways for egress and ingress.

The Safety Cage.—support for the inner shell may be on any point on the cage to get optimal kinematics. The Safety Cage may be attached to a bunge sling or other support at the back. Bunge sling if used will have either the bunge pin or slot attached here to the cage. T the bottom of the Safety cage is a socket for Boss. Boss is used for engaging and releasing the safety cage from the flange for rotating and locking the seat in the front, back and side facing positions. The socket has teeth than engage into notches in the boss in the correct orientation for the positions noted. The boss may be spring loaded and be pushed up into the space above the aperture to disengage and rotate the seat. Other attachment mean s may be used as disclosed in the background art.

Side wings of the upper section of the shock strip if present are used or support elements attached to the safety cage on the sides for optimize the kinematics under impact. Some embodiments have the Shock strip with upper leg supporting the inner shell. It may be extended to the back of the shell and in fact may even have arms to the sides to provide further strength to the shell.

The shock strip under lateral impact loading will twist at the hairpin section at the bottom distorts to allow the bottom of the seat to rotate. The controlled forces on the top of the "T" arms will determine the extent of motion and rotation for the top end of the seat.

This embodiment may use a rear attachment as in a Bunge Sling assembly or other support mechanism. Here towers at the back have a support connector and the Bunge sling is attached with the Bunge Pin to it. the Pin will engage the Bunge Slot (not shown) that is attached to the safety cage (there may also be attachments between the safety cage and the shell to optimize the kinematics under loading) the Slot will however allow the Pin to slide out for lateral movement of the seat back/safety cage back, under lateral loadings or for egress and ingress.

Virtual Navigation Device

Virtual navigation device. The embodiment here uses a light corridor to channel four image signals (in this embodiment but possibly more or less) that are used for the virtual navigation device disclosed in the references. Two fields are derived from a World View displaced by a distance that is substantially the inter eye distance and two of the fields are derived from views of the eyes and appendages of the user. These four channels are deflected using mirrors/prisms/lenses/optical fibers to become image A that is a composite image. There are several possible arrangements of the constituent images in the image A two options are shown in the figure. The embodiment in the Figure uses plane mirrors for the deflection of the image fields to the composite image A. However this in no way limits the scope of the invention that can use non-linear mirrors, lenses, prisms or optical fibers for the purpose. In some embodiments there may be a need for channeling the light corridor to the back of the head or any other location for better utility of the user. The Figure illustrates an embodiment that uses mirrors to transfer image A to image B. The invention is in no way limited to mirror for this stage and can utilize nonlinear and linear refractive and reflective elements as well as optical fibers.

With reference to the applications which are incorporated herein by reference, the virtual navigation system may have supplementary illumination with infrared or other light for the detection of the eye positions. Such light sources may be harmful to the eye and therefore some embodiments may track an error function of detection (or other quality measure) and flash the supplementary source of light for improving the detection for one or more frames. This will not be seen if infrared light is used.

A virtual navigation system that utilizes the world cameras of a headset to recognize objects in the field of view and detect head movements by inference from the movement of the objects detected in the field of view. Thereby creating a signal on rotation of the head relative to an initial position, and the movement of the head relative to an initial position. Further the system can have a reset function that allows the reference position to be changed. This angular displacement data about the three axes and physical linear movement of the head, can be used in determining the view presented to the wearer and its angular orientation. For example the projection of the voxels in the field of view will be changed by the angle of rotation of the head. Notably the linear movement may be used for scrolling or zooming in the field if such movement exceeds a predetermined threshold.

This along with the 3D navigation ability with point of focus information will give the wearer linear and angular mobility in a virtual field. Actions may be initiated with blinks and other body movements.

Back Saver for Surgeons/Workmate

An occupational hazard for surgeons is the constant bending at the waist during surgery that can cause injury to the spine and related anatomical structures and supports. The present invention uses a mount on the waist that is supported by the pelvis (can be a belt support at the pelvis ideally) It has an arm that senses the position of the shoulders and in some embodiments the arms and the head as well. With this information a counter balance on another arm swings backwards to counteract the weight of the upper body so that the center of gravity of the human and the device is approximately centered on the pelvis, with the legs vertical. This will reduce the loading on the lumbar spine and muscle structures from the case with no counter balance. The counter balance structure may be enabled simply with a collapsing frame (four sides all pivotally attached and adjoining sides attached to the body/sensor arm and the other to the counter weight. More sophisticated version s can use electronics to sense and sample frequently the positions of the shoulders and the counter weight and make the required adjustment using servos. Still other embodiments may have a gyroscope that can stabilize the upper body during surgery to help the "steady hand" of the surgeon. These stability devices may be single axis (forward-backwards) or two axis (side to side as well). The Figs show a work mate that is designed to help workers who bend forward to work. It is a mechanism that senses the position of the upper body and with an estimate of the occupant's upper body mass actuates a control arm that counterbalances the upper body, thereby keeping the center of mass of the user vertically above the feet of the user, and thereby reducing some of the loadings on the spine in keeping a bent posture while working. Some variations of the invention may also have wired or wireless sensors for the positions of the arms and other parts of the upper body to provide inputs for the control to get an even better estimate of the position of the center of mass of the upper body and thereby control the position of the control arm better for the same objective. A further enhanced embodiment uses the same mechanism for lateral movements of the upper body and uses a second arm or the same arm with control in a lateral direction to keep the resulting center of mass of the user and the invention above the feet of the user.

Retractable Support for Shower Curtain

This invention discloses a shower curtain support for showers in a corner that requires a 90 degree of angular cover when deployed. The problem it addresses is that with most shower curtain supports the rod is seen across the space even when the curtain is not used, a fact that can be visually displeasing. The invention is made of two devices that are substantially mirror images of each other.

Each one has a block that is attached to one of the walls. It has a slot that accepts a pivoting arm wherein the pivotal axis is so designed that the arm when horizontal will cover substantially 45 degrees of the required coverage for a curtain draped on it, and at the other extreme of its pivotal movement will be against the wall either vertically or at an angle to the vertical but against the wall so that the curtain is carried with it to be along the wall to allow egress and ingress. The pivot may have a ratchet arrangement and be spring loaded to support the weight of the curtain, so that the ratchet is enabled or disabled to lower and raise the arm.

The invention claimed is:

1. A structure in an aircraft with an axis of motion, for the support of occupants in occupant supports in multiple tiers, with an inherently high center of mass, said structure comprising a plurality of support means adapted to rigidly engage seat tracks at the floor of the aircraft and each of said support means adapted to attach to each other thereby enabled to transfer vertical forces to each other without substantially loading the seat tracks with said vertical forces, and said support means attached to at least one occupant support, said occupant support further comprising a cabin with a support structure, a seat bottom and a seat back and axes in the direction of the occupant, each occupant support supported by one or both of: at least one of said support means adapted to engage seat tracks at the floor of the aircraft; and an attachment means to at least one other occupant support, thereby said attachments enabling the structure to neutralize the torque generated by each occupant support therein, imposing a compressive load towards the front and a tensile load towards the back of the aircraft on each of the seat tracks, during impact conditions reducing the alternatively compressive and tensile loading on the seat tracks under impact conditions in a direction substantially along the axis of the aircraft.

2. A structure as in claim 1, wherein said plurality of support means adapted to engage the seat tracks of the aircraft, comprise a foot-frame adapted to engage both, the seat tracks of the aircraft with track attachment means that lock to the track, and the foot-frame of each adjoining support means, wherein said foot frame, comprises one of:

a) at least two vertical interconnected shear planes each shear plane located substantially vertical above one of said seat tracks, and each of said shear planes comprising optional openings in the interiors and an upper edge attached to at least one occupant support, and optionally comprising an edge extending along said seat tracks, each shear plane attached to the one or more other shear planes with cross links to maintain lateral rigidity with regard to the direction of the aircraft; and b) at least two vertical frames each substantially vertical above one of said seat tracks on the floor of the aircraft, each of said frames comprising pivoted linear members, constituting the sides of an array of contiguous rectangles with vertices, above the seat track and pivotally attached thereto, said pivoted linear members further comprising at least one shock absorbing element placed substantially between opposite vertices of at least one of said rectangles, such that under a loading in the direction of the aircraft motion, the rectangular frames become parallelograms restrained by said shock absorbing means, said frames attached together with cross links to maintain lateral rigidity with regard to the direction of the aircraft, and wherein said foot frames are one of: rigidly link said track attachment means to said occupant supports; and comprise a connection with an impact decoupler between the track attachment means and said occupant supports said impact decoupler adapted to absorb shock in the direction of motion of the aircraft, under rapid deceleration conditions of the aircraft thereby reducing the peak forces on the occupant and the track, under rapid deceleration conditions.

3. The structure as in claim 2, wherein each of the occupants of each of the tiers have a sitting position in the occupant supports, wherein foot supports of said occupants are all adjoining the aisle, and wherein the seat bottom and seat back of all of the occupant supports are adapted to lie above the foot frames at all times, thereby enabling aisle access to each occupant while enabling the interconnection of the foot frames adapted to engage the floor of the aircraft and attached to said occupant supports.

4. The structure as in claim 2, comprising occupant supports, with one or both of: a storage bin below said occupant support in first tier with access to storage from one or both of the front of the bin and the top of the rear of the bin, wherein access to the top of the rear of the bin is enabled by one or both of folding forward the seat back of the occupant support and by opening at least one panel on the seat back adapted to be a door or slide panel; and a top bin vertically above the seat bottom of the second tier of occupant supports with access at one or both of the front and back for the occupant in the upper tier, and wherein the back of the bin may be recess to allow access to the back opening while in the occupant support.

5. The structure in a vehicle according to claim 1, wherein the axis of the occupants are at a non-zero angle to the axis of the aircraft and facing towards the aisle, and occupant supports in a first tier, are each connected to at least one adjoining occupant support on the first tier in the direction of the axis of motion of the aircraft, and to the support means, thereby providing a braced lattice to withstand axial loadings on the aircraft during rapid deceleration;

and wherein occupant supports in a second tier are connected to adjoining occupant supports on the second tier in the direction of the axis of motion of the aircraft, and one of: said support means; seat tracks; and at least one occupant support in the first tier, thereby providing a braced lattice to withstand axial loadings on the aircraft during rapid deceleration.

6. The structure of according to claim 1, wherein the axes of the second tier of occupant supports are offset horizontally substantially orthogonal to the axis of the occupant supports, from the axes of the first tier of occupant supports
and wherein one or both of: the occupant supports in the second tier enable a sitting position for its occupants that each have a leg space below the top of the occupant supports in the first tier; and seat bottom of the occupant supports in the upper tier are below the top of the occupant supports in the first tier, thereby facilitating egress and ingress from the second tier.

7. A structure as in claim 1, wherein the axis of the occupants are at a non-zero angle to the axis of motion of the aircraft and
wherein the seat back of at least one occupant support is enabled to be oriented in a substantially flat bed position and a substantially upright position, and wherein said seat back is adapted to support said passenger in the direction of motion of the aircraft under impact loading conditions.

8. The structure according to claim 7, further comprising a gravity synthesizer, that utilizes one or both of: a flexible cantilevered spine with an enabling cross section supporting the backrest; and a mechanism in the attachment means of the seat bottom to the support structure,
that transforms the energy due to the inertial loading of the occupant in at least one of a flatbed position and a recline position, under deceleration conditions of the aircraft, to one of
a) providing a support force applied to the occupant by the support structure, thereby increasing the reaction force on the occupant and thereby keeping the occupant in position during impact conditions, by one or both of:
i) increasing the frictional loading on the occupant due to the reaction force;
ii) compressing softer materials placed above a harder surface for support under impact conditions; with contours that support the occupant in the direction of the impact and thereby to retain the occupant in the occupant support,
b) reorienting the occupant in the occupant support, thereby providing an increased surface area for support of the occupant in the direction of motion, by the occupant support during rapid deceleration conditions of the aircraft,
and c) enabling deflection of the occupant position to reduce peak inertial loading forces.

9. The structure of claim 7, wherein at least one vertical support on the sides of back rests of each of two adjoining occupant supports may be retracted to form a double-bed configuration.

10. The structure as in claim 1 wherein the seat back of said occupant support comprises: a spine that supports at least one vertebra,
each of said vertebrae supporting at least one rib-fin that is adapted to support the occupant, said attachment of the at least one vertebra is one of: fixed on the spine; and slidable on the spine thereby enabling control by the occupant of one or both of height of seatback and position of the support of at least one rib-fin to suit the occupant and wherein said at least one rib-fin is one or both of: padded on the side of the occupant and attached to air-filled cushions adapted to be inflated to predetermined pressures for the comfort and size of the occupant, and wherein said at least one rib-fin is attached to at least one vertical section positioned to support the occupant in the direction of motion of the aircraft, wherein said vertical section is one of: fixedly attached to the rib-fin and adapted to be retractable towards the center of the occupant support to accommodate the position of a seat back of an adjoining occupant support and wherein said retraction may be controlled with spring dampers upon contact with said seat back of adjoining occupant support.

11. A structure as in claim 10, wherein said control of the position of the at least one vertebra
is enabled with at least one cable each attached at a first end to each of the at least one vertebrae and attached at a second end to a point on the circumference of a segment of a spool, wherein the circumference of said segment of a spool is adapted to provide upon rotation through a predetermined angle, a release of the cable by the required movement of the attached vertebra, thereby providing means to modify the height of each of the one or more vertebrae on the spine with the one or more segments of spool controlled by the occupant.

12. The structure according to claim 1 wherein the seat back of at least one occupant support is pivotally attached
to the cabin and wherein the lower edge of the seat back is pivotally attached to the rear edge of the seat bottom and this pivot, rises relative to the cabin as said seatback is reoriented from a substantially upright position to a substantially flat-bed position and one of moves: forward relative to the support structure; or backwards relative to the support structure, as the seatback is reoriented from a substantially upright position to a substantially flat-bed position.

13. A structure according to claim 1, further comprising a Frame
with a first end oriented towards the front of the seat bottom and a second end oriented towards the rear of the seat bottom, and the seat bottom attached pivotally at its rear end to the seat back and the Frame at its second end about a common lateral axis relative to the seat back, and wherein the first end of the Frame is one of: slidably attached to the cabin; and pivotally attached to a first end of at least one support arm with two ends, wherein the second end of said at least one support arm is pivotally attached to said cabin, and said cabin with the Frame, said Frame thereby enabled to support the seat bottom at one or more orientations with regard to the cabin, with an actuation means attached at a predetermined distance from the support axis on the seat back and the Frame.

14. A structure as in claim 1, wherein
at least one of said occupant supports comprise at least one arm rest that is pivotally attached to the seat back at a height substantially the height of the elbow from the seat bottom, and one of: slidably attached to the cabin; or pivotally attached to a shadow arm at its first end, wherein the second end of the shadow arm is attached to one of the seat bottom and the cabin, thereby providing means of the arm rest to move with the occupant from the flat bed position to the upright sitting position, and wherein said arm rest comprises at least one of: an upper surface that is enabled to reach the level of the seat bottom in the flat bed position and thereby provide a part of the sleeping surface; an attached table top that may be one or both of: pivotally attached along an axis along said arm rest, to the arm rest and thereby enabled to deploy by rotation to a horizontal position and facilitate egress and ingress; and slidably attached along a slide in the direction of the arm rest, thereby enabling the movement of the table to be nearer or further from the occupant as desired by the occupant; and a control panel for passenger amenities is attached to the arm rest, thereby allowing the movement of the control panel with the motion of the occupant for convenient access.

15. The structure as in claim 1, wherein said occupant supports are modular comprising one or both of: a video screen and the oxygen access door enabled to tilt down from a flat horizontal storage position on the ceiling above the seat bottom, when deployed, and wherein the oxygen access door is placed behind the video screen and pivoted to at substantially the same axis when deployed together.

16. The structure as in claim 1, wherein the interconnection between said support means are enabled to transfer substantial horizontal forces during impact conditions and thereby increase the rigidity of the airframe in the region of deployment within the airframe.

17. The structure of claim 1, wherein contact between occupant supports in both the first tier and the second tier are on a surface substantially parallel to the axis of the occupants.

18. A method as of assembly of the structure in an aircraft as in claim 1, wherein the support structure of the occupant supports are located towards the front of the occupant supports along the axis of the occupants, further comprising a method for rapid re-configuration (RRR) for reconfiguring the aircraft cabin with different occupant supports targeted at a different market, and wherein the occupant supports to be replaced in a re-configuration lie behind the occupant supports along the axis of the aircraft by: reorienting all the seat backs of the occupant supports in the upright position, thereby creating a temporary "corridor" of space along the axis of motion of the aircraft between one of: the wall of the aircraft and the adjoining upright occupant supports; and an aisle along with the space behind the upright occupant supports facing another aisle;

unlocking the attachments of one or more occupant supports in sequence;

transferring occupant supports to the doorway along the temporary "corridor" using either manual or automated belts placed on the storage bins below the occupant supports or the airplane floor;

transferring reverse sequence of replacement occupant supports from the doorway along the temporary "corridor" using either manual or automated belts placed on the storage bins below the occupant supports or the airplane floor;

locking the attachments on the replacement occupant supports, thereby reconfiguring the cabin of the aircraft.

19. A structure with a high center of mass, comprising occupant supports with axes of the facing direction of occupants, supported by seat tracks at the floor of and in an axial direction of motion of an aircraft wherein said occupant supports are attached to each other along the motion axis of the aircraft, said attachments designed to transfer to each other, counteracting vertical forces resulting from the moments generated by the center of mass of each occupant support relative to its support points in said structure, resulting from impact forces on the aircraft in the motion axis direction of the aircraft, thereby reducing the vertical forces transferred to the seat tracks as a result enabling a higher center of mass of the structure relative to the seat tracks with at least one of: limited tensile; and limited compressive load bearing capability, thereby said attachments enabling the structure to neutralize the torque generated by each occupant support therein, imposing a compressive load towards the front and a tensile load towards the back of the aircraft on each of the seat tracks, during impact conditions reducing the alternatively compressive and tensile loading on the seat tracks under impact conditions in a direction substantially along the axis of the aircraft.

* * * * *